(12) United States Patent
Roberts

(10) Patent No.: US 7,184,719 B2
(45) Date of Patent: Feb. 27, 2007

(54) METHOD FOR OPERATING MULTIPLE OVERLAPPING WIRELESS NETWORKS

(75) Inventor: Richard D. Roberts, West Melbourne, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 615 days.

(21) Appl. No.: 10/623,798

(22) Filed: Jul. 22, 2003

(65) Prior Publication Data

US 2004/0142663 A1    Jul. 22, 2004

Related U.S. Application Data

(63) Continuation-in-part of application No. 10/367,834, filed on Feb. 19, 2003.

(60) Provisional application No. 60/357,638, filed on Feb. 20, 2002, provisional application No. 60/397,105, filed on Jul. 22, 2002, provisional application No. 60/397,104, filed on Jul. 22, 2002, provisional application No. 60/398,596, filed on Jul. 26, 2002.

(51) Int. Cl.
    *H04B 1/02* (2006.01)
(52) U.S. Cl. .................... 455/103; 455/102; 455/168.1; 455/209

(58) Field of Classification Search ................ 455/103, 455/102, 168.1, 209
See application file for complete search history.

(56) References Cited

U.S. PATENT DOCUMENTS 5,274,665 A * 12/1993 Schilling .................... 375/144
2004/0203393 A1* 10/2004 Chen ......................... 455/63.1

OTHER PUBLICATIONS

John G. Proakis, Digital Communications, 4th Ed., 1983, 1989, 1995, 2001, pp. 262 and 336-339, McGraw Hill, New York.

* cited by examiner

*Primary Examiner*—Matthew Anderson
*Assistant Examiner*—Minh Dao

(57) ABSTRACT

A method is provided for operating a plurality of overlapping wireless networks such that they do not interfere with each other. This is accomplished by having each network transmit at a frequency that is offset from a base frequency by an integer multiple of an offset frequency. The offset frequency is generally a small fraction of the base frequency so that the spectral properties of each network are roughly the same. However, each network will transmit at a unique frequency with respect to all of the other overlapping networks. The offset values are preferably symmetrical around zero, and the offset for one network can be zero.

27 Claims, 32 Drawing Sheets

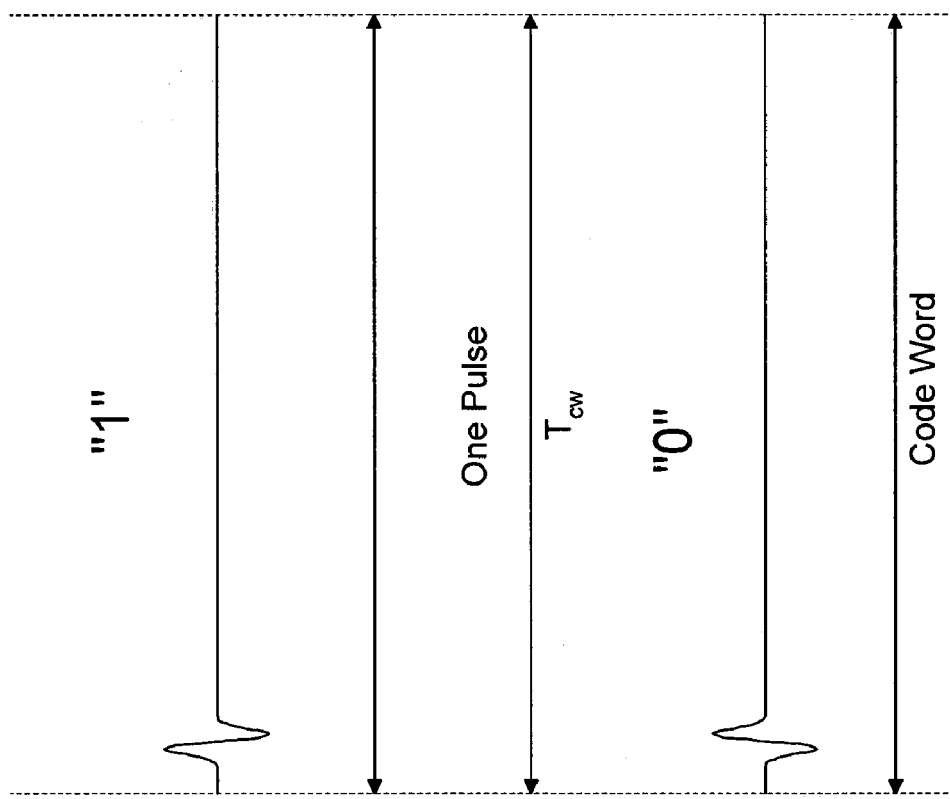

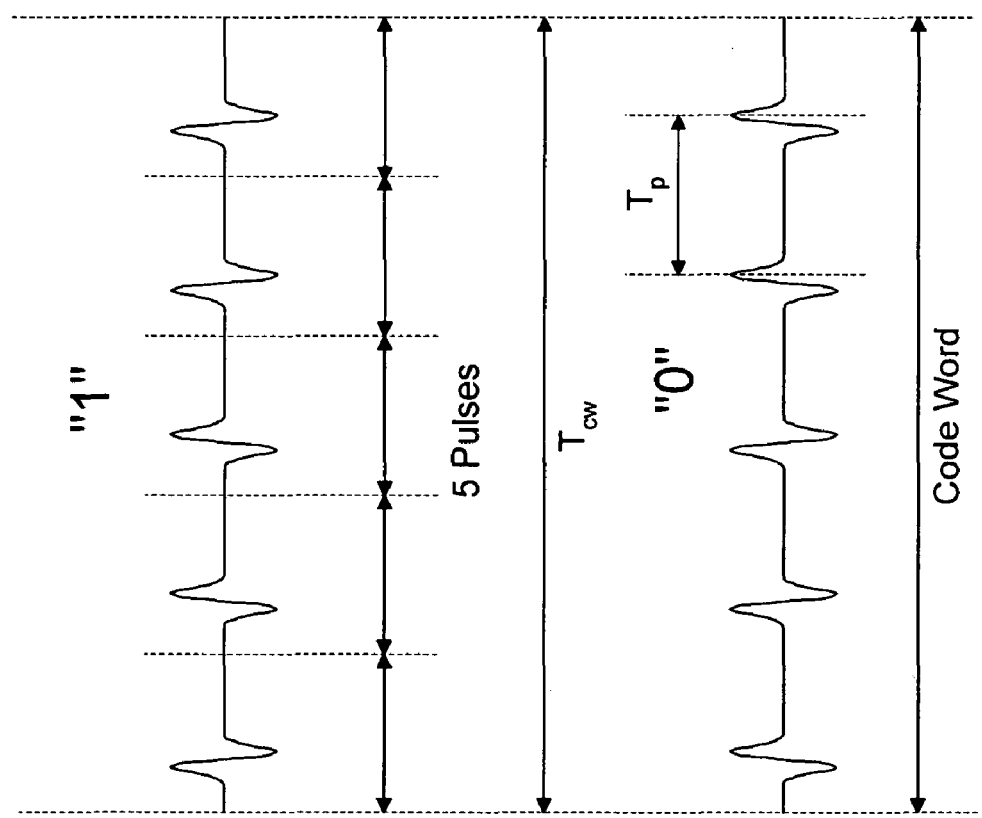

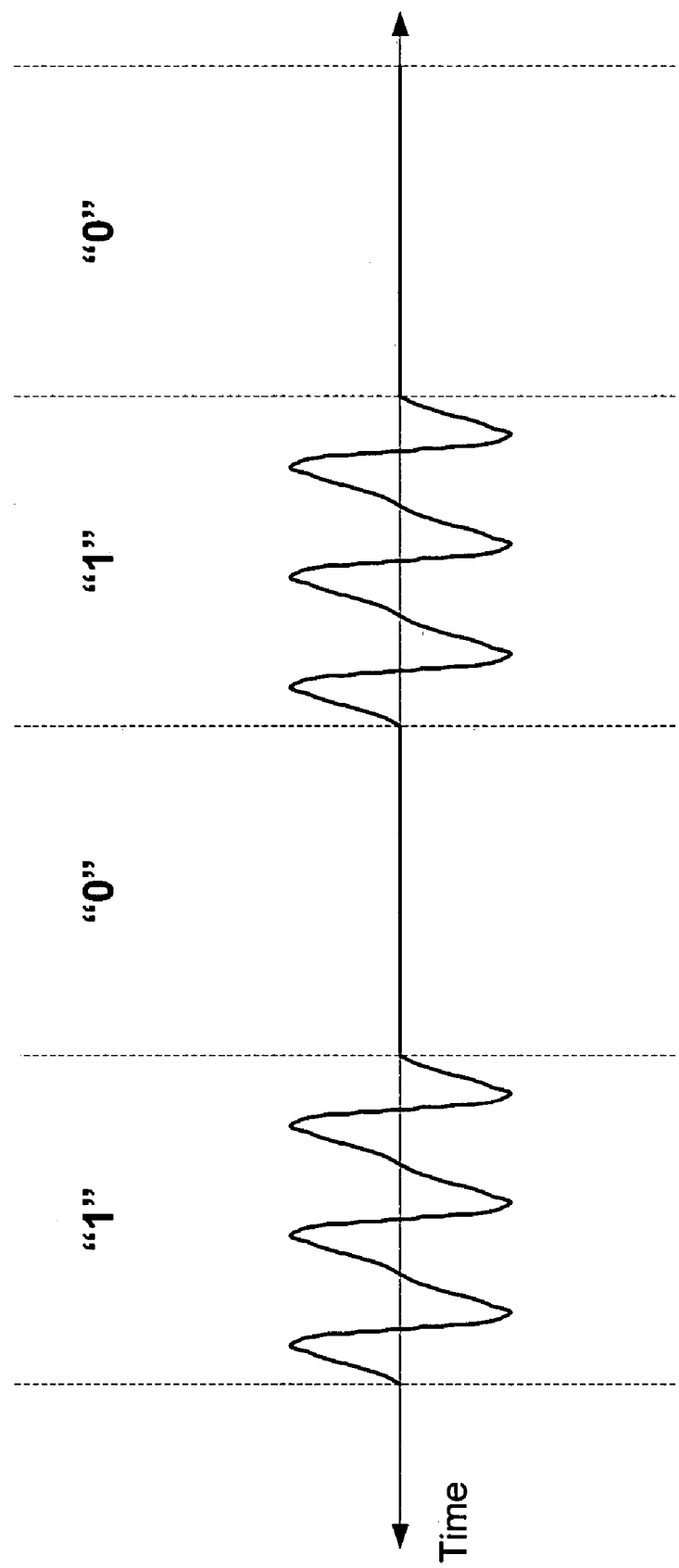

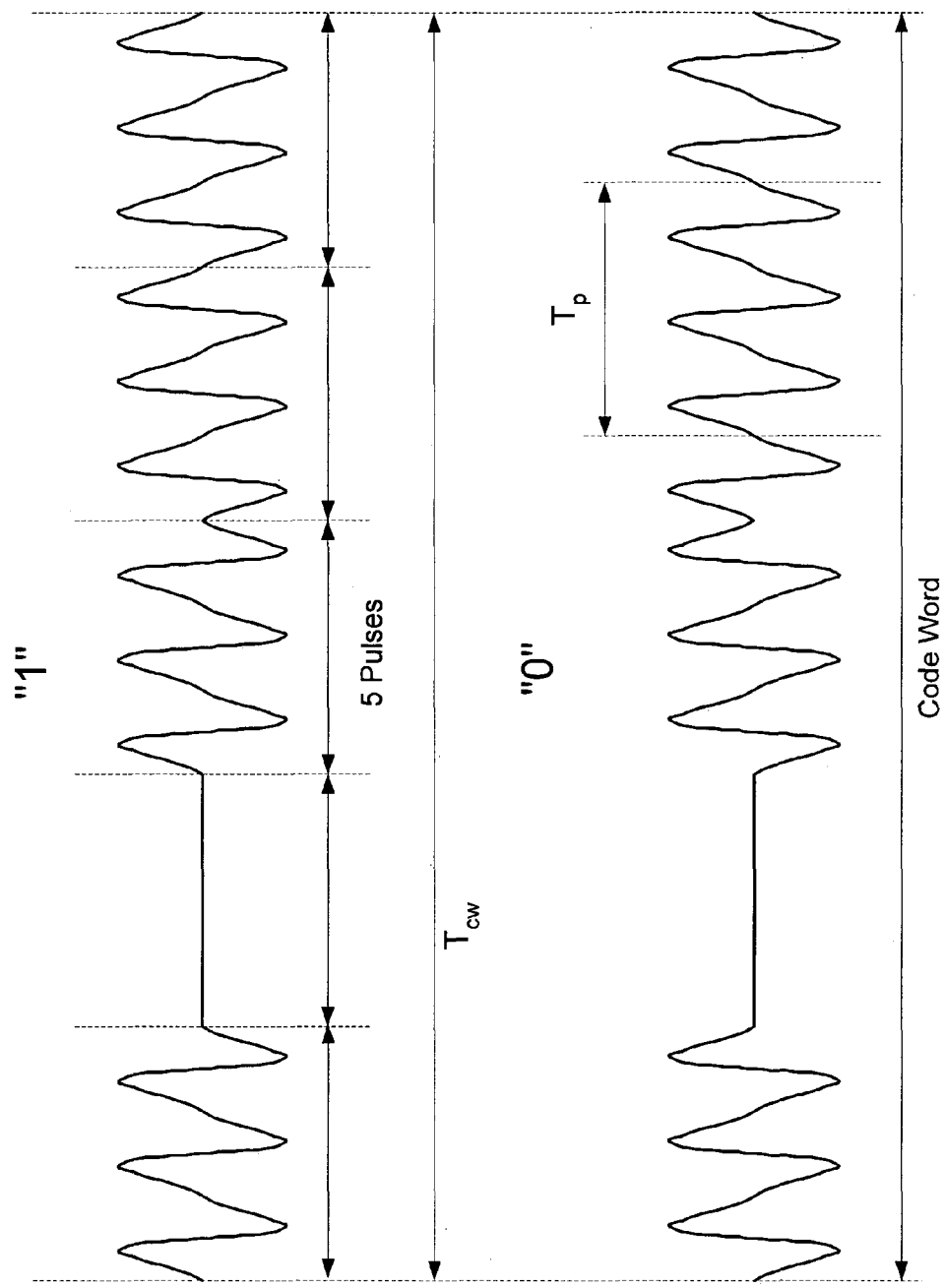

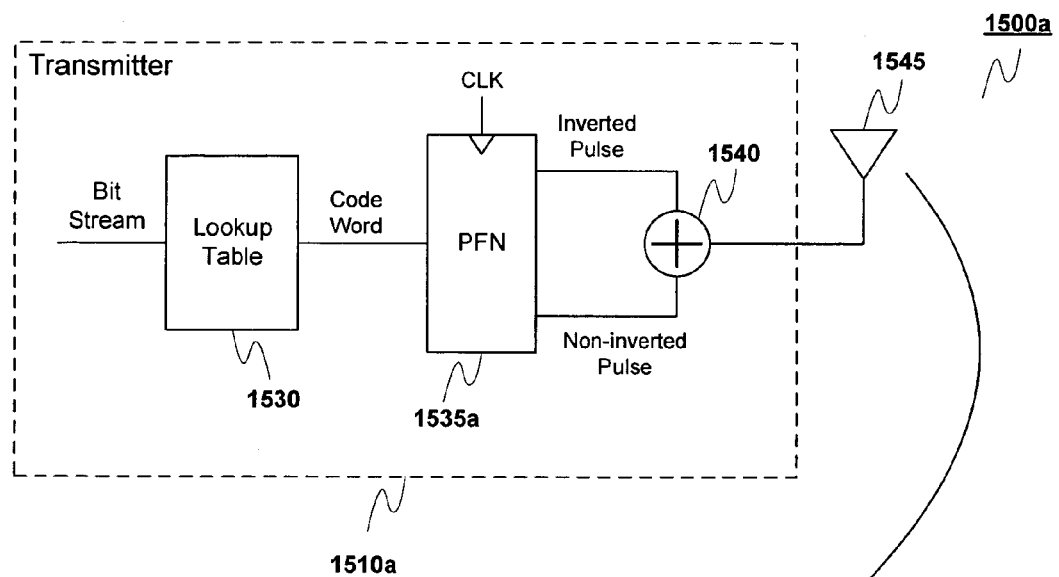
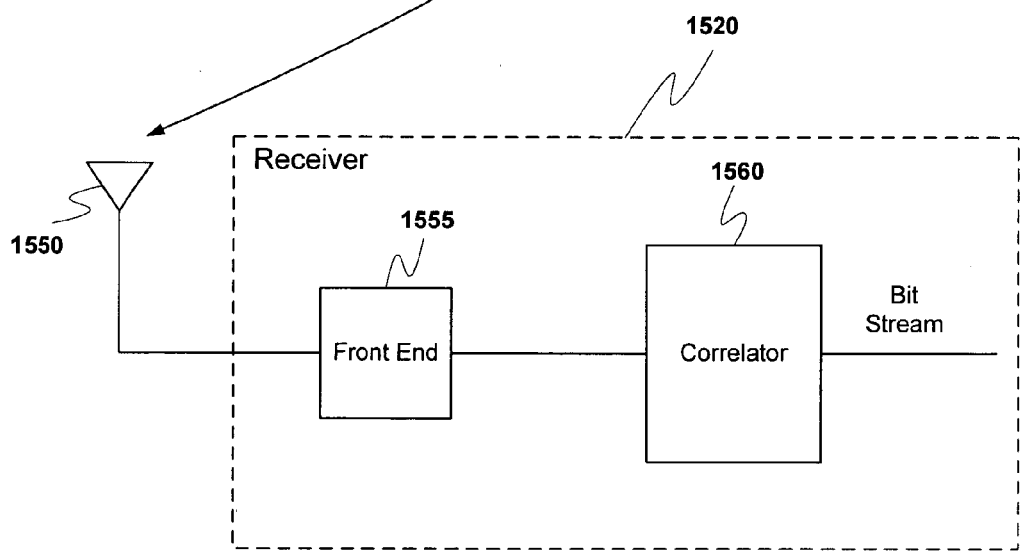
Fig. 15A

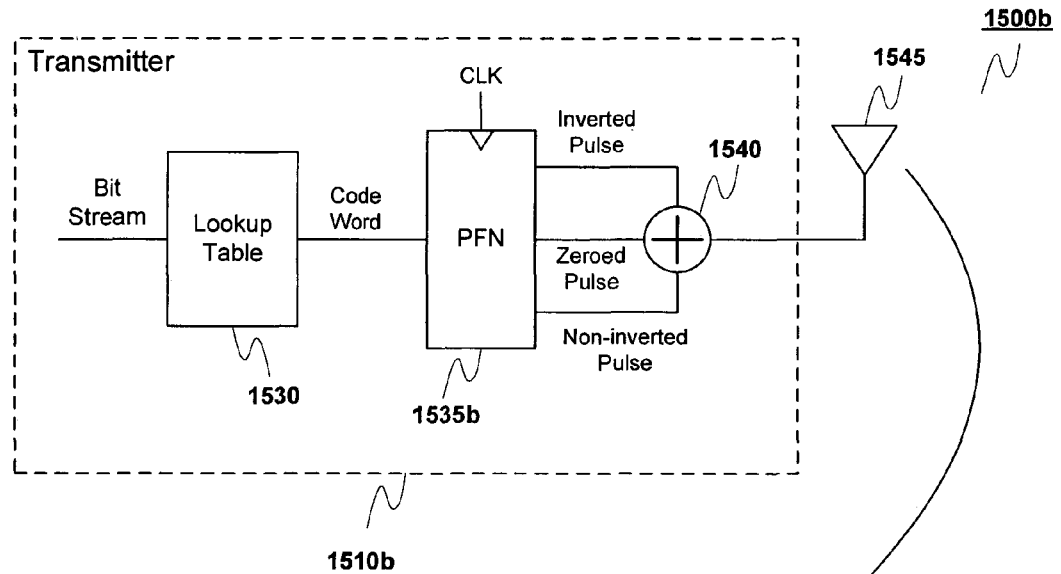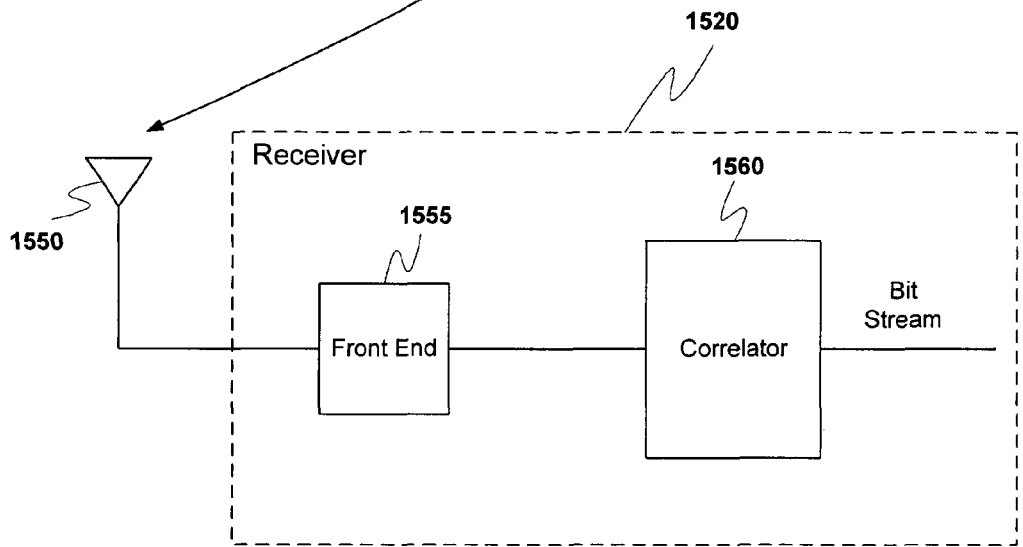
Fig. 15B

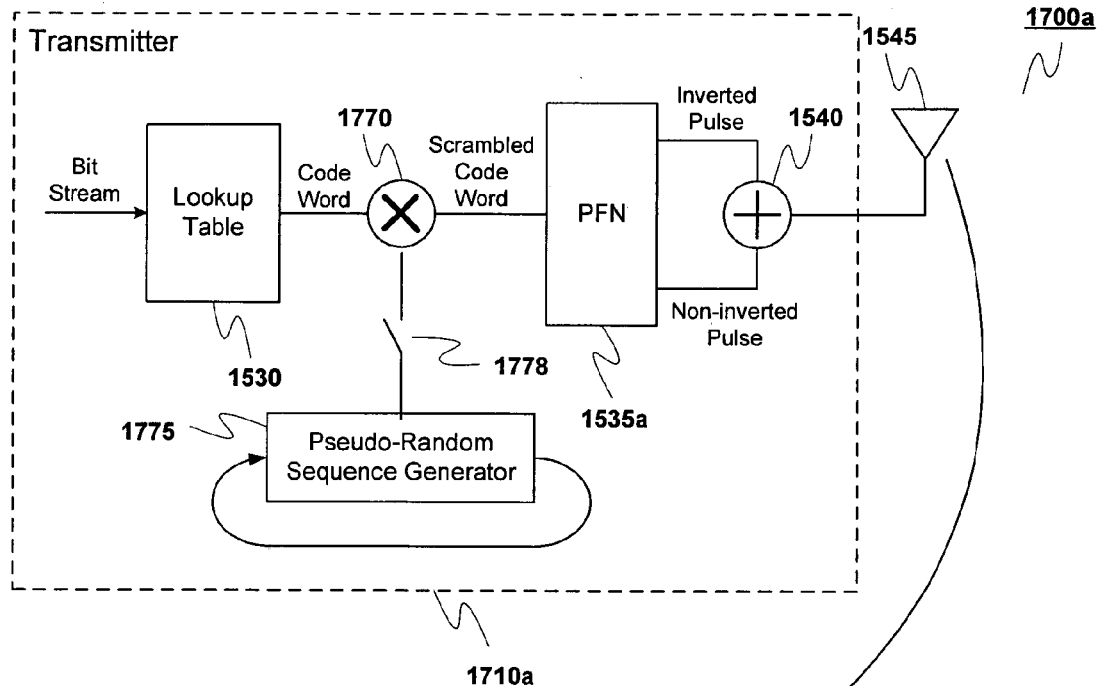
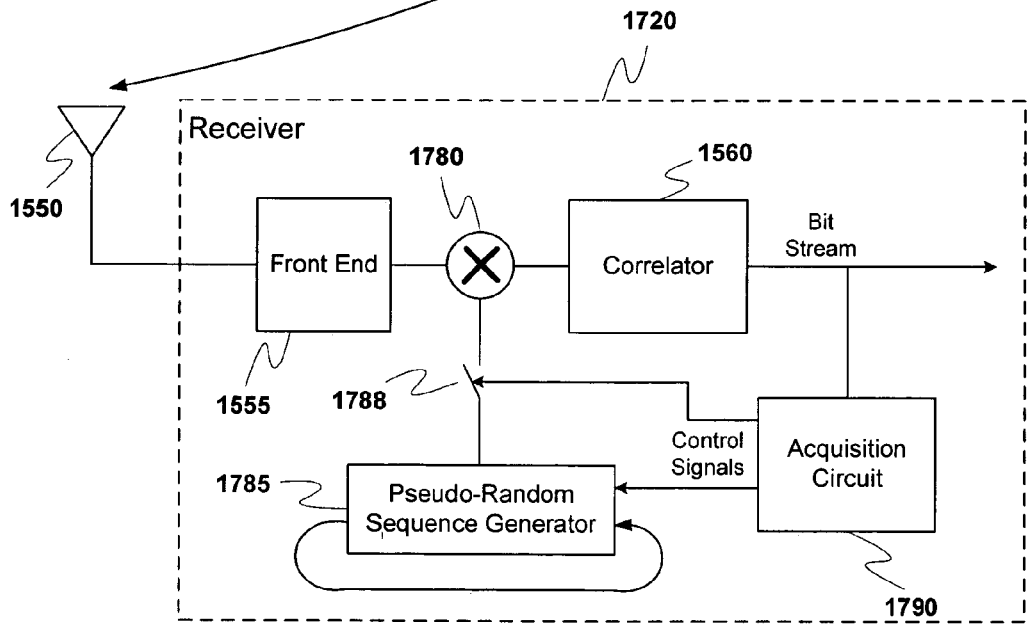
Fig. 17A

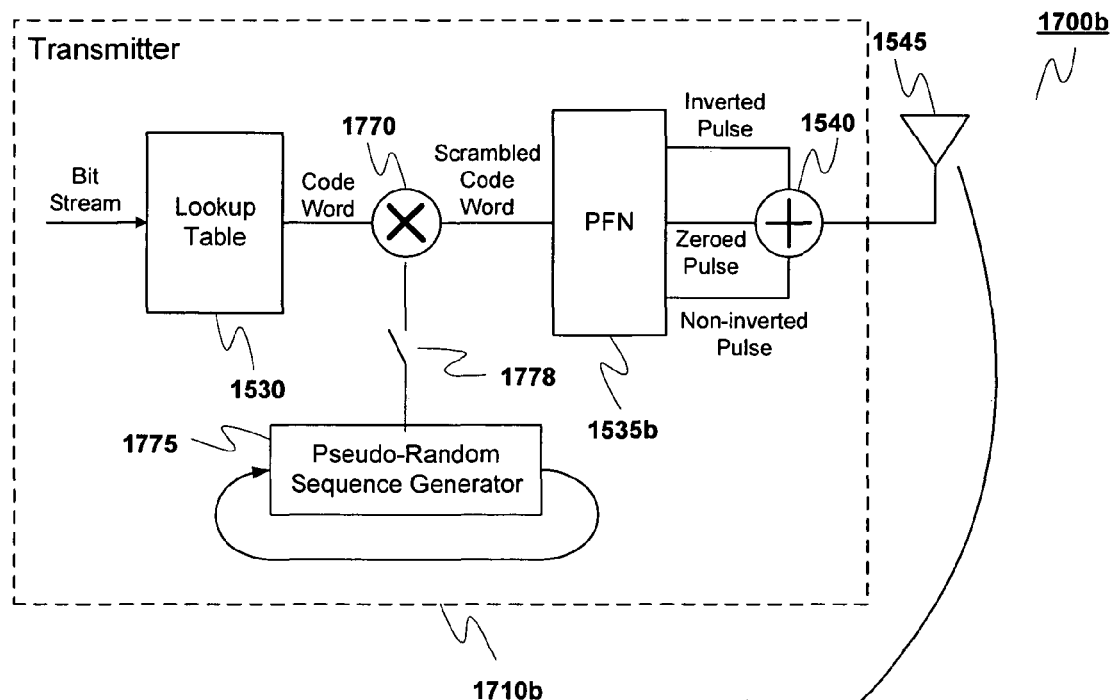
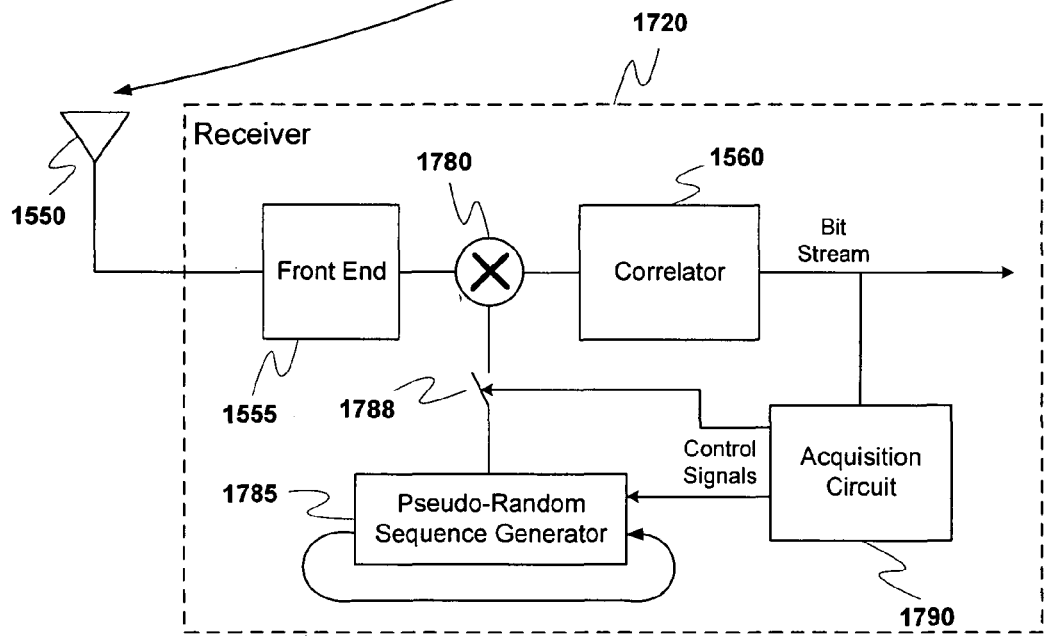
Fig. 17B

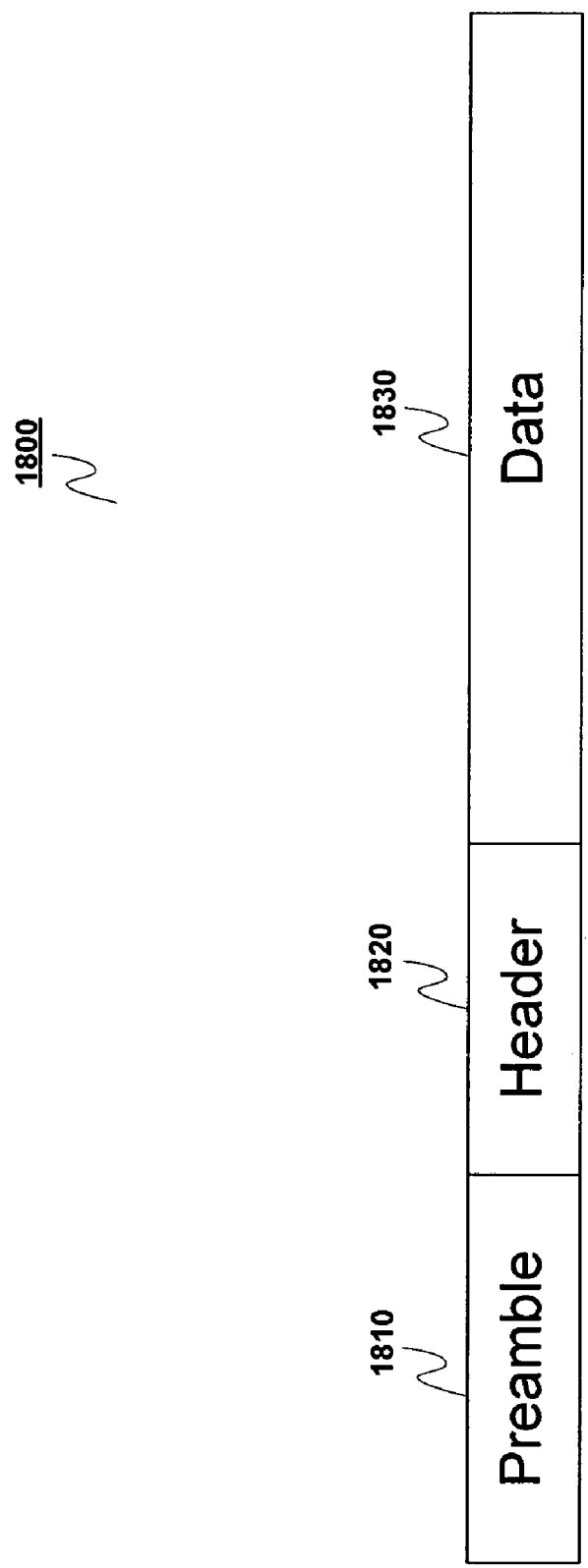

METHOD FOR OPERATING MULTIPLE OVERLAPPING WIRELESS NETWORKS

CROSS-REFERENCE TO RELATED PATENT DOCUMENTS

This application is a continuation-in-part of U.S. application Ser. No. 10/367,834, filed Feb. 19, 2003, entitled "M-ARY ORTHAGONAL CODED COMMUNICATIONS METHOD AND SYSTEM," which relies for priority on U.S. provisional application Ser. No. 60/357,638, by Matthew L. Welborn, filed Feb. 20, 2002, entitled "M-ARY BI-ORTHAGONAL CODED ULTRAWIDEBAND COMMUNICATIONS SYSTEM," the contents of each of which are hereby incorporated by reference in their entirety. This application also relies for priority on U.S. provisional application Ser. No. 60/397,105, by Matthew L. Welborn et al., filed Jul. 22, 2002, entitled "M-ARY BIORTHAGONAL KEY BINARY PHASE SHIFT KEY SCHEME FOR ULTRAWIDE BANDWIDTH COMMUNICATIONS USING RANDOM OVERLAY CODES AND FREQUENCY OFFSET FOR PICONET SEPARATION," U.S. provisional application Ser. No. 60/397,104, by Richard D. Roberts, filed Jul. 22, 2002, entitled "METHOD AND APPARATUS FOR CARRIER DETECTION FOR CODE DIVISION MULTIPLE ACCESS ULTRAWIDE BANDWIDTH COMMUNICATIONS," and U.S. provisional application Ser. No. 60/398,596, by Richard D. Roberts, filed Jul. 26, 2002, entitled "METHOD AND SYSTEM OF ACQUIRING A BINARY PHASE SHIFT KEY ULTRAWIDE BANDWIDTH SIGNAL," the contents of all of which are hereby incorporated by reference in their entirety.

BACKGROUND OF THE INVENTION

The present invention relates to ultrawide bandwidth (UWB) transmitters, receivers and transmission schemes. More particularly, the present invention relates to a method and system for sending data across a UWB signal using M-ary bi-orthogonal keying.

The following is a general description of a UWB system, noting particularly how it is applicable to wireless networks. Although UWB technology has also been used in radar and ranging applications, the following discussion addresses only issues relevant to wireless networking applications.

It is helpful to briefly note some important design issues for indoor wireless networks. Such systems will need to operate over relatively short ranges in environments with multipath interference, but will need to provide high data rates, preferably using spectrum licensed by the Federal Communications Commission (FCC). Also, such systems are often used to support mobility, so they need low power dissipation to enable battery operation and, as always, low cost and complexity is an advantage.

Characteristics of UWB Systems

One embodiment of a UWB system uses signals that are based on trains of short duration pulses (also called chips) formed using a single basic pulse shape. The interval between individual pulses can be uniform or variable, and there are a number of different methods that can be used for modulating the pulse train with data for communications. One common characteristic in this embodiment, however, is that the pulse train is transmitted without translation to a higher carrier frequency, and so UWB transmissions using these sorts of pulses are sometimes also termed "carrier-less" radio transmissions. In other words, in this embodiment a UWB system drives its antenna directly with a baseband signal.

Another important point common to UWB systems is that the individual pulses are very short in duration, typically much shorter than the interval corresponding to a single bit, which can offer advantages in resolving multipath components. We can represent a general UWB pulse train signal as a sum of pulses shifted in time, as shown in Equation 1:

$$s(t) = \sum_{k=-\infty}^{\infty} a_k p(t - t_k) \quad (1)$$

Here s(t) is the UWB signal, p(t) is the basic pulse shape, and $a_k$ and $t_k$ are the amplitude and time offset for each individual pulse. Because of the short duration of the pulses, the spectrum of the UWB signal can be several gigahertz or more in bandwidth. An example of a typical pulse stream is shown in FIG. 1. Here the pulse is a Gaussian monopulse with a peak-to-peak time ($T_{p-p}$) of a fraction of a nanosecond, a pulse period $T_p$ of several nanoseconds, and a bandwidth of several gigahertz.

UWB Systems Limited to Low Power Spectral Density

UWB systems in general have extremely wide absolute bandwidth relative to most existing wireless systems. This bandwidth is a direct consequence of the use of sub-nanosecond pulses that leads to signal bandwidths of several gigahertz or more. Because these signals are also transmitted without translation to higher center frequencies, it is clear that these signals will occupy the same frequency bands that are already in use by many existing spectrum users.

Because of rulings by the FCC, future UWB systems will likely be limited to operations using extremely low power spectral density (as measured in dBm/MHz). Based on this fact, it is clear that even with a bandwidth of several gigahertz, UWB systems will also be limited to relatively low total transmit power. For example, a UWB system with 5 GHz of bandwidth might have a maximum total transmit power of only a small fraction of a milliwatt over the entire 5 GHz of bandwidth.

Operation in the Power-Limited Regime

The bandwidth efficiency of a digital modulation scheme that transmits B bits in T seconds (R bits/sec) using a bandwidth of W hertz is given by R/W=B/(WT) bits/s/Hz. As we will see, the bandwidth efficiency of a UWB system is not important in the sense of how efficiently it uses spectrum, but rather the value of this ratio serves to distinguish UWB systems from more typical narrowband systems. Based on this ratio, R/W, digital communications systems can be classified as operating in either the bandwidth-limited regime or the power-limited regime of the bandwidth-efficiency plane. This classification has fundamental implications for many of the important trade-offs that must be made in the design of efficient communications systems.

For future UWB systems, the R/W ratio will likely be very low for the system to have any useful range. For example, even for a relative high-rate wireless network (say 100 Mbps), the bandwidth efficiency of a UWB wireless network will be as low as $\frac{1}{20}$ or even $\frac{1}{50}$, depending on the bandwidth W. The primary consequence of this low value for the ratio R/W is that UWB systems will almost certainly operate well within the power-limited regime of the bandwidth-efficiency plane.

The Critical Importance of Power Efficiency

The main result of UWB operation in the power-limited regime is that such systems will be very sensitive to design issues that affect the power efficiency of the system. For this reason, the analysis in the following sections will focus on the critical issues of power efficiency of the UWB modulation techniques, as well as the spectral effects of modulation that might also affect allowable transmit power levels. The implications of power-limited operation will also influence system-level trade-offs between range and data rate, as well as trade-offs between complexity and performance in the form of forward error-correction.

Multipath Robustness and Precision Ranging

One frequently mentioned benefit of ultra-wide bandwidth is a robustness to the effects of multipath interference. Multipath interference results when multiple time-displaced copies of a signal reach a receiver at the same time because of signal bounces in a cluttered environment. This robustness is a result of two distinct factors: (1) wide fractional bandwidth leads to less severe multipath fading, which is particularly important for low-power wireless systems; and (2) wide absolute bandwidth enables resolution of multipath components and constructive use of multipath.

The effect of reduced multipath fading can be partially understood from a frequency-domain perspective by realizing that the absolute signal bandwidth of the UWB signal is much greater than the coherence bandwidth of nearly any conceivable multipath channel. Any frequency-selective fades due to multipath will only affect a small portion of the signal power for any channel realization. Previous work provides empirical evidence that UWB signals experience a much lower variance in received signal power in the presence of multipath than do narrowband signals.

For UWB signals, robustness to multipath fading is result not just of the wide system bandwidth, however, but is also a result of the large ratio of system bandwidth to center frequency, i.e., the fractional bandwidth. A large fractional bandwidth means that there is a corresponding large variation in the mode and degree of RF energy interaction with the surrounding environment over the entire UWB bandwidth. Environmental interactions such as scattering, refraction and reflection depend on the wavelength of the RF signals, and so the large fractional bandwidth leads to relatively low correlation in the fading properties of the different regions of the UWB bandwidth. Thus, the properties of UWB signals should lead to more robust multipath performance even than systems with equal bandwidth but much higher center frequencies (i.e. lower fractional bandwidths).

The wide absolute bandwidth of UWB signals also provides fine time resolution that enables a receiver to resolve and combine individual multipath components, avoiding destructive interference.

Analysis of UWB Modulation Choices

Under current FCC regulations, UWB transmit power is limited by the power spectral density (PSD) of the transmitted signal. FIG. 2 is a graph showing the power spectral density limits currently put in force by the FCC.

This limitation affects the selection of a UWB modulation scheme in two distinct ways. First, the modulation technique needs to be power efficient. In other words, the modulation needs to provide the best error performance for a given energy per bit. Second, the choice of a modulation scheme affects the structure of the PSD in the sense that it affects the distribution of signal power over different frequency bands. If a particular modulation scheme results in the concentration of signal power in narrow frequency ranges, it has the potential to impose additional constraints on the total transmit power in order to satisfy the PSD limitations.

As we compare different modulation schemes, we therefore examine both the power efficiency and the effect of the modulation on the PSD. In the sections that follow, we examine a number of modulation schemes that have been proposed for UWB, including several forms of pulse amplitude modulation (PAM), such as: positive pulse amplitude modulation (PPAM), on-off keying (OOK), and binary phase-shift keying (BPSK), as well as pulse-position modulation (PPM).

Pulse Amplitude Modulation

As noted above, one general form of a UWB signal is a simple pulse train. Assuming that pulses are uniformly spaced in time (i.e. the $k^{th}$ pulse occurs at time $t=kT$), then we can simplify Equation (1) to:

$$s(t) = \sum_{k=-\infty}^{\infty} a_k p(t - kT) \qquad (2)$$

where T is the pulse-spacing interval. From this general form of PAM, we can analyze several specific modulation techniques by choosing the mapping from data bits to pulse weights ($a_k$) in different ways. These different techniques are illustrated in FIGS. 3A–3C, and are described in the following paragraphs.

FIGS. 3A–3C are graphs showing exemplary pulse streams for OOK, PPAM, and BPSK modulation schemes, respectively. In each case, they show a data sequence "1 0 1 0." FIGS. 4A–4C are constellation diagrams for the modulation schemes of FIGS. 3A–3C, respectively. As shown in FIGS. 4A–4C, the constellation diagrams for OOK, PPAM, and BPSK are all one-dimensional, differing only in the symbol constellation's position relative to the origin.

On-Off Keying

As shown in FIG. 3A, OOK defines the data by the presence or absence of a pulse. A "1" is indicated by a pulse, and a "0" is indicated by the absence of a pulse. Thus, the bit stream "1 0 1 0" is indicated by the sequence of: a pulse, a blank where a pulse should be, a pulse, and another blank.

This embodiment has $a_k \in \{0,2\}$, i.e., data bits are transmitted by either the presence or absence of a pulse at time $t=t_k$. In the constellation diagram in FIG. 4A, this results in symbol points at (0,0) and (2,0).

Positive Pulse Amplitude Modulation

As shown in FIG. 3B, PPAM defines the data by the amplitude of the pulse. A "1" is indicated by a large pulse, and a "0" is indicated by a small pulse. Thus, the bit stream "1 0 1 0" is indicated by the sequence of: a large pulse, a small pulse, a large pulse, and a small pulse.

This embodiment uses strictly positive values for the two pulse weights, so that $a_k \in \{\alpha_0, \alpha_1\}$ where $0 < \alpha_0 < \alpha_1$. This corresponds to transmitting either a large or small amplitude pulse based on the value of the source bit. In the constellation diagram of FIG. 4B this is shown as having signal points at $(\alpha_0, 0)$ and $(\alpha_1, 0)$.

Binary Phase Shift Keying

As shown in FIG. 3C, BPSK defines the data by the polarity of the pulse. A "1" is indicated by a non-inverted pulse, and a "0" is indicated by an inverted pulse. Thus, the bit stream "1 0 1 0" is indicated by the sequence of: a non-inverted pulse, an inverted pulse, a non-inverted pulse, and an inverted pulse.

In this embodiment $a_k \in \{-1, +1\}$. This corresponds to transmitting either a non-inverted or an inverted pulse based on the value of the source bit. In the constellation diagram of FIG. 4C this is shown as having signal points at $(-1, 0)$ and $(1, 0)$.

Pulse-Position Modulation

One other technique proposed for UWB pulse modulation, PPM, is fundamentally different from the PAM techniques described above because the pulses are not uniformly spaced in time. Rather, the source data bits are used to modulate the time position of the individual pulses instead of the pulse amplitudes. For example, binary PPM encodes the data bits in the pulse stream by advancing or delaying individual pulses in time relative to uniform reference positions. In this case, the equation for the UWB signal becomes $$s(t) = \sum_{k=-\infty}^{\infty} p(t - t_k) = \sum_{k=-\infty}^{\infty} p(t - kT + a_k \beta) \quad (3)$$

Here the data bits are mapped to the direction of the time shifts, $a_k$, where $a_k \in \{-1, 1\}$, and $\beta$ is the amount of pulse advance or delay in time relative to the reference (unmodulated) position. When we consider the constellation diagram for binary PPM, we find that the plot is no longer one dimensional, as it is for the binary PAM techniques. For PPM, the presence of two pulse with different time offsets results in a two-dimensional constellation plot. To find the specific location of the symbol points within the plot, however, we need to determine the correlation $\rho$ between the two different symbols, the advanced and delayed pulses.

$$\rho = \frac{\int_{-\infty}^{\infty} p(t - \beta T) p(t + \beta T) \, dt}{\int_{-\infty}^{\infty} p(t) p(t) \, dt} \quad (4)$$

FIGS. 5A–5C are constellation diagrams for pulse position modulation schemes under various conditions for binary PPM based on the pulse shown in FIG. 1. FIG. 5A shows as situation where the pulses are orthogonal (i.e., $\rho = 0$); FIG. 5B shows the situation where the pulses are not orthogonal and $\rho > 0$; and FIG. 5C shows the situation where the pulses are not orthogonal and $\rho < 0$.

For the non-orthogonal cases of binary PPM, the orthogonal basis function used to define the constellation plot can be found using Gram-Schmidt orthogonalization for the two non-orthogonal pulses. The constellation diagrams in FIGS. 5A–5C all have symbol points at $(1,0)$ and $(\rho, \sqrt{1-\rho^2})$, and the two symbol points lie on the unit circle (when normalized to unit energy).

In the case where the two different locations of the pulse have no overlap in time, the correlation will clearly be ($\rho \approx 0$) and the binary PPM becomes orthogonal modulation. The constellation for this case is shown in FIG. 5A, where the symbol points are $(1,0)$ and $(0,1)$. Here the two orthogonal pulses have been used to create orthogonal basis vectors for the constellation plot.

When the two pulses overlap, the correlation $\rho$ in general will not be zero, but will range between one and some minimum (possibly negative) value.

Comparison of Power Efficiency for Binary Modulation

We can use the constellation diagrams in FIGS. 4A–4C and 5A–5C to compare the power efficiency of the various binary modulation techniques by computing the inter-symbol distance, d, as a function of average symbol energy, $E_s$. For OOK, we have $$E_s = \frac{(0^2 + d^2)}{2},$$

so $d = \sqrt{2E_s}$. For positive-valued PAM (PPAM) we see that $d = (\alpha_1 - \alpha_0)$, $$\text{so } E_s = \frac{(\alpha_0^2 + (d + \alpha_0)^2)}{2}.$$

Solving for d, we get $d = (\sqrt{2E_s - \alpha_0^2} - \alpha_0)$. If we assume $\alpha_0 \geq 0$, then we have $d \leq \sqrt{2E_s}$, which is satisfied with equality when $\alpha_0 = 0$ (i.e. when PPAM becomes OOK). For antipodal binary PAM (BPSK) we have $$E_s = \left(\frac{d}{2}\right)^2, \text{ so } d = 2\sqrt{E_s}.$$

For binary PPM, the inter-symbol distance depends on the correlation between the advanced and delayed pulses defined in Equation (4) and for the general case, $d = \sqrt{2E_s(1-\rho)}$. Here we see that if the value of $\rho$ ranges between $-1$ and $+1$, the distance can range between $d=0$ and $d=2\sqrt{E_s}$. The actual maximum and minimum values for $\rho$ that determine this range of possible inter-symbol distances depend on the specific shape of the pulse $p(t)$ and can be determined according to Equation (4) for different values of $\beta$. For the example Gaussian monopulse shown in FIG. 1, the value of $\rho$ as defined in Equation (4) ranges from $(+1)$ to approximately $(-0.45)$ as $\beta$ ranges from zero to several multiples of $T_p$.

TABLE 1

Differences Between Modulation Techniques

| Modulation Class | Specific Form | Inter-symbol Distance | Power Efficiency Relative to Antipodal Signaling |
|---|---|---|---|
| Pulse-position Modulation | Orthogonal | $d = \sqrt{2E_b}$ | −3 dB |
| | Non-orthogonal | $d = \sqrt{2E_b(1-\rho)}$ | <1.4 dB (variable) |
| Amplitude Modulation | Positive PAM | $d < \sqrt{2E_b}$ | <−3 dB |
| | OOK | $d = \sqrt{2E_b}$ | −3 dB |
| | Antipodal | $d = 2\sqrt{E_b}$ | 0 dB |

These results show significant differences between the modulation techniques and are summarized in Table 1. The orthogonal PPM and OOK techniques are equally efficient and the positive PAM system is less so, but becomes the same in the limit as the PAM becomes OOK. Non-orthogonal PPM has a power efficiency that depends on the symbol correlation ρ, but is still suboptimal. Antipodal signaling (BPSK) provides the greatest inter-symbol distance for a given average symbol energy. This difference provides at least a 3 dB advantage in efficiency relative to OOK, PPAM, or orthogonal PPM, and to achieve the same bit error rate (which is a function of distance) PPM or OOK must use double the bit energy, or 3 dB higher $E_b$.

Decomposition of Binary Modulation Techniques

For the binary PAM techniques depicted in FIGS. 4A–4C, the constellation diagrams differ only in their position relative to the origin. It is a well-known result in communications theory that power efficiency depends on the mean of the symbol constellation—this is why the zero-mean property of the BPSK makes it superior in the ratio of inter-symbol distance to symbol energy. Another way to understand this difference is to decompose the weight sequence into a constant value sequence added to a zero-mean random sequence: $a_k = \mu_a + z_k$. This sequence decomposition allows us to represent the UWB pulse train as the sum of an unmodulated component pulse train and an antipodal component pulse train:

$$s(t) = \sum_{k=-\infty}^{\infty} \mu_a p(t-kT) = \sum_{k=-\infty}^{\infty} z_k p(t-kT) \quad (5)$$

From this result we can easily see the source of the difference in power efficiency for the PAM techniques. The energy in the unmodulated component of the pulse train above does not contribute to communicating data between the transmitter and receiver, and is effectively wasted. Only the energy in the antipodal component contributes to the communications process. The greater the energy in the unmodulated component (i.e. the higher the mean $\mu_a$ for a give distance d) the poorer is the power efficiency of the modulation. BPSK is thus seen to be optimal for binary techniques since it has zero-mean and all of its energy is contained in the antipodal component of the pulse train.

For PPM, we can perform a similar, but more general, decomposition of the pulse train. Here we must use unmodulated and antipodal components that, unlike PAM, have different pulse shapes. We define two new pulses:

$$m(t) = \frac{p(t-\beta T) + p(t+\beta T)}{2}, \text{ and } b(t) = \frac{p(t-\beta T) - p(t+\beta T)}{2} \quad (6)$$

These pulses represent the unmodulated [m(t)] and antipodal [b(t)] pulse train components. We can use these two pulses to write the UWB pulse train as the sum of two separate component pulse trains:

$$s(t) = \sum_{k=-\infty}^{\infty} \mu_a m(t-kT) + \sum_{k=-\infty}^{\infty} z_k b(t-kT) \quad (7)$$

Using this decomposition, we see that data bits are transmitted by sending either [m(t)+b(t)] or [m(t)−b(t)] at each time interval t=kT. The sign of the component m(t) is independent of the data value and is therefore not modulated. Two examples of this decomposition for binary PPM are shown in FIGS. 6A and 6B for values of β that result in both overlapping and non-overlapping pulses.

FIGS. 6A–6D are graphs showing component pulses for the decomposition of binary PPM into unmodulated and antipodal pulse trains. FIG. 6A shows the original pulses with $\beta=5T_p$; FIG. 6B shows the original pulses with $\beta=1.5T_p$; FIG. 6C shows the unmodulated component pulse [m(t)] and antipodal component pulse [b(t)] for $\beta=5T_p$; and FIG. 6D shows the unmodulated component pulse [m(t)] and antipodal component pulse [b(t)] for $\beta=1.5T_p$.

As with the PAM cases above, we can see that the energy in the unmodulated component of the pulse train defined by m(t) is useless in the communication of information and leads to inefficient modulation.

Spectral Effects of Modulation Techniques

Another important consideration in evaluating a UWB modulation technique is the effect of the modulation on the spectrum of the transmitted signal. As noted in an earlier section, UWB signals have been limited by the FCC by the peak of their PSD, so that for best system performance signals should be designed to maximize transmit power for given limits on PSD levels.

Spectral Analysis for PAM

To understand the effect of the modulation scheme on the UWB signal, we need to find the spectrum not of the isolated pulse, but of the modulated pulse train. If we assume that the modulating data are random, the transmitted pulse train is also a random signal and as such does not have a deterministic Fourier transform. However, we can still understand the effects of modulation on the spectral distribution of signal power by finding its expectation over the random source data sequences. This power spectral density (PSD) of the transmit signal, s(t), is the Fourier transform of the signal autocorrelation and is denoted by $\Phi_{ss}(f)$. Because the pulses in a PAM UWB signal are uniformly spaced as in Equation (2), we can derive a general form for the PSD of the PAM signals as follows:

$$\Phi_{ss}(f) = |P(f)|^2 \Phi_{aa}(f) \quad (8)$$

Here P(f) is the Fourier transform of the basic pulse, p(t), and $\Phi_{aa}(f)$ is the PSD of the random data sequence, $a_k$, which is hereafter assumed to be a wide-sense stationary random sequence. If we assume that the pulse weights $a_k$ correspond to the data bits to be transmitted and that the random data are independent and identically distributed (IID), then the PSD can be determined as follows:

$$\Phi_{aa}(f) = \sigma_a^2 + \frac{\mu_a^2}{T} \sum_{k=-\infty}^{\infty} \delta\left(f - \frac{k}{T}\right) \quad (9)$$

where $\sigma_a^2$ and $\mu_a$ are the variance and mean of the weight sequence and $\delta(f)$ is a unit impulse function. This PSD is periodic in the frequency domain with period $$f = \frac{1}{T}$$

because it is the transform of the discrete auto-correlation sequence, $\Phi_{aa}(k) = E\{a_{n+k}a_n^*\}$. This PSD in Equation (9) has both a continuous portion and discrete spectral lines, corresponding to the first and second terms on the right-hand side. It is worth noting that the magnitude of the spectral lines depends on the mean of the weights, $\mu_a$. In light of the decomposition described above, we see that the energy in the unmodulated component of the pulse train is the energy in the spectral lines and the energy in the antipodal component is the energy of the continuous spectral component.

When we combine the results of Equations (8) and (9) we see that the resulting PSD of the transmitted signal is equivalent to the result of filtering a weighted impulse sequence through a filter with frequency response P(f):

$$\Phi_{ss}(f) = \frac{\sigma_a^2}{T}|P(f)|^2 + \frac{\mu_a^2}{T^2} \sum_{k=-\infty}^{\infty} \left|P\left(\frac{k}{T}\right)\right|^2 \delta\left(f - \frac{k}{T}\right) \quad (10)$$

At this point we can again consider the different modulation techniques for PAM described earlier. The PSD for the OOK signal with pulse amplitudes weights $a_k \in \{0,2\}$ is determined as follows:

$$\Phi_{ss,OOK}(f) = \frac{1}{T}|P(f)|^2 + \frac{1}{T^2} \sum_{k=-\infty}^{\infty} \left|P\left(\frac{k}{T}\right)\right|^2 \delta\left(f - \frac{k}{T}\right) \quad (11)$$

In this equation we see that OOK results in discrete spectral lines in the PSD of the UWB signal. The spectral lines are spaced at a frequency interval of $$f = \frac{1}{T}$$

and each line has power proportional to P(f) evaluated at $$F = \frac{k}{T}.$$

For OOK the total power in the spectral lines is equal to the power in the continuous component of the PSD, as shown above. A similar result is obtained for the positive-valued PAM signal, where we have $$\sigma_a^2 = \frac{(\alpha_0 - \alpha_1)^2}{4} \text{ and } \mu_a = \frac{(\alpha_0 + \alpha_1)}{2}.$$

Substituting these values in Equation (8) the PSD becomes:

$$\Phi_{ss,PPAM}(f) = \frac{(\alpha_0 - \alpha_1)^2}{4T}|P(f)|^2 + \frac{(\alpha_0 + \alpha_1)^2}{4T^2} \sum_{k=-\infty}^{\infty} \left|P\left(\frac{k}{T}\right)\right|^2 \delta\left(f - \frac{k}{T}\right) \quad (12)$$

We see that, as with OOK, there are spectral lines present in the transmitted signal for positive-valued PAM and furthermore that the magnitude of the lines increases with the weight sequence mean. Note that PPAM spectrum becomes the same as the OOK spectrum when $\alpha_0 \to 0$.

The situation is very different for antipodal signaling, where $a_k \in \{-1,+1\}$, so that $\sigma_a^2 = 1$ and $\mu_a = 0$. In this case, the PSD becomes simply:

$$\Phi_{ss,BPSK}(f) = \frac{\sigma_a^2}{T}|P(f)|^2 = \frac{1}{T}|P(f)|^2 \quad (13)$$

Here we see that the spectral lines vanish because of the zero mean of the weight sequence. Because the PSD for BPSK has no lines, the spectral distribution of energy does not depend on the pulse interval T or the pulse-repetition frequency (PRF). Rather the presence of T in Equation (13) only shows that the total power of the transmit signal increases linearly at all frequencies with the PRF when pulse amplitude is constant.

Spectral Analysis for PPM

The results of Equations (8) and (9) do not directly apply to the case of PPM because the pulses do not have uniform spacing in time. To find the PSD for PPM signals, however, we can use the decomposition technique described in Equation (7) above that allowed us to represent the PPM signal as the sum of two uniformly spaced pulse trains. From the definitions in Equation (6) it is clear that m(t) and b(t) are orthogonal regardless of the orthogonality of the shifted pulses p(t−β) and p(tβ). Using this fact, we can find the PSD of the composite pulse train in Equation (7), the PSD of the binary PPM signal as follows:

$$\Phi_{ss,PPM}(f) = \frac{\sigma_a^2}{T}|B(f)|^2 + \frac{\mu_a^2}{T^2} \sum_{k=-\infty}^{\infty} \left|M\left(\frac{k}{T}\right)\right|^2 \delta\left(f - \frac{k}{T}\right) \quad (14)$$

Where B(f) and M(f) are the Fourier transforms of the component pulses b(t) and m(t), respectively. As with the case of the PAM signals, it is clear that the energy that corresponded to the unmodulated pulse train in Equation (7) here translates to energy contained in spectral lines. Similarly, the energy in the antipodal portion of the signal translates to the energy of the continuous spectral component of Equation (14).

One significant difference between the PAM and PPM spectra is that for PPM the envelope of the magnitudes of the spectral lines can be different from the shape of the continuous spectrum.

The continuous component of the PSD has a shape that depends on B(f), but the power distribution in the spectral lines depends on M(f). These spectral lines still have a frequency spacing of $$f = \frac{1}{T},$$

but the distribution of power in the lines can be significantly different.

In general, both the distribution of energy between the discrete and continuous components of the spectrum, as well as the distribution of spectral energy with respect to frequency, depend on the shape of the original pulse p(t) and the magnitude of the time shift, βT. As with the PAM signals, we can conclude that from the viewpoint of the system designer it is desirable to minimize the energy in the spectral lines. For PPM this is done by minimizing the correlation value ρ, with the additional consideration that the shape of the component pulses m(t) and b(t) may result in less uniform distribution of energy in the spectrum. This could in turn lead to suboptimal designs for a PSD-limited system.

SUMMARY OF THE INVENTION

Consistent with the title of this section, only a brief description of selected features of the present invention is now presented. A more complete description of the present invention is the subject of this entire document.

An object of the present invention is to provide a method by which multiple overlapping networks can be operated without them interfering with each other.

Another object of the present invention is to provide a way to generate pulses for multiple overlapping networks in a simple manner.

These and other objects are accomplished by way of a method of operating a plurality of wireless networks. This method comprises: transmitting first signals in a first network at a first carrier frequency; transmitting second signals in a second network at a second carrier frequency, the second carrier frequency being different from the first carrier frequency, wherein the first carrier frequency is offset from a base carrier frequency by an amount equal to n times an offset frequency, wherein the second carrier frequency is offset from the base carrier frequency by an amount equal to m times the offset frequency, wherein n is an integer, m is an integer, and m does not equal n. The value for n may be 1 and the value for m may be −1.

The base carrier frequency is preferably between 2 and 9 GHz. In one embodiment, the base carrier frequency is more preferably between 3.5 and 4.5 GHz, and most preferably is about 4.104 GHz. In another embodiment, the base carrier frequency is more preferably between 7.5 and 8.5 GHz, and more preferably is about 8.208 GHz.

The offset frequency is preferably between 1 and 10 MHz, most preferably about 3 MHz.

The method may further comprise forming the first signals out of first pulses formed of p cycles of a first oscillating signal operating at a first oscillating frequency; and forming the second signals out of second pulses formed of p cycles of a second oscillating signal operating at a second oscillating frequency. The first oscillating frequency is preferably offset from a base oscillating frequency by an amount equal to $$\frac{n}{p}$$

times the offset frequency, and the second oscillating frequency is preferably offset from a base oscillating frequency by an amount equal to $$\frac{m}{p}$$

times the offset frequency.

A method is also provided of operating a plurality of wireless networks, comprising: transmitting first through $k^{th}$ signals in first through $k^{th}$ networks at first through $k^{th}$ carrier frequencies, respectively; and offsetting the $i^{th}$ carrier frequency from a base carrier frequency by an amount equal to $n_i$ times an offset frequency, wherein k is an integer greater than 1, wherein i varies from 1 to k, and wherein none of $n_1$, through $n_i$ have the same integer value.

In one preferred embodiment k is 4, $n_1$ is −2, $n_2$ is −1, $n_3$ is 1, and $n_4$ is 2. In another preferred embodiment k is 3, $n_1$ is −1, $n_2$ is 0, and $n_3$ is 1.

The base carrier frequency is between 2 and 9 GHz. In one preferred embodiment, the base carrier frequency is more preferably between 3.5 and 4.5 GHz, and most preferably is about 4.104 GHz. In another preferred embodiment, the base carrier frequency is more preferably between 7.5 and 8.5 GHz, and most preferably is about 8.208 GHz.

The offset frequency is preferably between 1 and 10 MHz, and more preferably is about 3 MHz.

The method may further comprise: forming the $i^{th}$ signals out of pulses formed of p cycles of an $i^{th}$ oscillating signal operating at an $i^{th}$ oscillating frequency, wherein the $i^{th}$ oscillating frequency is offset from a base oscillating frequency by an amount equal to $$\frac{n_i}{p}$$

times the offset frequency.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 7 is a timing diagram showing a one-pulse code word using monopulses according to a preferred embodiment of the present invention;

FIG. 8 is a timing diagram showing a five-pulse code word using monopulses, according to a preferred embodiment of the present invention;

FIGS. 10A–10C are graphs showing exemplary pulse streams for OOK, PPAM, and BPSK modulation schemes, respectively, using portions of an oscillating signal as pulses, according to preferred embodiments of the present invention;

FIGS. 12A and 12B are timing diagrams showing a five-pulse code word using five ternary pulses, according to preferred embodiments of the present invention;

FIGS. 15A and 15B are block diagrams of a transmitter and receiver pair according to preferred embodiments of the present invention;

FIGS. 17A and 17B are block diagram showing a UWB system using pseudo-random scrambling, according to preferred embodiments of the present invention;

FIG. 18 is a block diagram of a data packet according to a preferred embodiment of the present invention;

DETAILED DESCRIPTION OF THE PREFERRED EMBODIMENTS

Figure 1:
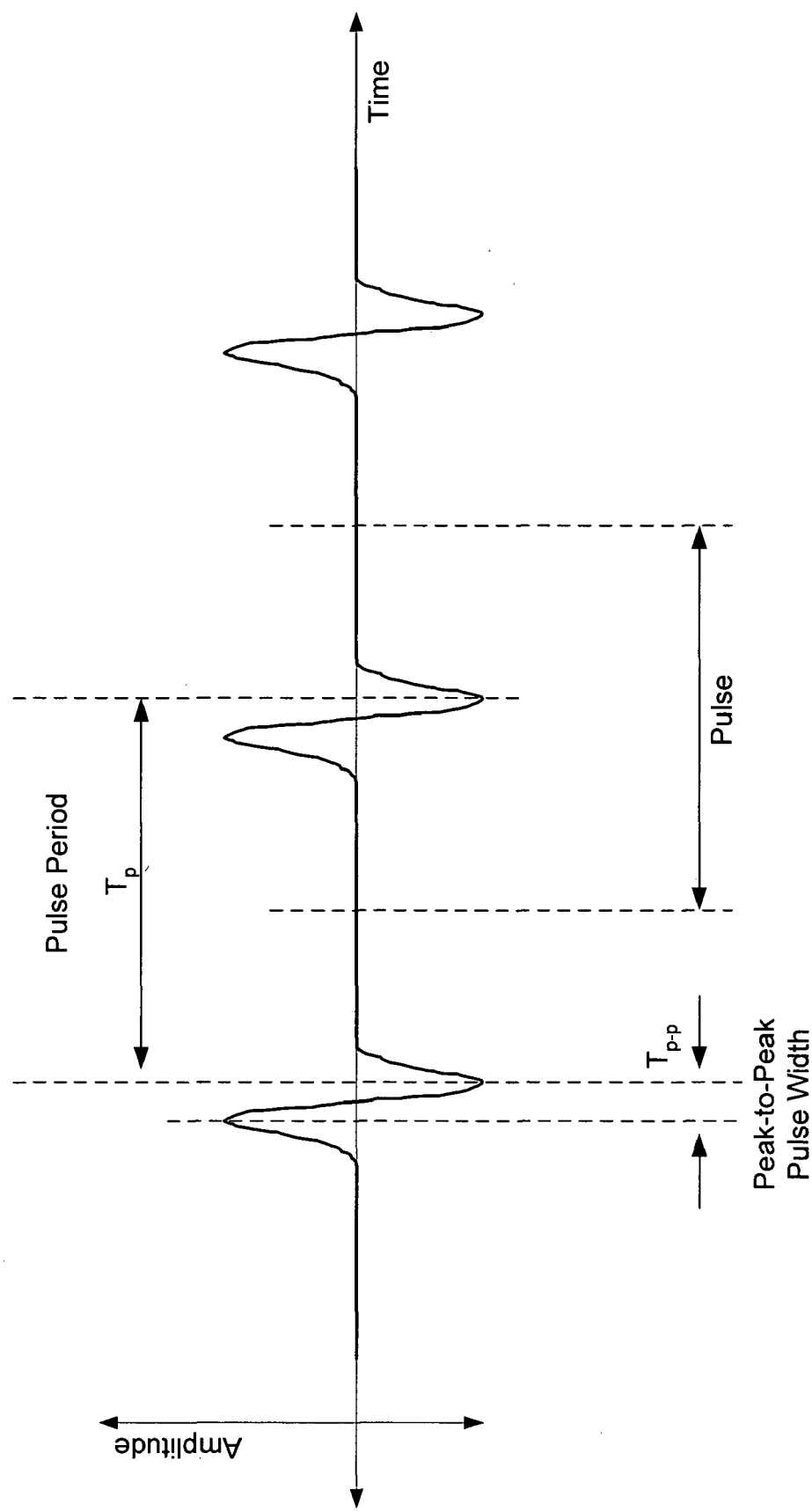
FIG. 1 is a graph of a typical UWB pulse stream.

Preferred embodiments of the present invention will now be described with reference to the drawings. Throughout the several views, like reference numerals designate identical or corresponding parts.

Binary Systems

As noted above with respect to FIG. 1, in one embodiment of a UWB system, a series of pulses are sent across a transmission medium. In order to carry data, these UWB pulses need to have data encoded (i.e., modulated) into them. Then a receiver can look at the incoming pulses and decode the original data. As noted above with respect to FIGS. 3A–3C and 6A–6D, a number of different approaches have been tried, including various PAM and PPM schemes.

Figure 6A:
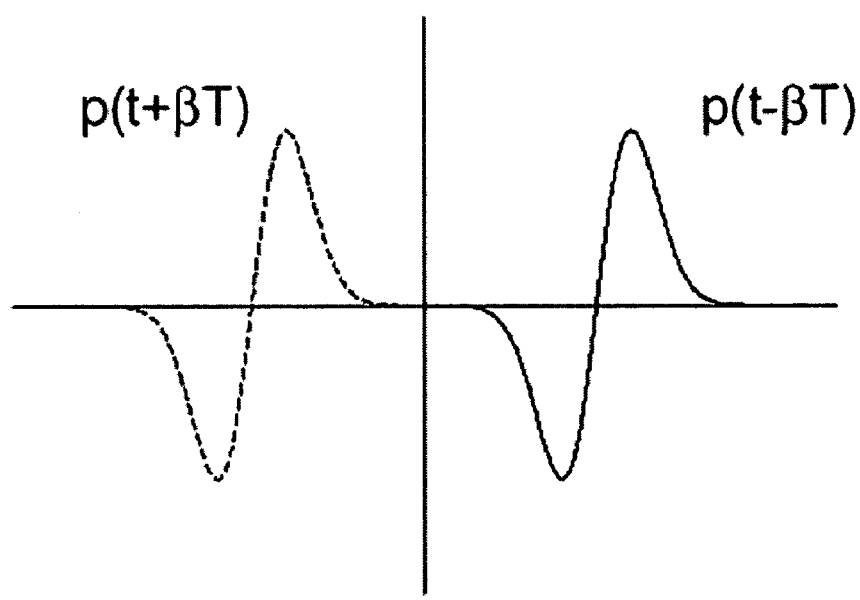
FIGS. 6A–6D are graphs showing component pulses for the decomposition of binary PPM into unmodulated and antipodal pulse trains.
Figure 6B:
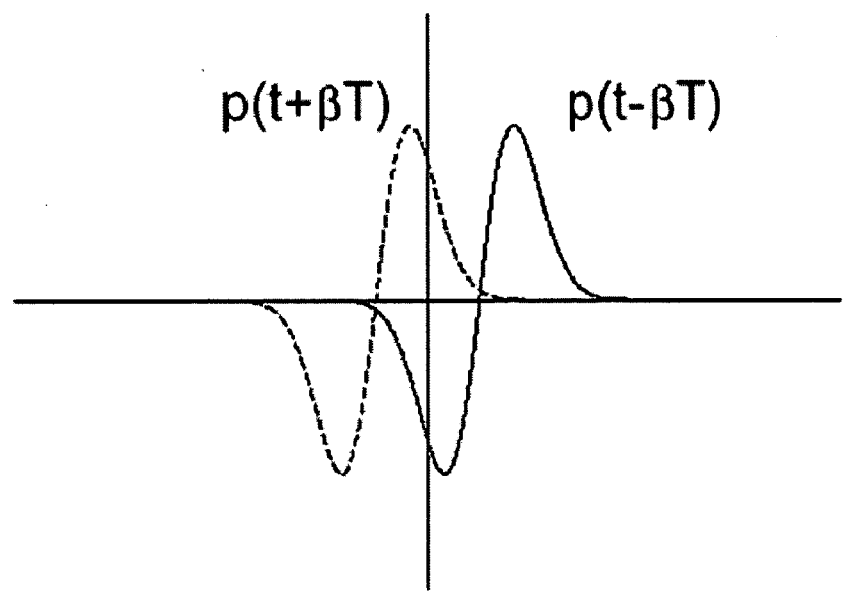
Figure 6C:
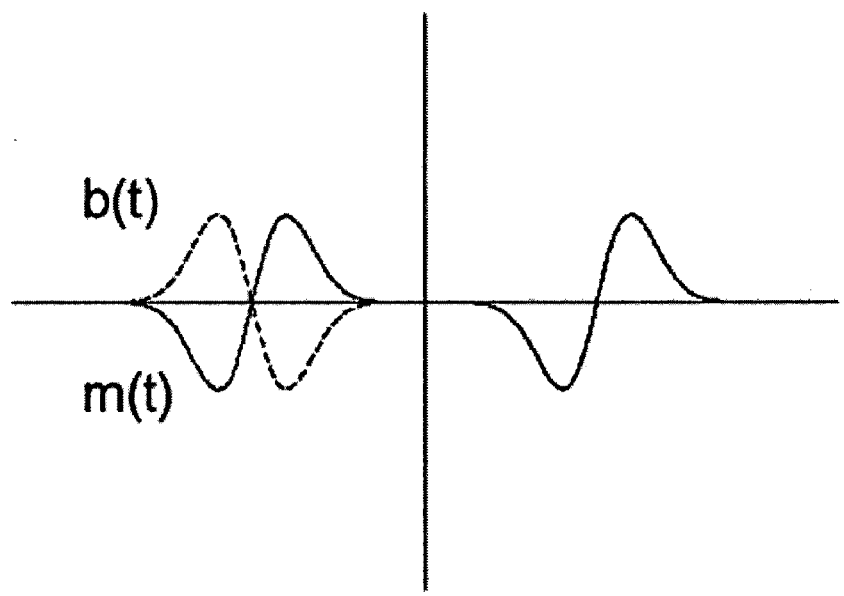
Figure 6D:
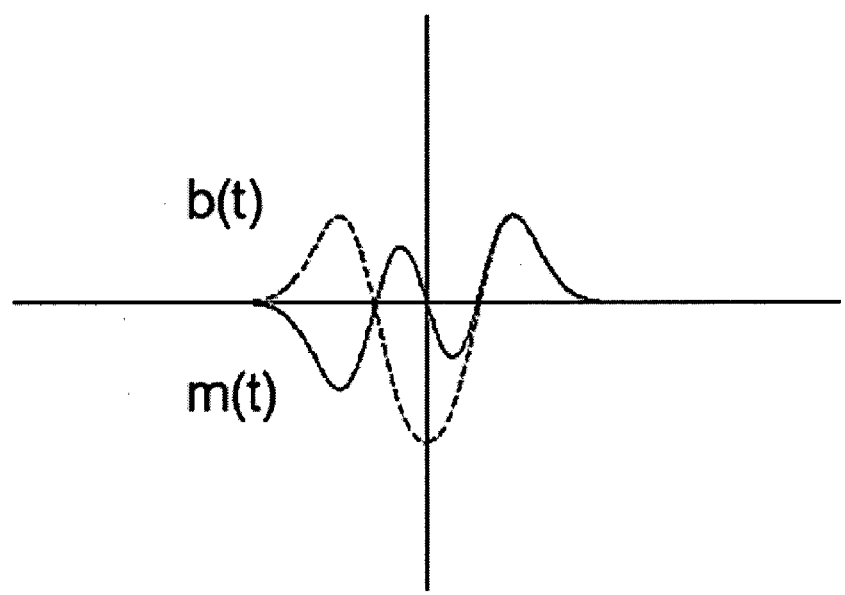

PPM shifts the position of individual pulses depending upon whether the pulse needs to represent a "1" or a "0." As shown, for example, in FIG. 6A, in a simple PPM scheme a pulse is moved from a default position by a distance $\beta T$ to the left if it represents a "0" and is moved from the default position by a distance $\beta T$ to the right if it represents a "1."

In this method, the pulses don't change, they just advance or delay in time, i.e., the position of these pulses is modulated in time. In fact, the pulses are generally identical, which makes it easier to generate them. In FIG. 6A the pulses all rise first and then fall.

Figure 3A:
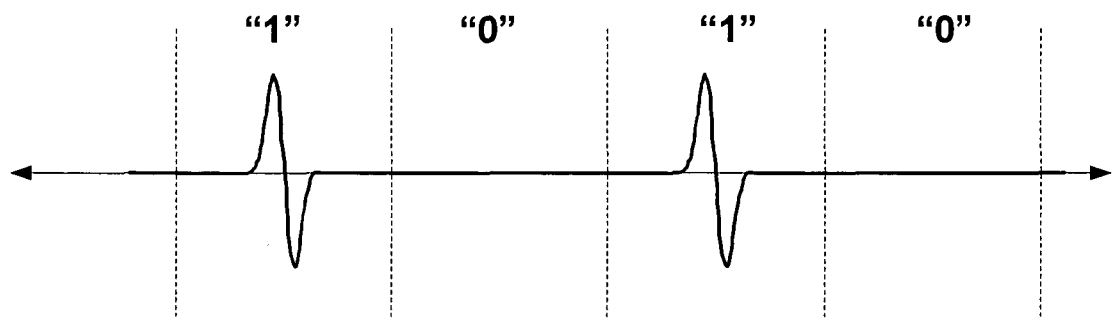
FIGS. 3A and 3C are graphs showing exemplary pulse streams for on-off keying, positive pulse amplitude modulation, and binary phase-shift keying, respectively using monopulses, according to a preferred embodiment of the present invention.
Figure 3B:
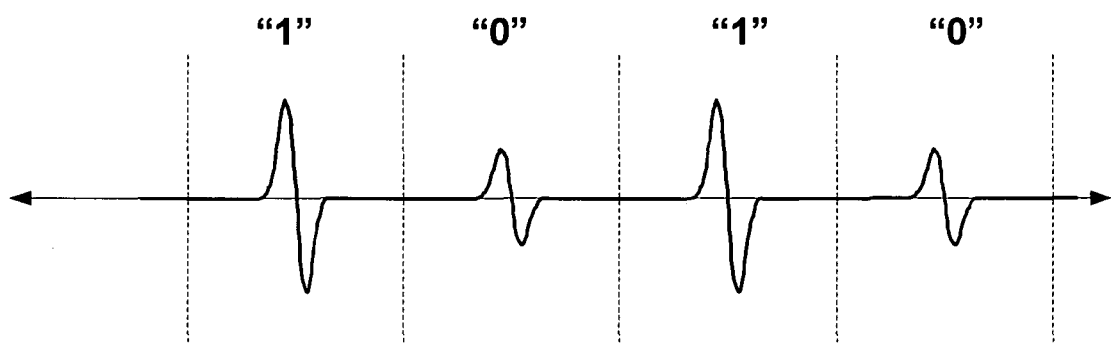
Figure 3C:
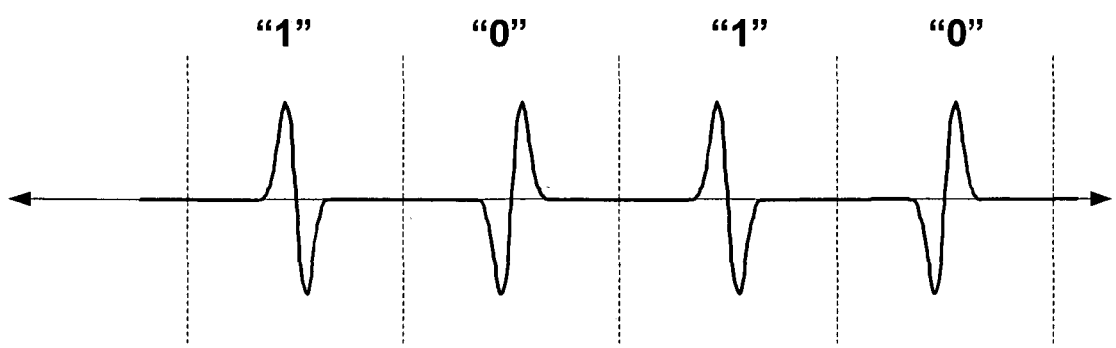
Figure 4A:
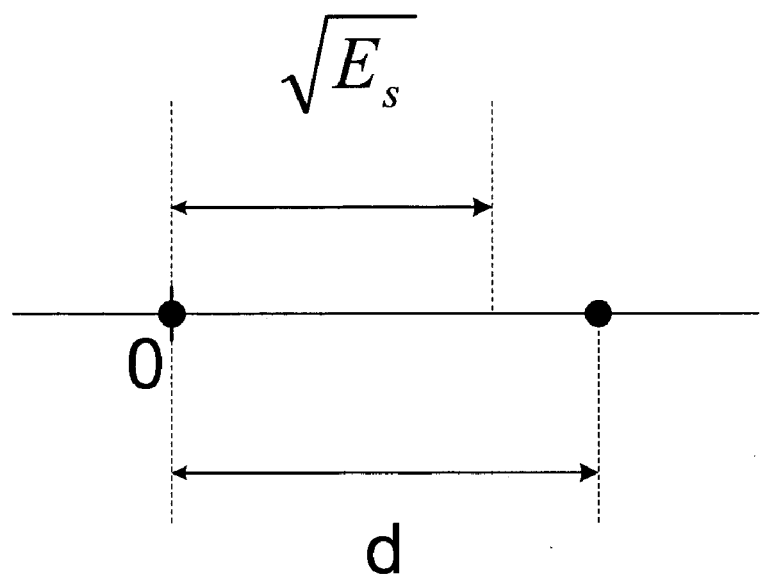
FIGS. 4A–4C are constellation diagrams for the modulation schemes of FIGS. 3A–3C, respectively.
Figure 4B:
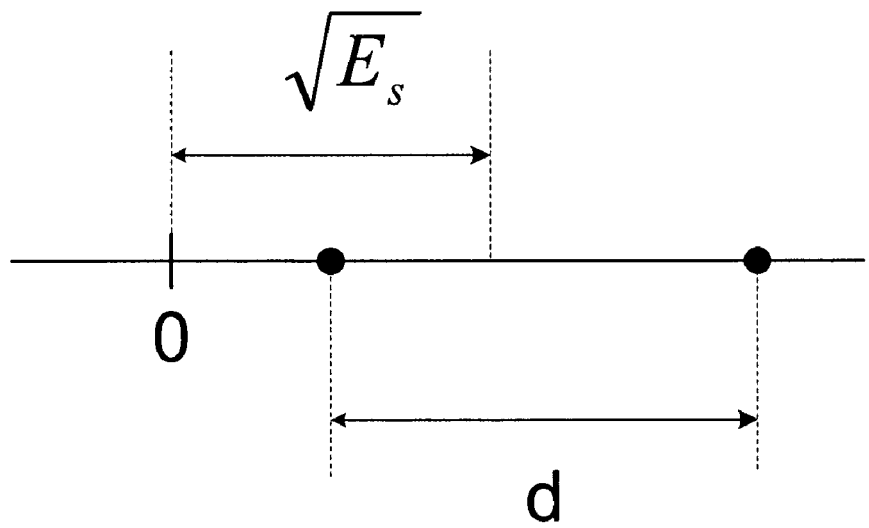
Figure 4C:
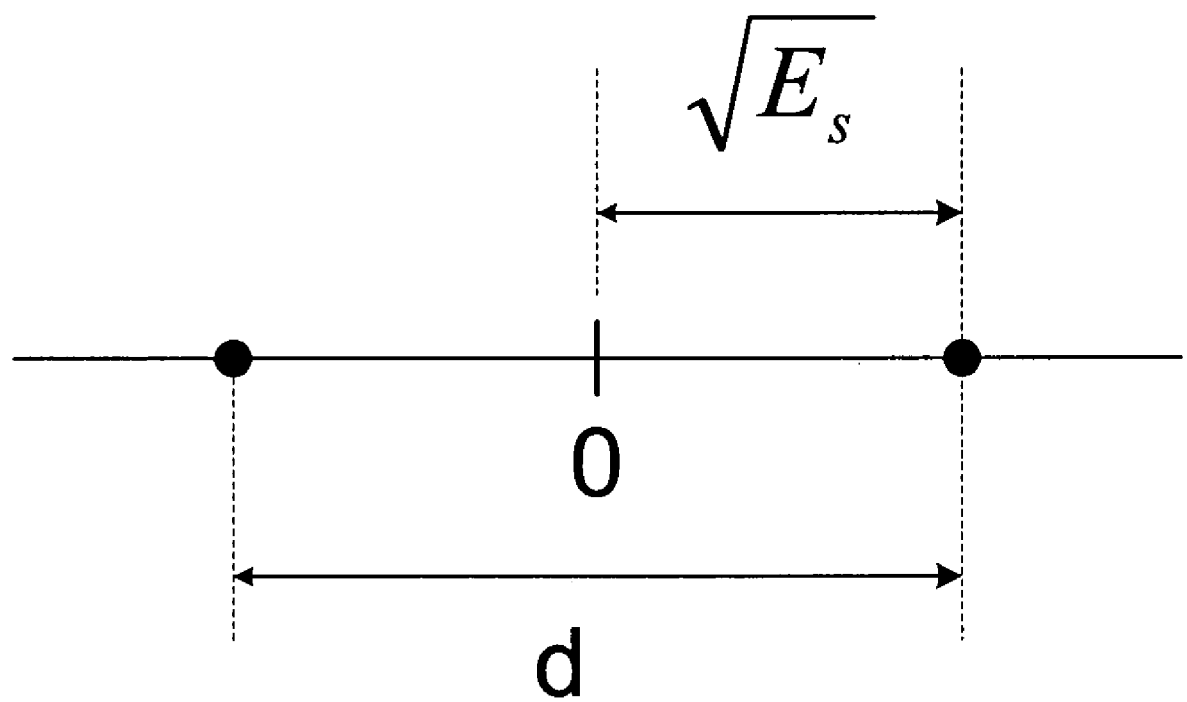
Figure 5A:
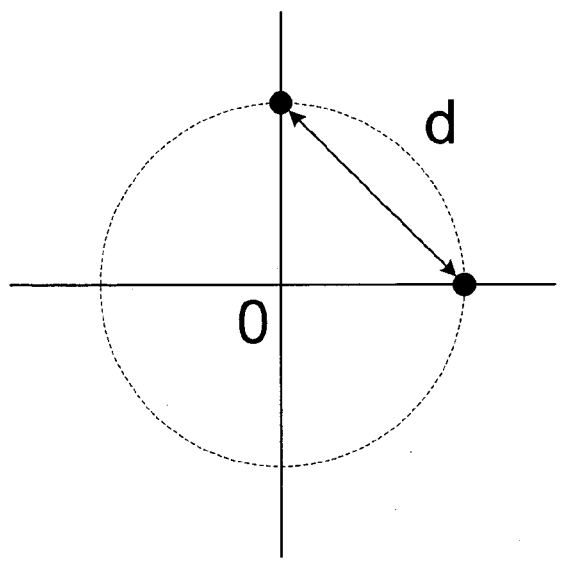
FIGS. 5A–5C are constellation diagrams for pulse position modulation schemes under various conditions for binary pulse position modulation schemes, based on the pulse shown in FIG. 1.
Figure 5B:
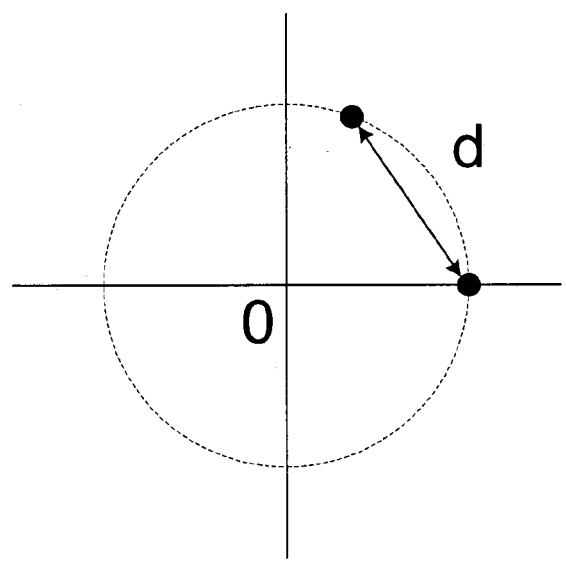
Figure 5C:
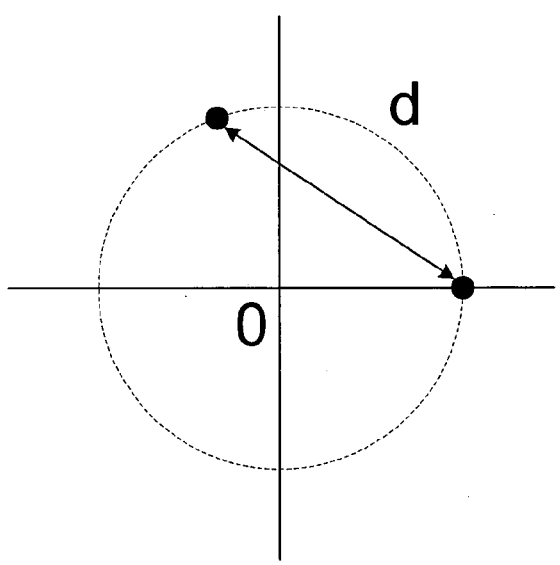

As noted with respect to FIG. 3C, BPSK does not shift the position of the pulses, but rather inverts the pulses to pass data. As shown in the embodiment of FIG. 3C, a pulse is unaltered if it represents a "0" and is inverted if it represents a "1." In either case the position of the pulse remains unchanged.

In most cases, BPSK signals will be superior to PPM signals. One primary reason is how the two methods handle noise. When a signal gets sent from a transmitter to a receiver, it is subjected to a certain amount of noise. This noise rides on top of the data signal and can distort the signal. Some of the noise comes from going through the channel (i.e., the transmission medium). Additional noise comes from the receiver, which has to amplify a very small signal. Such an amplification process inherently introduces noise.

The way to compare individual transmission schemes is to determine the maximum amount of noise allowable before the system exceeds a maximum error rate, In any transmission system some errors will occur, due to noise and other reasons. A given system will set a maximum allowable error rate, which it is designed to compensate for. Beyond this error rate, the system will not achieve a desired level of performance. An exemplary maximum error rate, often called a bit error rate (BER), is one error in a thousand, often described as having a BER of $10^{-3}$.

In the same noise environment, a PPM signal will require twice as much transmit power to achieve the same BER as a BPSK signal. Another way of saying this is that the BPSK signal is superior to the PPM signal by 3 dB (i.e., by a factor of two in power). In other words, for the same amount of power, the BPSK signal will tolerate more noise than a PPM signal. And to tolerate the same amount of noise, the PPM signal would require more power than the BPSK signal.

This analysis assumes Gaussian noise. If the noise were non-Gaussian, the benefits of a BPSK signal might vary (either higher or lower), or might remain the same.

An alternate transmission scheme would be pulse amplitude modulation (PAM), which encodes data through the use of pulses with different amplitude, as described with respect to FIG. 3B. As shown in the embodiment of FIG. 3B, a small pulse is sent to represent a "0" and a large pulse is sent to represent a "1." Regardless, the pulses preferably remain a standard distance from each other.

These are all binary systems, i.e., they encode data as a string of ones and zeroes.

M-ary Systems

The analysis in the Background of the Invention was restricted to binary modulation techniques appropriate for UWB signal generation. There are also a number of ways in which these binary techniques could be extended to larger symbol constellations. A few specific exemplary forms are discussed below.

Such alternative transmission schemes may be called M-ary systems. In this case, M-ary simply means that there are M different choices for encoding data. A binary system is actually an M-ary system where (M=2), i.e., a 2-ary system. Alternate systems could have M equal to four (4-ary), M equal to eight (8-ary), or any other acceptable number. Powers of two are preferable for M since it makes implementation easier, but are not required.

In an M-ary system, each pulse has M different ways that it can be sent to the receiver. For example an M-ary PAM system (called an MPAM system) would have M different pulse voltages that can be used.

An analysis of M-PAM shows that higher order PAM modulation leads to less power efficiency. This is clearly seen by the reduced data rates versus range performance for the larger constellations. However, such a design might be more robust against multipath-induced inter-symbol interference (ISI) due to the longer symbol interval for a given data rate.

The binary PPM technique can also be extended to M-ary orthogonal (or non-orthogonal) PPM by mapping b bits to a single pulse (or pulse train) and using $2^b$ different values for the pulse position. In general M-ary orthogonal signaling will provide better distance properties for higher dimensions, resulting in better power efficiency relative to binary PPM. M-ary PPM can be analyzed by extending the decomposition techniques describe earlier for the binary case. It is known that M-ary orthogonal constellation do have non-zero means and this technique would therefore still result in spectral lines and suboptimal power efficiency.

The most promising extension of binary modulation is to map multiple data bits into bi-orthogonal sequences of bi-phase pulses. This system, called M-ary bi-orthogonal keying (MBOK) involves the mapping of b bits to a group of consecutive bi-phase pulses. MBOK provides improved power efficiency relative to binary antipodal signaling, yet would still not generate spectral lines for white data.

In addition, some of the transmission schemes set forth above could be combined into a single M-ary system. An M-ary BPSK PPAM system could use $$\frac{M}{2}$$

voltages, with the pulses being either non-inverted or inverted to achieve M possible results. Such a system can be referred to as simply M-PAM, e.g., 8-PAM or 4-PAM. The term M-PAM is generally limited to cases where M>2, since a 2-PAM system would be equivalent to a basic BPSK system.

UWB systems preferably transmit at extremely small power levels, but at very wide bandwidths. Thus, although they generally have essentially as much bandwidth as they want, UWB systems must maintain very low power levels to be efficient. Therefore, it's desirable to choose a modulation scheme that is extremely power efficient.

It turns out that M-PAM modulation is less power efficient than BPSK modulation, for example, consider an 8-PAM transmission scheme. Although it appears that such a scheme would be more efficient (after all, it's transmitting three times as much data in a similar transmission using BPSK), it turns out to be less power efficient than BPSK. The reason for this is that an M-PAM modulation scheme requires much higher power levels for many of its pulses.

However, there are more power efficient alternatives for using a BPSK signal at a given frequency, (i.e., number of pulses per unit time) to send more data.

Increased Frequency

In one embodiment it is possible to simply increase the frequency of the transmitted pulses, (i.e., send more pulses per unit time), rather than use an M-PAM (or other) modulation scheme. This will be effective up to the maximum possible transmission frequency of the UWB signal, i.e., the fastest the system can send pulses.

Therefore, the important questions are: how fast can you run the system clock; and how fast can you sent pulses? In many UWB systems the pulses are on the order of one nanosecond in width. In order to send one hundred megabits per second (MBPS) of data, the system must send one bit of data every ten nanoseconds Thus, for a transmission rate of 100 MBPS with each bit of data represented by a single pulse, the system need only send a single 1 ns pulse every 10 ns—a reasonable requirement. This can potentially allow for more pulses to be sent, thus increasing the rate of data transmission. However, this is limited by the size of the pulse and the minimum allowable distance between pulses. Once the pulses are so close that they are only that minimum distance from each other, the system can no longer increase the pulse transmission rate without having pulses collide.

Code Word

An alternative to sending data as individual pulses is to instead represent each bit by a series of pulses. This series of pulses can be called a code word. In a binary system, a set of BPSK pulses will preferably be chosen to represent a "0" and its inverse will preferably be chosen to represent a "1."

Individual pulses are then ordered together into code words to transfer data at a given data rate, with each code word corresponding to one or more bits of information to be transferred. The code words have a code word period $T_{cw}$, indicating the duration of an code word, and a related code word frequency $F_{cw}$. This may correspond to the data rate, though it does not have to. FIGS. 7 and 8 show two examples of code words.

FIG. 7 is a timing diagram showing a one-pulse code word using monopulses according to a preferred embodiment of the present invention. This simplest example has a code word that includes a single pulse. In this case the code word period $T_{cw}$ and the pulse period $T_p$ are the same (i.e., the pulses and the code words are transmitted at the same frequency). As shown in FIG. 7, the non-inverted pulse corresponds to a "1," and the inverted pulse corresponds to a "0." This could be reversed for alternate embodiments.

FIG. 8 is a timing diagram showing a five-pulse code word using monopulses according to a preferred embodiment of the present invention. This embodiment has a code word that includes five binary pulses. In this case the code word period $T_{cw}$ is five times the pulse period $T_p$ (i.e., the code words are transmitted at one-fifth the frequency of the pulses).

In other words:

$$T_{cw} = n * T_p \quad (15)$$

for an n-pulse code word. Thus, the pulse period $T_p$ and number of pulses n per code word determine the period of the code word $T_{cw}$.

As shown in FIG. 8, a particular orientation of the five pulses corresponds to a "1," and the inverse of this orientation corresponds to a "0." The particular choice of pulse orientation and arrangement within the code word is not critical, and can be varied as necessary. What is important is that the "1" and "0" code words are the inverse of each other.

One preferred embodiment includes 13 analog pulses per code word, and sets the pulse frequency $F_p$ at 1.3 GHz (770 ps pulse period $T_p$). This results in a code word frequency $F_{cw}$ of 100 MHz (10 ns code word period $T_{cw}$), which corresponds to a data transfer rate of 100 Mbits of information per second. Another preferred embodiment includes 24 analog pulses per code word, and sets the pulse frequency $F_p$ at either 1.368 GHz or 2.736 GHz (731 ps or 365.5 ps pulse period $T_p$) for each of two bands used. (This is a multiple band approach, as will be described below.) This results in a code word frequency $F_{cw}$ of 57 MHz or 114 MHz (17.54 ns or 8.77 ns code word period $T_{cw}$), depending upon the band.

The various parameters of peak-to-peak pulse width $T_{p-p}$, pulse period $T_p$, pulse frequency $F_p$, number of pulses per code word n, code word period $T_{cw}$, and code word frequency $F_{cw}$ can be varied as necessary to achieve the desired performance characteristics for the transceiver. For example, the embodiments disclosed in FIGS. 7 and 8 have the same code word period $T_{cw}$, despite the differing number of pulses n. This means that the transmission power for a given code word period $T_{cw}$ is used in a single pulse in the embodiment of FIG. 7, but is spread out over five pulses in the embodiment of FIG. 8. Alternate embodiments can obviously change these parameters as needed.

Thus, in the embodiment of FIG. 7, when a transmitter passes a bit of data to a receiver, the transmitter sends the bit as a code word (i.e., a set series of pulses). As noted above, the bits are preferably represented by inverse code words such that the non-inverted code word represents a "1" and the inverted code word represents a "1." However, in alternate embodiments this assignment of code word/inverse code word to "1" and "0" values can be reversed.

In addition, although FIG. 8 shows a code word having five pulses for the sake of simplicity, this number can be varied as needed. In fact, as noted above, 13 or 24 are preferred numbers of pulses per code word. Alternate embodiments can use any code word length that allows system requirements to be met. For example, as clock speeds increase, the number of pulses that can be sent in a given time will increase and longer code word lengths may be used.

One advantage with using a code word is that you can spread out a required transmission power over multiple pulses. For a successful transmission, it's necessary to use a certain amount of energy to send each bit. If the bit is sent in a single pulse, that pulse has to include all of the required energy. This requires a larger pulse and increases the peak-to-average ratio of the signal (i.e., the entire waveform). However, if five pulses are used to send a single bit of data (as shown in the embodiment of FIG. 8), the energy can be spread out among five separate pulses. Thus, each individual pulse can be smaller and can have a lower peak-to-average ratio.

However, using a multiple pulse code word to represent a bit will alter the spectrum of the transmitted signal. And given rules currently promulgated by the Federal Communications Commission (FCC), UWB signals must meet certain power constraints. (See FIG. 2)

Figure 2:
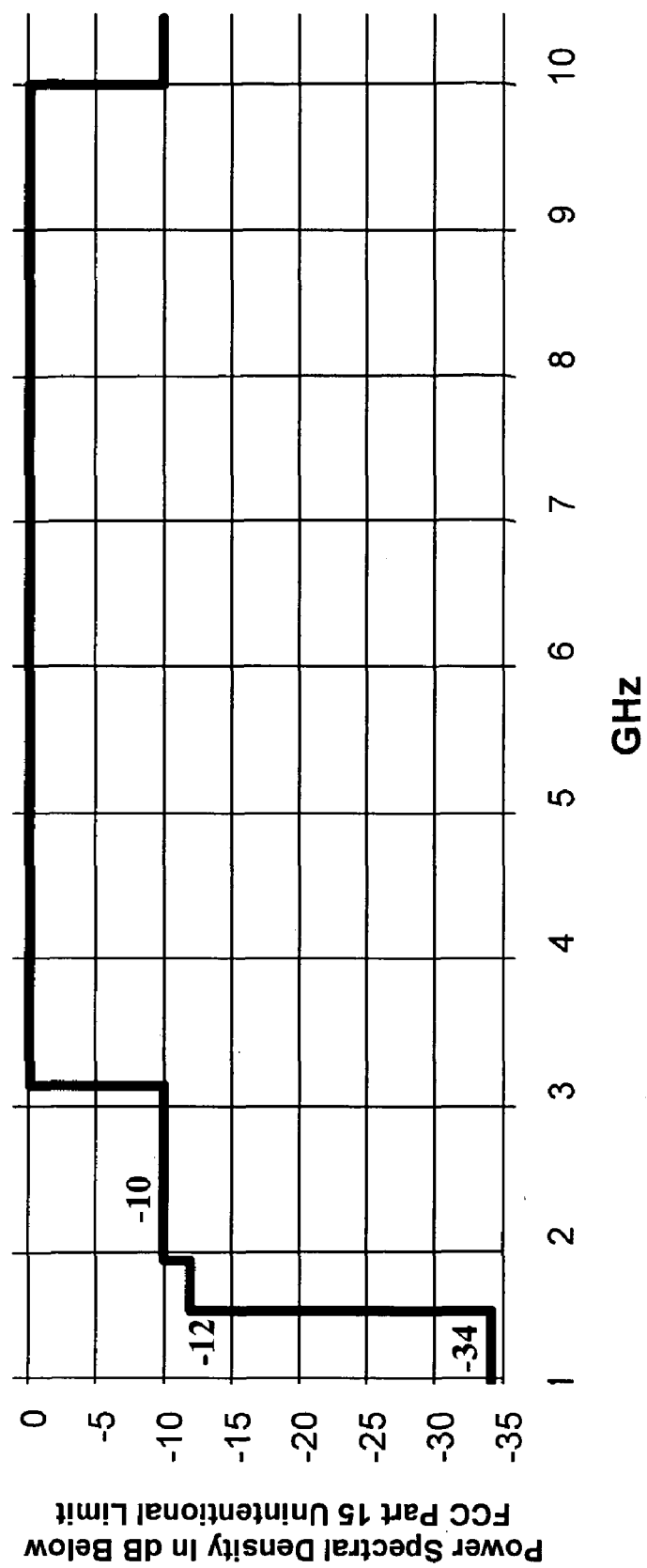
FIG. 2 is a graph showing the power spectral density limits currently put in force by the FCC.

As shown in FIG. 2, UWB signals must fall below a set power maximum for any given frequency. In other words, the energy of the UWB signal cannot exceed the set power maximum at any frequency. Therefore, it is necessary that the UWB signal fit within the power spectrum density requirements set forth in FIG. 2.

For a UWB signal, the amount of energy sent in a transmission is equal to the area under its power spectrum density curve. For the best possible system performance, it's preferable that this area be maximized. In other words, it is desirable to have a signal whose properties fits under the restricted curve, but is arranged to have a maximum possible area.

When a UWB system uses a sequence of pulses to send a bit of data, the power spectrum density ends up looking wavy, with numerous peaks and valleys. The exact waviness of the power spectrum density depends upon the particular sequence of pulses used.

The peaks in the PSD curve can limit the transmission power by limiting the maximum total power transmitted. Since the power spectrum density cannot ever go above the power maximum set by the FCC, the maximum point of the power spectrum density curve can be no higher than the allowable power maximum. If there are too many peaks (and corresponding valleys) in the power spectrum density curve (or even just one big one), the overall area under the power spectrum density curve can be significantly reduced by the presence of one or more large valleys, indicating a lower overall transmission power for the UWB signal. Thus, a smoother power spectrum density curve is preferable because that maximizes the area under the curve.

As it turns out, the more regular the transmitted pulse pattern (i.e., the more predictable patterns are formed in the signal), the greater the number and size of the peaks and valleys in the curve. But if the transmitted pulses appear random (i.e., they have no discernable pattern of "1"s and "0"s), a smoother curve results. And since we want to get as much performance as we can from our assigned channel, it is desirable to use a signal that is smooth. This allows the signal to use a greater amount of power without violating the FCC's PSD constraints.

Alternate Types of Pulses

As noted above with respect to FIG. 1, in one embodiment of a UWB system, pulses (or chips) are short duration pulses formed using a single basic pulse shape (e.g., a monopulse), with the interval between individual pulses being uniform or variable. However, in alternate embodiments pulses can be formed in different ways.

Figure 9:
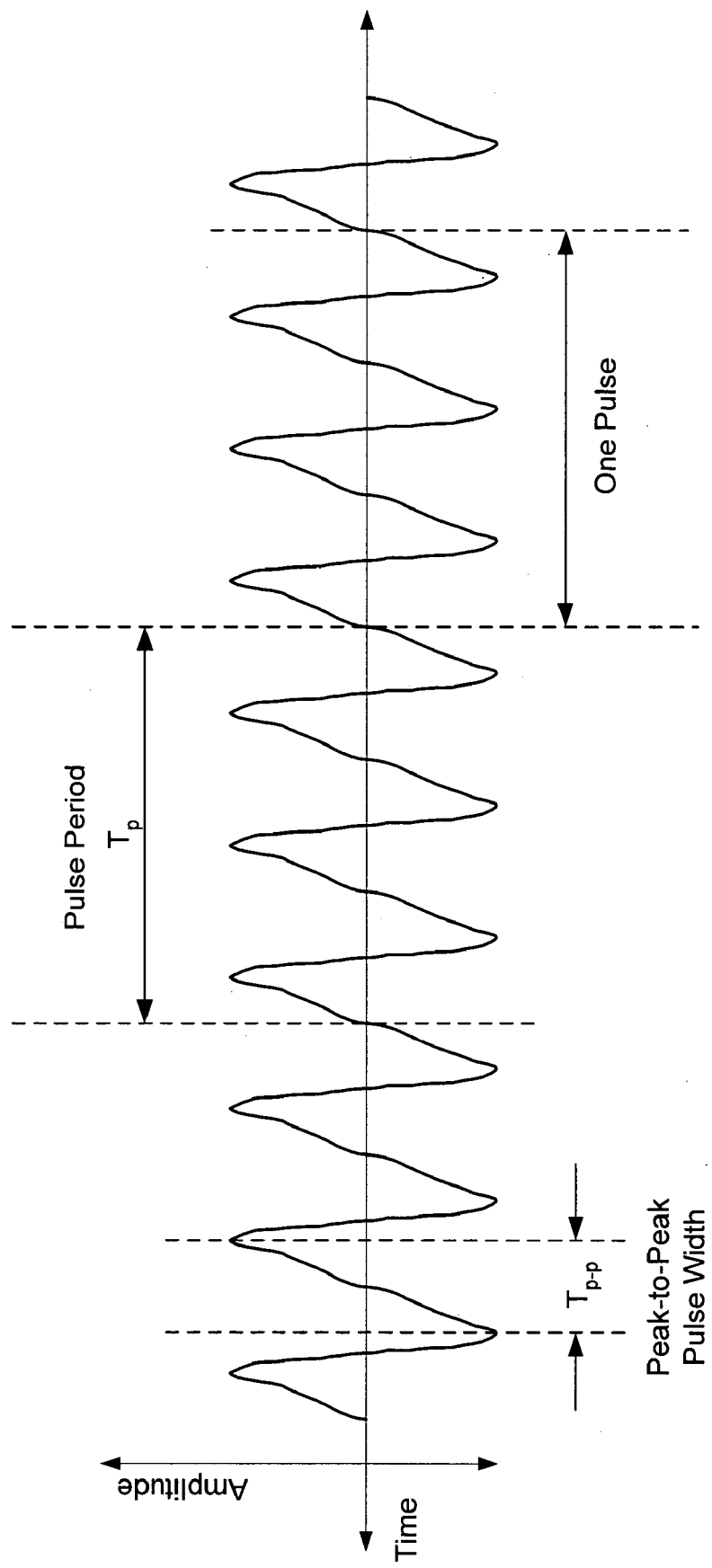
FIG. 9 is a graph of a typical oscillating signal used to form a pulse stream in a preferred embodiment of the present invention.

In another preferred embodiment, portions of an oscillating carrier signal are used as pulses, e.g., three repetitions of the oscillating signal. These portions of the oscillating signal could be treated just as the pulses in FIG. 1, i.e., adjusted in amplitude or phase as shown in FIGS. 3A–3C. An example of a typical oscillating signal used to form a pulse stream in a preferred embodiment of the present invention is shown in FIG. 9. When these sorts of signals are used in a BPSK system, they can be referred to as n-cycle BPSK (e.g., the preferred embodiment of FIG. 9 is a three-cycle BPSK signal that uses three repetitions of a base oscillating signal).

As shown in FIG. 9, the carrier frequency of the oscillating signal (i.e., $1/T_{p-p}$) in this embodiment is three times the chipping rate. In other words, the frequency of the waveform of the oscillating signal is three times the frequency of the pulses used by the network. This allows the network to take advantage of second order statistics that are unique to BPSK systems, and will allow improved acquisition.

Thus, although the embodiment of UWB using monopulses can be called a carrier-less radio system, it is also possible to use a carrier-based system in which segments of the carrier are used to form pulses.

In particular, it means that it will be possible to recover the carrier frequency off of BPSK sidebands by squaring the signal. And since the chipping frequency and the carrier frequency are related to each other, when you get the carrier frequency, you can easily calculate the chipping frequency.

Figure 10B:
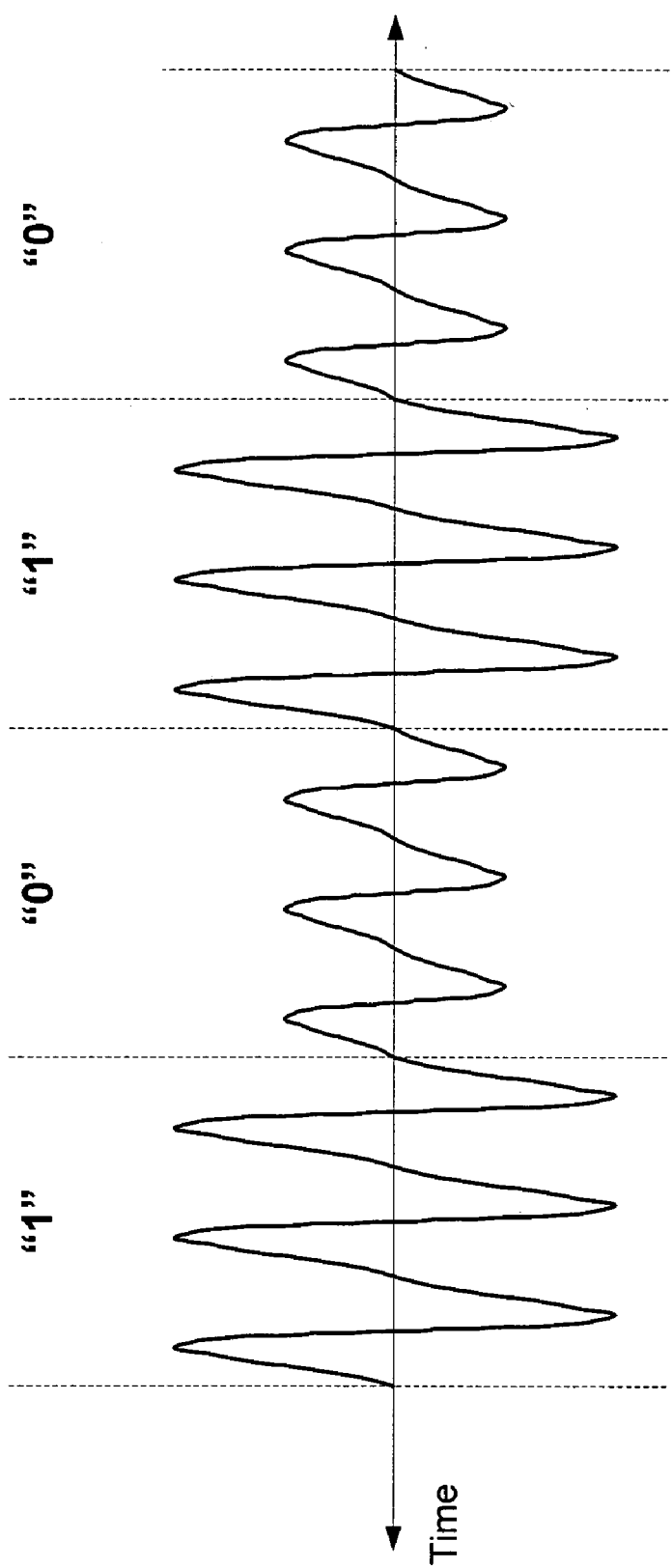
Figure 10C:
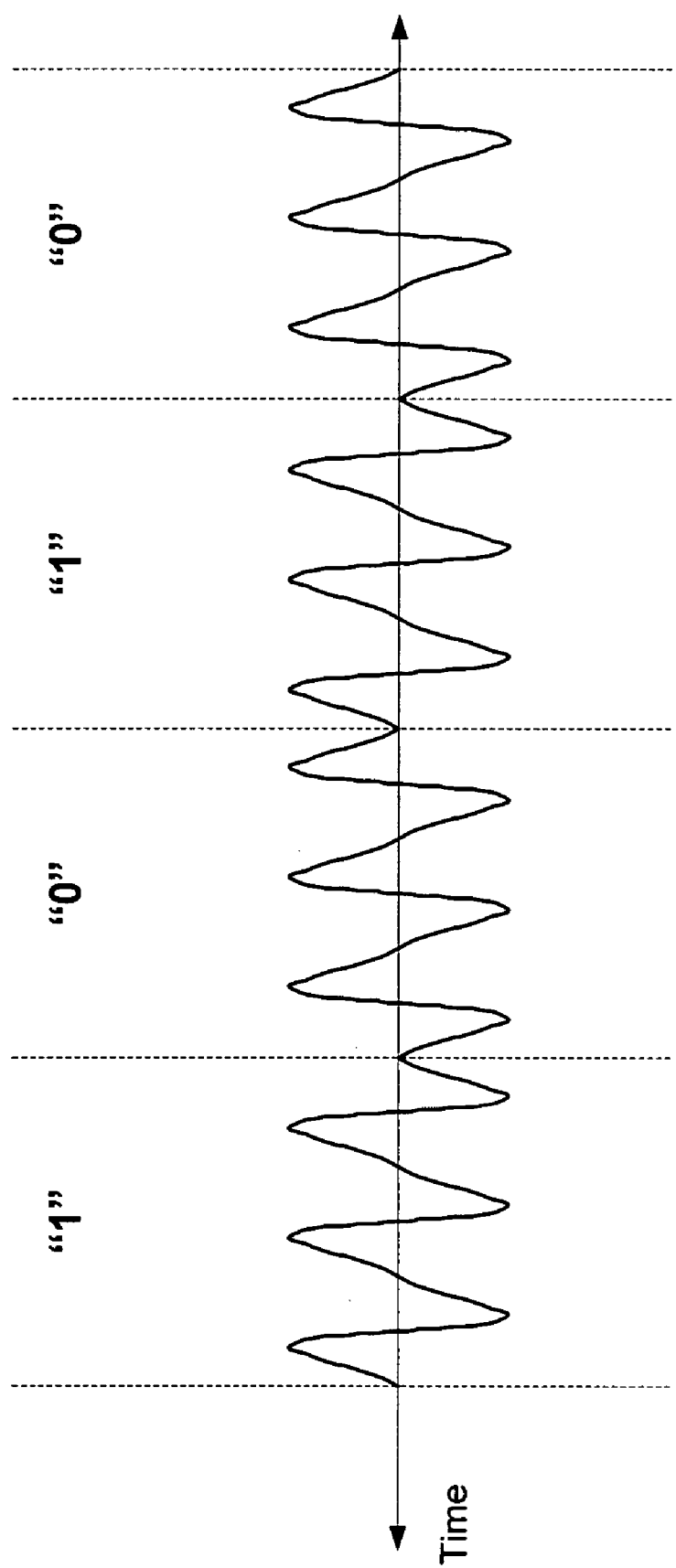

FIGS. 10A–10C are graphs showing exemplary pulse streams for OOK, PPAM, and BPSK modulation schemes, respectively, using portions of an oscillating signal as pulses. In each case, they show a data sequence "1 0 1 0."

As shown in FIG. 10A, OOK defines the data by the presence or absence of a pulse. A "1" is indicated by a pulse, and a "0" is indicated by the absence of a pulse. Thus, the bit stream "1 0 1 0" is indicated by the sequence of: a pulse, a blank where a pulse should be, a pulse, and another blank. This embodiment has $a_k \in \{0,2\}$, i.e., data bits are transmitted by either the presence or absence of a pulse at time $t=t_k$.

As shown in FIG. 10B, PPAM defines the data by the amplitude of the pulse. A "1" is indicated by a large pulse, and a "0" is indicated by a small pulse. Thus, the bit stream "1 0 1 0" is indicated by the sequence of: a large pulse, a small pulse, a large pulse, and a small pulse. This embodiment uses strictly positive values for the two pulse weights, so that $a_k \in \{\alpha_0, \alpha_1\}$ where $0 < \alpha_0 < \alpha_1$.

As shown in FIG. 10C, BPSK defines the data by the polarity of the pulse. A "1" is indicated by a non-inverted pulse, and a "0" is indicated by an inverted pulse. Thus, the bit stream "1 0 1 0" is indicated by the sequence of: a non-inverted pulse, an inverted pulse, a non-inverted pulse, and an inverted pulse. In this embodiment $a_k \in \{-1,+1\}$. This corresponds to transmitting either a non-inverted or an inverted pulse based on the value of the source bit.

Figure 11:
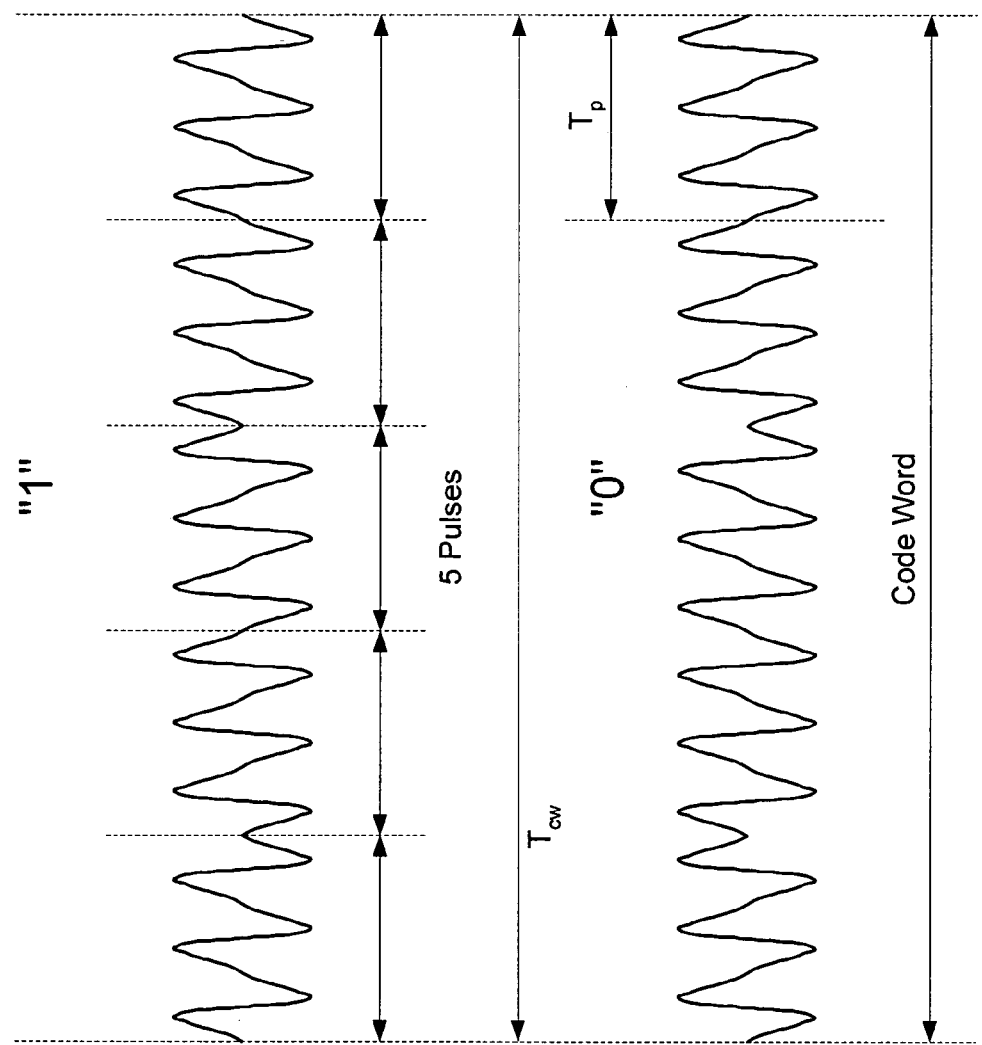
FIG. 11 is a timing diagram showing a five-pulse code word using a repeated oscillating signal pulse, according to a preferred embodiment of the present invention.

Of course, this sort of pulse can also be used to form code words. FIG. 11 is a timing diagram showing a five-pulse code word using repeated oscillating signal pulses, according to a preferred embodiment of the present invention.

This embodiment has a code word that includes five binary pulses. In this case the code word period $T_{cw}$ is five times the pulse period $T_p$ (i.e., the code words are transmitted at one-fifth the frequency of the pulses). In other words:

$$T_{cw} = n*T_p \quad (16)$$

for an n-pulse code word. Thus, the pulse period $T_p$ and number of pulses n per code word determine the period of the code word $T_{cw}$.

As shown in FIG. 11, a particular orientation of the five pulses corresponds to a "1," and the inverse of this orientation corresponds to a "0." The particular choice of pulse orientation and arrangement within the code word is not critical, and can be varied as necessary. What is important is that the "1" and "0" code words are the inverse of each other.

As noted above, although a five-pulse code word is shown for the sake of simplicity, 13-pulse or 24-pulse code words can be used in other preferred embodiments. In addition, in alternate embodiments, any suitable number of pulses can be used to form a code word.

In one preferred embodiment the oscillating signal is a Gaussian monopulse with a peak-to-peak time ($T_{p-p}$) of a fraction of a nanosecond, a pulse period $T_p$ of several nanoseconds, and a bandwidth of several gigahertz.

In alternate embodiments, different values can be used for $T_{p-p}$ and $T_p$. And in embodiments in which more or fewer repetitions are used to designate a pulse, the relationship between $T_{p-p}$ and $T_p$ can also vary.

Ternary Systems

Although the embodiments above show the use of binary values (i.e., 1 and –1) for creating code words, it is also possible to use ternary values (i.e., 1, 0, –1) to create the code words in alternate preferred embodiments. In this case, the code word will be made up not just of a series of non-inverted and inverted pulses, but rather a series of non-inverted pulses, inverted pulses, and zeroed pulses. The zeroed pulses are preferably the absence of either a non-inverted pulse or an inverted pulse.

Figure 12A:
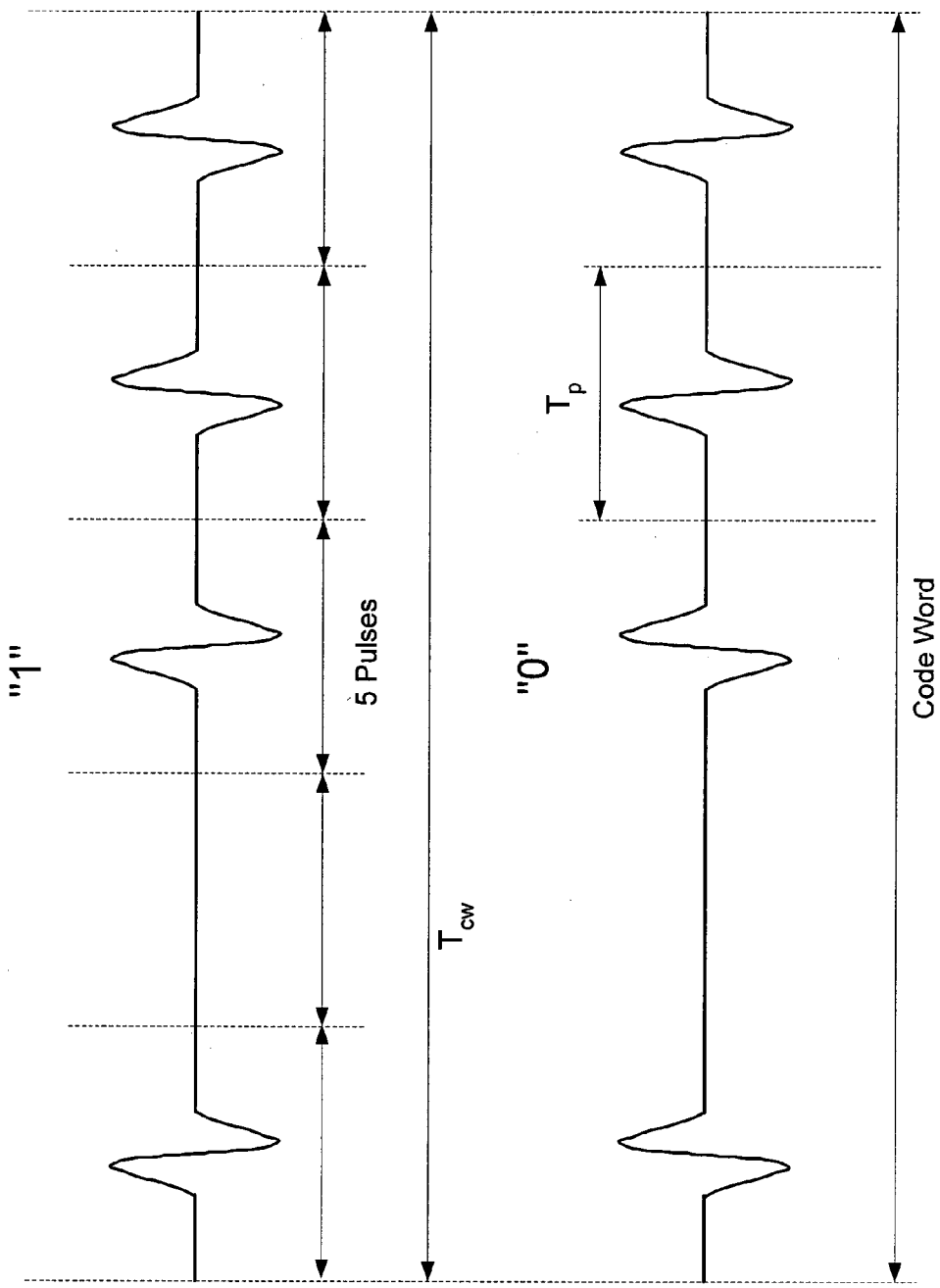

FIGS. 12A and 12B are timing diagrams showing a five-pulse code word using five ternary pulses, according to preferred embodiments of the present invention. FIG. 12A shows an embodiment using waveforms made of monopulses. FIG. 12B shows an embodiment using portions of a continuous oscillating waveform as pulses.

In each of these embodiments the code word period $T_{cw}$ is five times the pulse period $T_p$ (i.e., the code words are transmitted at one-fifth the frequency of the pulses). In other words:

$$T_{cw} = n*T_p \quad (17)$$

for an n-pulse code word. Thus, the pulse period $T_p$ and number of pulses n per code word determine the period of the code word $T_{cw}$.

As shown in FIGS. 12A and 12B, a particular orientation of the five pulses corresponds to a bit value of "1," and the inverse of this orientation corresponds to a bit value of "0." The particular choice of pulse orientation and arrangement within the code word is not critical, and can be varied as necessary. What is important is that the "1" and "0" code words are the inverse of each other.

However, unlike the embodiments shown above, these embodiments use ternary pulses to form a code word. In comparison to a binary pulse, each ternary pulse can have a value of 1, 0, or –1. When performing the inverse function on ternary pulses, a "1" inverts to a "–1," a "–1" inverts to a "1," and a "0" remains a "0".

In the particular embodiments shown, the code word is defined by the five consecutive pulse values of 1 0 1 –1 –1, and the inverse code word is defined by the five consecutive pulse values of –1 0 –1 1 1. In the embodiment of FIG. 12A, these values are imposed on monopulses. In the embodiment of FIG. 12B, these values are imposed on segments of a continuous oscillating waveform.

Other than the fact that the pulse values are ternary rather than binary, they operate just as the code words described above with respect to FIGS. 7, 8, and 11.

For example, although FIGS. 12A and 12B each show a code word having five pulses, this number can be varied as needed. Alternate embodiments can use any code word length that allows system requirements to be met. For example, as clock speeds increase, the number of pulses that can be sent in a given time will increase and longer code word lengths may be used. In three preferred embodiments these code words are 12, 13, and 24 ternary pulses in length.

Also, although the encoding in these embodiments is ternary, not binary, when multiple cycles of an oscillating signal are used to form pulses, this application will still refer to those pulses as n-cycle BPSK pulses.

Avoiding the UNII Band

Although the FCC will freely allow transmissions that do not violate the power spectral density (PSD) limitations shown in FIG. 2, in some embodiments it is desirable to avoid certain areas of the bandwidth available for UWB transmissions. For example, in may be desirable to minimize overlap between UWB signals and the Unlicensed National Information Infrastructure (UNII) band, which occupies the portion of the radio spectrum from 5.15 GHz to 5.825 GHz.

The UNII band is used by such devices as IEEE 802.11a devices, cordless telephones, HiperLAN2 devices, etc. By limiting overlap with this band, a UWB system can both reduce the chance that it will interfere with devices that use the UNII band, and the chance that those devices will interfere with transmissions by the UWB system.

Notches

Figure 13:
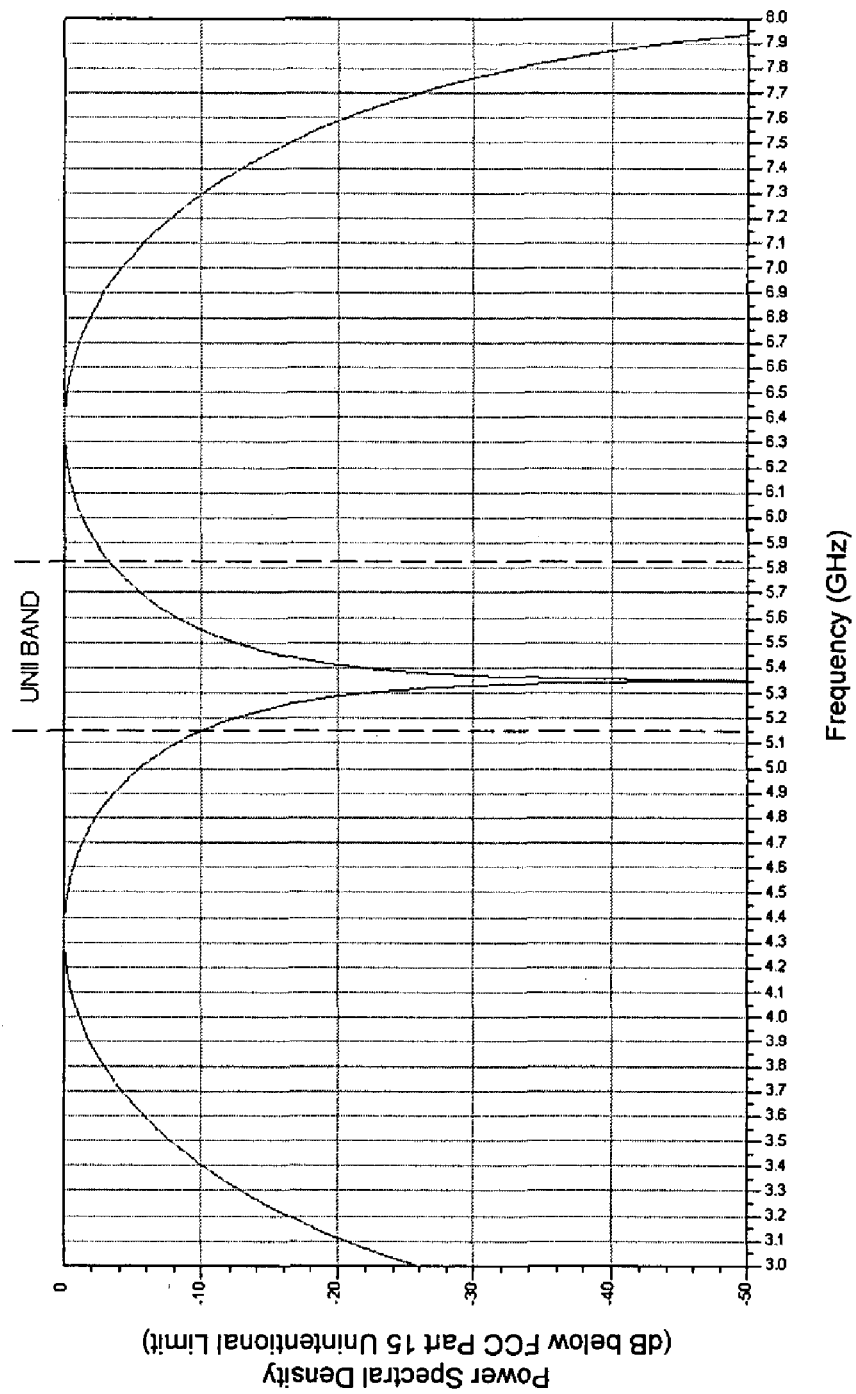
FIG. 13 is a graph of a UWB PSD using a notch according to a preferred embodiment of the present invention.

One way to achieve this is by including a notch in the UWB transmission scheme, the notch operating to minimize the amount of the UWB signal that is transmitted within the UNII band. FIG. 13 is a graph of a UWB PSD using a notch according to a preferred embodiment of the present invention.

As shown in FIG. 13, the notch is placed within the UNII band such that the UWB signal's spectrum falls on either side of the UNII band. This can be achieved by having a UWB system, whose carrier frequency is centered in the UNII band, and which has a notch at the carrier frequency. In this way, an RF spectral notch will fall right in the UNII band. Most preferably, the notch is placed at a frequency slightly lower than the center of the UNII band to give maximum protection to the lower and central portions of the UNII band. This is because most of the UNII band devices operate in the lower or central portions of the band. The upper range of the UNII band is primarily used for outdoor point-to-point links.

Multiple Bands

In addition, although UWB signals across a large spectrum can be formed as a single band, they can also be formed in two or more bands. These separate bands each have a different power spectral density, and would be limited to a subset of the total available bandwidth. By choosing the proper center frequencies, widths, and locations for these multiple bands, the power spectral density (PSD) for the UWB system can be more easily manipulated. For example, certain portions of the available bandwidth can be avoided, or simply used with different PSD parameters than other portions.

Each different overlapping device could then use a separate band. Although the transmissions of the overlapping devices would be sent within the same physical area, the interference each would experience with respect to each other would be limited by the separation of the two bands.

Figure 14:
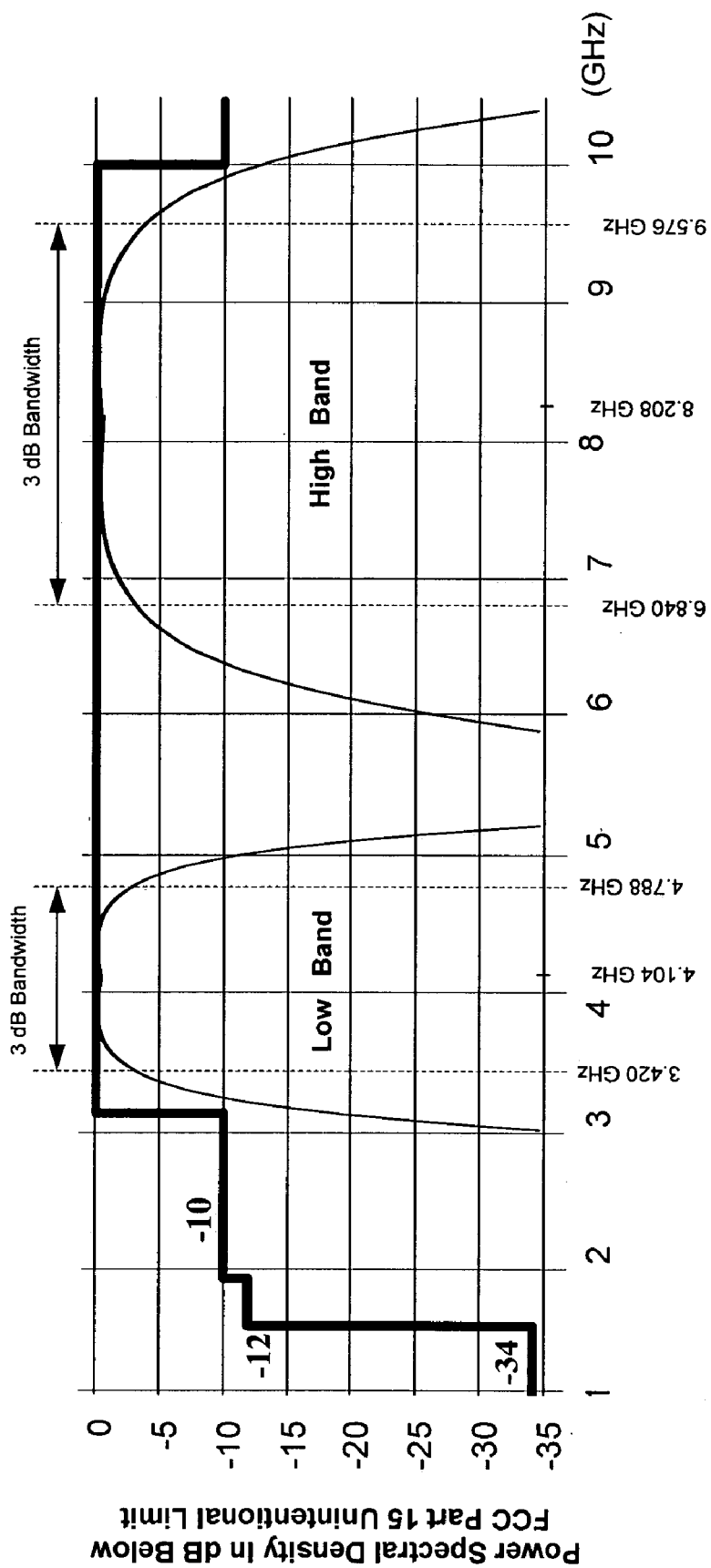
FIG. 14 is a graph of a UWB transmission scheme using two bands according to a preferred embodiment of the present invention.

FIG. 14 is a graph of a UWB transmission scheme using two bands according to a preferred embodiment of the present invention. As shown in FIG. 14, the high band has a center frequency of 8.208 GHz with a 3 dB bandwidth of 2.736 GHz, and the low band has a center frequency of 4.104 GHz with a 3 dB bandwidth of 1.368 GHz.

The high band in FIG. 14 preferably uses pulses that are made up of three iterations of an oscillating signal (e.g., a signal from a sine wave generator) having a frequency of 8.208 GHz (which can be called the high carrier frequency). Similarly, the low band preferably uses pulses that are made up of three iterations of an oscillating signal (e.g., a signal from a sine wave generator) having a frequency of 4.104 GHz (which can be called the low carrier frequency).

By choosing the frequency and placement of each band as they are, the UWB system is set such that both the low band has a −3 dB point at 4.788 GHz, and the high band has a −3 dB point at 6.840 GHz. This gives a gap of 2.052 GHz between the two −3 dB points, just about in the middle of the UNII band. In this way, interference is minimized between the UWB transmissions and any transmissions being made by other devices in the UNII band.

By having the high and low bands located where they are, and of the width they are, the UWB transmission system shown in FIG. 14 limits its interference with any other signals being transmitted in the UNII band, while also providing two separate transmission paths.

Alternate embodiments, however, could use a different number of bands, place the bands differently, and could use different types of oscillating signals to form pulses.

Scaling Up Transmission Rate

In addition, one constant pressure in any transmission scheme, UWB included, is the desire to scale the transmission rate upward, (i.e., send more data bits faster). For example, instead of sending a hundred megabits, we want to send hundreds of megabits.

There are several ways that the data rate can be sped up. One way is to send more pulses through within the same period of time. This would involve either reducing the width of the individual pulses or reducing the spacing between adjacent pulses.

Another way is to use a smaller code word. As you drop pulses off of the code word, the code word takes less time to transmit and thus allows more to be sent in a given time.

Yet another alternative is to use multiple code words to represent more than just a binary bit of data. Rather than just using a code word and its inverse, you could use multiple different code Words, each representing a different combination of multiple bits. For example, if the code word is five pulses long, there are thirty-two different ways that inverted and non-inverted pulses can be combined to form a code word. Counting for the fact that half of these will be the inverse of others, this allows for sixteen possible code words. This potentially allows up to five bits of data to be sent in the time it takes for five pulses to be sent. The receiver can determine which bits of data have been sent by determining which combination of inverted and non-inverted pulses have been received as the code word.

More generally, this system allows for $\log_2(C)$ bits to be sent, where C is the number of code words used. In the example above, if all 32 code words were used, then $\log_2(32)$, or 5 bits could be sent.

However, there are some increased implementation costs with increasing the number of different code words used. Because each receiver has to look for each of the multiple code words used rather than just one, they must each include additional circuitry to do so.

System for M-ary Bi-orthogonal Keying

FIGS. 15A and 15B are block diagrams of transmitter and receiver pairs according to preferred embodiments of the present invention. The transmitter and receiver pair 1500a in FIG. 15A is used to produce binary code words. The transmitter and receiver pair 1500b in FIG. 15B is used to produce ternary code words.

As shown in FIG. 15A, the transmitter receiver pair 1500a includes a transmitter 1510a and a receiver 1520. The transmitter 1510 includes a lookup table 1530, a pulse forming network (PFN) 1535a, an adder 1540, and a transmitting antenna 1545. The receiver 1520 includes a receiving antenna 1550, a front end 1555, and a correlator 1560. As shown in FIG. 15B, the transmitter receiver pair 1500b includes a transmitter 1510b and a receiver 1520. The transmitter 1510 includes a lookup table 1530, a pulse forming network (PFN) 1535b, an adder 1540, and a transmitting antenna 1545. The receiver 1520 includes a receiving antenna 1550, a front end 1555, and a correlator 1560. These two operate in the same manner except for the operation of the PFN 1535a, 1535b in each transmitter 1510a, 1510b.

Transmitter

The lookup table 1530 receives a bit stream, breaks the bit stream up into n-bit groups, and determines the proper code word associated with that particular n-bit group. It then sequentially outputs a series of "1"s and "0"s corresponding to the proper code word. In this embodiment n can be any integer greater than 0. Although this preferred embodiment uses a lookup table 1530, alternate embodiments could use other circuitry to perform this same function.

In the transmitter 1510a or FIG. 15A, the PFN 1535a receives the string of "1"s and "0"s that define the code word from the lookup table 1530 and outputs either a non-inverted or an inverted pulse in response to each input value. In the preferred embodiment, the PFN 1535a receives a clock signal CLK and a code word as inputs, and has non-inverted and inverted outputs. Whenever the clock CLK cycles, the PFN 1535 outputs either a non-inverted pulse at the non-inverted output, or an inverted pulse at the inverted output, depending upon the value of the individual portions of the code word.

In the transmitter 1510b or FIG. 15B, the PFN 1535b receives the string of "1"s, "0"s, and "−1"s that define the code word from the lookup table 1530 and outputs either a non-inverted pulse, a zeroed pulse, or an inverted pulse in response to each input value. In the preferred embodiment, the PFN 1535b receives a clock signal CLK and a code word as inputs, and has non-inverted, zeroed, and inverted outputs. Whenever the clock CLK cycles, the PFN 1535 outputs either a non-inverted pulse at the non-inverted output, a zeroed pulse at the zeroed output, or an inverted pulse at the inverted output, depending upon the value of the individual portions of the code word.

The pulses output from the PFN 1535a, 1535b can be any variety of pulses. In one preferred embodiment, the pulses are individual monopulses. In another preferred embodiment, the pulses are sections from an oscillating signal. Alternate embodiments could use other pulses, if desired, however.

The adder 1540 then adds together the inverting and non-inverting outputs (and zeroed output, if any), only one of which should be active at a time, to provide a single output pulse. In the transmitter 1510a of FIG. 15A, this output pulse will be either a positive (non-inverting) pulse or a negative (inverted) pulse, depending upon the value of the current portion of the code word when the clock CLK cycles. In the transmitter 1510b of FIG. 15B, this output pulse will be either a positive (non-inverting) pulse, a zeroed pulse, or a negative (inverted) pulse, depending upon the value of the current portion of the code word when the clock CLK cycles.

Alternate embodiments of the PFN 1535 could have a single output that outputs either a non-inverted or inverted pulse (or a non-inverted, zeroed, or inverted pulse) depending upon the value of the current portion of the code word. In such embodiments there is no need for the adder 1540.

The output of the adder 1540 is then sent to the transmitting antenna 1545, which transmits the pulses to the receiver 1520.

Receiver

The receiving antenna 1550 receives the pulses in a signal sent by the transmitting antenna 1545 in the transmitter 1510.

The front end 1555 preferably performs necessary operations on the received signal to better allow the remainder of the receiver 1520 to properly process it. This can include performing filtering and amplifying the signal.

The correlator 1560 receives a code word from the front end; determine what n-bit group corresponds to that code word (or inverse code word) and outputs the corresponding n-bit group. The correlator 1560 will have to have as many different branches (called arms or fingers) to look for code words as there are individual code words.

Single Code Word

In its simplest implementation, a single code word can be used to send a bit stream from the transmitter 1510 to the receiver 1520 one bit of data at a time. The transmitter 1510 takes the bit stream, separates the stream into individual bits, chooses a code word/code word inverse based on the bit to be transmitted, and then sends the chosen code word/inverse to the receiver 1520.

The correlator 1560 in the receiver 1520 then needs to check each incoming n-bits to see if they correspond to the code word or its inverse. Since the correlator 1560 needs to look for only one code word, it needs only one arm (i.e., only one set of circuitry devoted to correlating a code word).

Figure 16A:
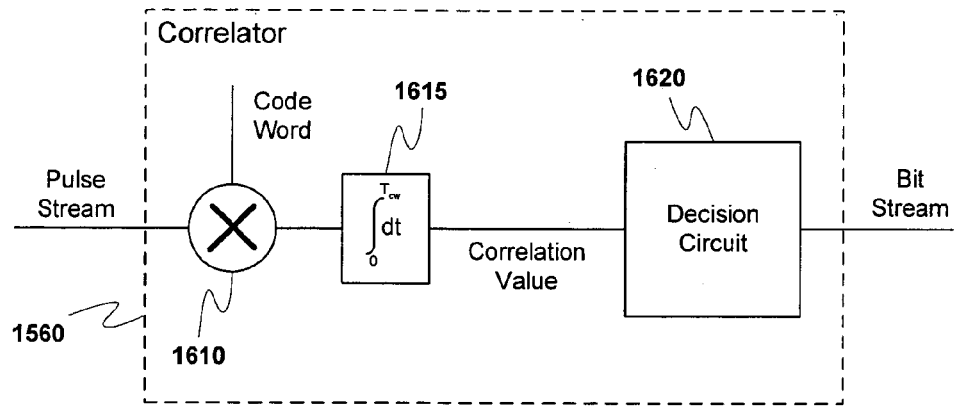
FIG. 16A is a block diagram of the correlator of FIGS. 15A and 15B having one arm according to a preferred embodiment of the present invention.

FIG. 16A is a block diagram of the correlator of FIGS. 15A and 15B having one arm according to a preferred embodiment of the present invention. As shown in FIG. 16A, the correlator 1560 includes a mixer 1610, an integrator 1615, and a decision circuit 1620. The mixer 1610 receives the incoming signal and the code word. It mixes the code word CW and a portion of the incoming signal equal in length to the code word and outputs the result to the integrator 1615.

The integrator 1615 integrates the output of the mixer 1610 over the length of the code word to produce a correlation result. This correlation result will be a large number if the code word is matched or a large negative number if the inverse of the code word is matched. By examining the correlation result, the decision circuit 1620 determines what data bit the code word corresponds to (i.e., a "1" or a "0"), and outputs that data bit to other circuitry in the receiver 1520.

The single input stage (i.e., the mixer 1610) on the correlator 1560 corresponds to the arm of the correlator 1560.

Multiple Code Words

However, as noted above, multiple code words can be used to send multiple bits at the same time. For example, to send two data bits at a time, two different code words should be used. Each code word then represents two bits of data. In this case, if the bit stream to be transmitted were 0111001101001001, the transmitter would break it up into two bit sections as so: (01)(11)(00)(11)(01)(00)(10)(01).

These two bits each represent four different choices, which correspond to the two code words and their inverses. One way this can be implemented is to have the first bit determine which code word will be used, and have the second bit determine whether the chosen code word or its inverse should be used. This exemplary implementation is shown in Table 2.

TABLE 2

Choice of Code Words by Bit Sequence

| Bit Sequence | Code word |
| --- | --- |
| 00 | First code word |
| 11 | Inverse of first code word |
| 01 | Second code word |
| 10 | Inverse of second code word |

The transmitter 1510 takes the bit stream to be sent to the receiver 1520, separates the stream into 2-bit sections, chooses a code word/code word inverse based on the two bits to be sent, and sends the chosen code word/inverse to the receiver 1520.

The correlator 1560 in the receiver 1520 then needs to check each incoming n-bits to see if they correspond to the first or second code word or their inverses. Since the correlator 1560 needs to look for two code words, it needs two arms (i.e., two sets of circuitry devoted to correlating a code word).

Figure 16B:
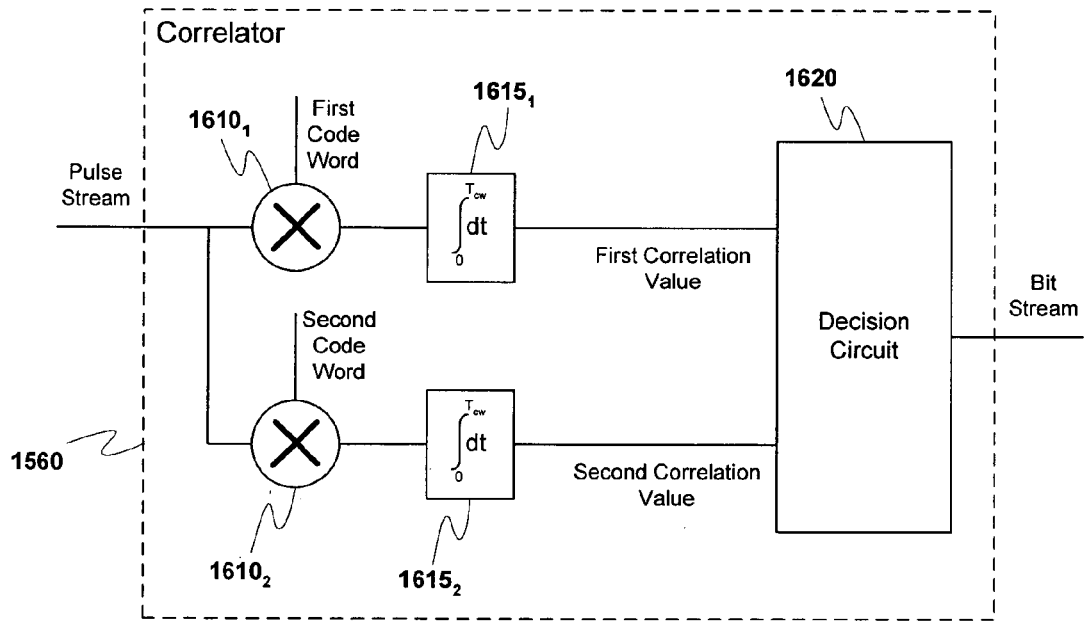
FIG. 16B is a block diagram of the correlator of FIGS. 15A and 15B having two arms according to a preferred embodiment of the present invention.

FIG. 16B is a block diagram of the correlator of FIGS. 15A and 15B having two arms according to a preferred embodiment of the present invention. As shown in FIG. 16B, the correlator 1560 includes first and second mixers $1610_1$ and $1610_2$, first and second integrators $1615_1$ and $1615_2$, and a decision circuit 1620. The mixers $1610_1$, and $1610_2$ each receive the incoming signal and one of the two code words $CW_1$ or $CW_2$. Each mixer $1610_1$, $1610_2$ mixes the respective code word and a portion of the incoming signal equal in length to the code words and outputs the result to the first and second integrators $1615_1$ and $1615_2$, respectively.

The first and second integrators $1615_1$ and $1615_2$ integrate the output of each of the mixers $1610_1$ and $1610_2$ over the length of the code word to produce first and second correlation results, respectively. Each correlation result will be a large number if the code word is matched, a large negative number if the inverse of the code word is matched, or a lower value if neither the code word nor its inverse is matched.

By examining the first and second correlation results, the decision circuit 1620 determines what two data bits the code word corresponds to (i.e., "00," "01," "10," or "11"), and outputs those two data bits to other circuitry in the receiver 1520. This examination can be performed, for example, by setting a threshold for correlation values, above which a correlation is considered successful, by comparing all of the correlation values and picking the largest result as a successful correlation, or a combination of the two.

The double input stage (i.e., mixers $1610_1$ and $1610_2$) on the correlator 1560 corresponds to the two arms of the correlator 1560.

This can be extended beyond the use of two codes. In its general form, a system that sends b bits of data must use a minimum of $(k=2^{(b-1)})$ code words. As the number of code words is increased, however, the receiver still remains relatively simple, merely requiring k arms on its correlator 1560. The receiver 1520 still does not have to look for individual pulses but instead looks for the k different code words in n-pulse increments.

The transmitter 1510 takes the bit stream to be sent to the receiver 1520, separates the stream into n-bit sections (where n is greater than 2), chooses a code word/code word inverse based on the n bits to be sent, and sends the chosen code word/inverse to the receiver 1520.

The correlator 1560 in the receiver 1520 then needs to check each incoming n-bits to see which of the first through $k^{th}$ code words (or inverses) they correspond to. Since the correlator 1560 needs to look for k code words, it needs k arms (i.e., k sets of circuitry devoted to correlating a code word).

Figure 16C:
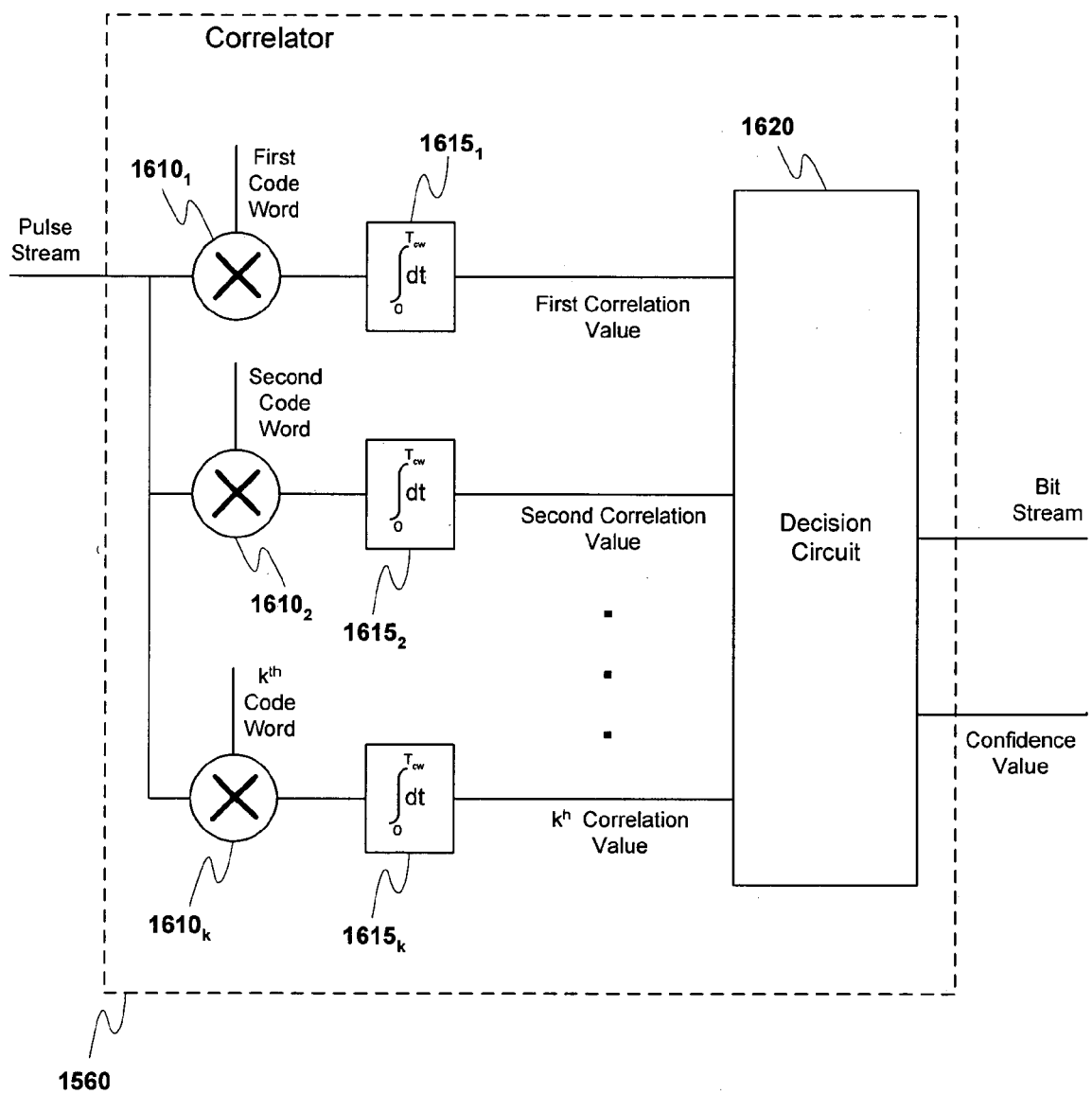
FIG. 16C is a block diagram of the correlator of FIGS. 15A and 15B having more than two arms according to a preferred embodiment of the present invention.

FIG. 16C is a block diagram of the correlator of FIGS. 15A and 15B having more than two arms according to a preferred embodiment of the present invention. As shown in FIG. 16C, the correlator 1560 includes first through $k^{th}$ mixers $1610_1$ to $1610_k$, first through $k^{th}$ integrators $1615_1$ to $1615_k$, and a decision circuit 1620. The mixers $1610_1$ to $1610_k$ each receive the incoming signal and one of the k code words $CW_1$ to $CW_k$. Each mixer $1610_1, \ldots, 1610_k$ mixes the respective code word and a portion of the incoming signal equal in length to the code words and outputs the result to the first through $k^{th}$ integrators $1615_1$ to $1615_k$, respectively.

The first through $k^{th}$ integrators $1615_1$ and $1615_k$ integrate the output of each of the mixers $1610_1$ to $1610_k$ over the length of the code word to produce first through $k^{th}$ correlation results, respectively. Each correlation result will be a large number if the respective code word is matched, a large negative number if the inverse of the respective code word is matched, or a lower value if neither the respective code word nor its inverse is matched.

By examining the first through $k^{th}$ correlation results, the decision circuit 1620 determines what b data bits the code word corresponds to, and outputs those b data bits to other circuitry in the receiver 1520. This examination can be performed, for example, by setting a threshold for correlation values, above which a correlation is considered successful, by comparing all of the correlation values and picking the largest result as a successful correlation, or a combination of the two.

The multiple input stage (i.e., mixers $1610_1$ through $1610_k$) on the correlator 1560 corresponds to the k arms of the correlator 1560.

In each embodiment the correlator 1560 preferably looks for the code words rather than individual pulses. If the correlator 1560 looked for each individual pulse, it would have to make a lot more decisions, since it would check a larger number of individual pulses. The complexity of the system can be significantly reduced by having the correlator 1560 look instead for a long sequence of pulses.

When multiple code words are used, the choice of how the code words are formed becomes important. Although for any given code word size n, there are $2^{(n-1)}$ possible code words to choose from, it turns out that some code words are better than others. One reason for this is the operation of the correlator 1560 in the receiver 1520.

When multiple code words are used, the correlator 1560 has multiple arms (i.e., multiple mixers $1610_1$ to $1610_k$). The decision circuit 1620 has to take the first through $k^{th}$ correlation results from these mixers $1610_1$ to $1610_k$ and compare them to determine which code word (or inverse) was received. By choosing code words that are orthogonal to each other, the function performed by the decision circuit 1620 can be greatly simplified.

As noted above, when a particular code word (or its inverse) sent from the transmitter 1510 is received by the $i^{th}$ mixer 1610$_i$ and is mixed with the respective code word $CW_i$, the $i^{th}$ mixer 1610$_i$ will output a large positive number if the received code word matches the $i^{th}$ code word, and will output a large negative number if the received code word matches the inverse of the $i^{th}$ code word.

If the code words are not orthogonal to each other, then if the received code word does not match the $i^{th}$ code word $CW_i$, the $i^{th}$ mixer will output a non-zero value somewhere between the large negative number and the large positive number. However, if the code words are orthogonal to each other, then if the received code word does not match the $i^{th}$ code word $CW_i$, the $i^{th}$ mixer will output a value of zero.

One way the decision circuit 1620 can decide which correlation value is the correct one (i.e., which indicates the proper code word) is that it examines all of the outputs of the receiver mixers 1610$_1$ to 1610$_k$ and looks for the one that has the largest absolute value. Ideally, the other receiver multipliers should have an output close to zero.

This indicates which of the code words has been received, but not whether it was inverted or not inverted. For this the decision circuit 1620 looks at the sign of the chosen correlation value. If it is positive, then the non-inverted code word has been received; if it is negative, then the inverted code word has been received.

By using orthogonal code words, the system allows the receiver to make a much easier comparison of correlation values, since when the code words are orthogonal, one correlation value will be a large positive or negative number (i.e., the one corresponding the received code word), and all of the other correlation values will be zero (or close to zero, accounting for the presence of noise in the system). Thus, when the absolute value of the output of the correlator corresponding to the received code word is at a maximum, the output of the other correlators will be zero.

Thankfully, orthogonal code sets are not difficult to find. For example, if you have a code word of twelve pulses, (i.e., a length twelve code word), you would have $2^{12}$ or 4096 possible code words. From this set of 4096 possible code words there is at least one set of twelve codes that are mutually orthogonal, as shown in Table 3. Other orthogonal subsets also exist.

TABLE 3

Orthogonal Code Word Set for Length 12 Code Word

| Code Word | $B_0$ | $B_1$ | $B_2$ | $B_3$ | $B_4$ | $B_5$ | $B_6$ | $B_7$ | $B_8$ | $B_9$ | $B_{10}$ | $B_{11}$ |
|---|---|---|---|---|---|---|---|---|---|---|---|---|
| 1  | -1 | 1  | 1  | 1  | 1  | 1  | -1 | -1 | -1 | 1  | 1  | -1 |
| 2  | -1 | -1 | -1 | -1 | -1 | -1 | -1 | -1 | -1 | 1  | 1  | -1 |
| 3  | -1 | -1 | -1 | -1 | 1  | 1  | -1 | -1 | 1  | 1  | -1 | 1  |
| 4  | -1 | -1 | -1 | 1  | -1 | 1  | 1  | 1  | -1 | 1  | -1 | -1 |
| 5  | -1 | -1 | 1  | -1 | 1  | -1 | 1  | 1  | -1 | 1  | 1  | 1  |
| 6  | -1 | -1 | 1  | 1  | -1 | 1  | -1 | 1  | -1 | 1  | 1  | 1  |
| 7  | -1 | -1 | 1  | 1  | 1  | -1 | 1  | -1 | 1  | -1 | -1 | -1 |
| 8  | -1 | 1  | -1 | -1 | 1  | 1  | 1  | 1  | -1 | 1  | 1  | -1 |
| 9  | -1 | 1  | -1 | 1  | -1 | -1 | 1  | -1 | 1  | 1  | 1  | 1  |
| 10 | -1 | 1  | -1 | 1  | 1  | -1 | 1  | -1 | -1 | -1 | -1 | 1  |
| 11 | -1 | 1  | 1  | -1 | -1 | -1 | -1 | 1  | 1  | 1  | -1 | -1 |
| 12 | -1 | 1  | 1  | -1 | -1 | 1  | 1  | -1 | -1 | -1 | -1 | 1  |

Tables 4A–4D show examples of sets of orthogonal 24-bit code words for up to four overlapping networks. Table 4A shows the code words used for the first network; Table 4B shows the code words used for the second network; Table 4C shows the code words used for the third network; and Table 4D shows the code words used for the fourth network.

TABLE 4A

Orthogonal Code Word Set for Length 24 Code Word - Network #1

| Code Word | Associated 24-bit pattern |
|---|---|
| 0000 | -1 1 -1 -1 1 -1 -1 1 -1 -1 1 0 -1 0 -1 -1 1 1 1 -1 1 1 1 -1 -1 -1 |
| 0001 | 0 -1 -1 0 1 -1 -1 1 1 -1 -1 1 1 1 1 -1 -1 1 1 -1 -1 1 1 1 1 |
| 0010 | -1 -1 -1 -1 1 -1 1 -1 1 -1 -1 1 1 -1 -1 1 -1 -1 1 1 1 0 -1 0 1 1 |
| 0011 | 0 -1 1 1 1 -1 -1 -1 -1 -1 -1 -1 1 1 -1 1 -1 1 0 1 -1 1 1 -1 -1 1 1 |
| 0100 | -1 0 1 -1 -1 -1 1 1 1 0 1 1 1 1 -1 1 -1 1 1 1 1 -1 1 -1 -1 1 1 |
| 0101 | -1 0 -1 1 1 -1 1 -1 1 0 1 1 1 1 -1 1 1 1 -1 -1 -1 1 1 1 -1 1 1 1 |
| 0110 | -1 -1 -1 -1 -1 -1 1 1 1 1 0 -1 -1 1 1 1 -1 1 1 -1 1 1 1 1 -1 0 1 |
| 0111 | -1 1 -1 -1 -1 1 1 -1 -1 1 0 -1 1 -1 -1 1 1 -1 0 1 1 1 1 1 -1 -1 -1 1 1 |

TABLE 4B

Orthogonal Code Word Set for Length 24 Code Word - Network #2

| Code Word | Associated 24-bit pattern |
|---|---|
| 0000 | -1 -1 1 0 1 1 1 -1 1 1 -1 1 1 1 -1 1 1 0 1 -1 -1 1 1 -1 1 -1 -1 -1 |
| 0001 | -1 -1 -1 1 -1 -1 -1 1 1 0 1 -1 1 1 1 -1 1 -1 -1 1 1 1 1 0 1 -1 0 1 |
| 0010 | -1 1 -1 1 1 1 -1 1 0 1 1 1 1 -1 -1 1 1 1 -1 1 1 1 1 1 -1 -1 -1 0 -1 |
| 0011 | 0 -1 1 1 1 1 1 -1 -1 1 1 1 1 1 -1 1 1 1 1 1 -1 1 1 -1 -1 1 0 -1 -1 |
| 0100 | -1 1 -1 1 1 -1 -1 -1 -1 -1 -1 1 1 1 1 1 -1 -1 1 1 1 -1 1 0 1 -1 1 0 1 |
| 0101 | -1 1 -1 -1 1 1 0 -1 -1 1 1 1 -1 -1 1 0 1 1 1 1 -1 -1 -1 -1 -1 -1 1 1 -1 1 |
| 0110 | -1 0 1 -1 -1 -1 1 1 -1 1 1 -1 1 1 1 1 1 -1 -1 -1 -1 -1 1 1 -1 0 1 -1 -1 1 |
| 0111 | -1 -1 -1 -1 -1 -1 1 1 1 1 1 0 -1 1 1 -1 1 1 1 -1 1 1 -1 1 0 1 -1 |

TABLE 4C

Orthogonal Code Word Set for Length 24 Code Word - Network #3

| Code Word | Associated 24-bit pattern |
|---|---|
| 0000 | -1 1 -1 1 1 -1 1 0 1 -1 -1 -1 -1 -1 1 -1 -1 1 1 0 -1 -1 -1 -1 -1 1 1 1 1 1 |
| 0001 | -1 -1 1 1 1 -1 -1 -1 -1 -1 -1 1 1 1 0 1 -1 1 1 1 -1 1 1 -1 1 0 -1 1 1 -1 |
| 0010 | -1 -1 -1 -1 1 1 1 1 -1 -1 -1 1 1 -1 -1 -1 1 1 -1 1 -1 -1 -1 1 -1 1 0 1 1 0 1 |
| 0011 | -1 -1 1 1 -1 -1 -1 1 1 1 1 1 1 -1 -1 1 -1 -1 -1 -1 1 1 0 1 1 -1 1 1 -1 1 0 1 |
| 0100 | -1 -1 -1 1 1 -1 -1 1 1 1 1 -1 0 -1 -1 1 1 1 1 1 1 -1 -1 1 1 -1 1 0 1 -1 -1 |
| 0101 | -1 -1 -1 1 0 -1 -1 -1 -1 1 1 1 1 0 1 -1 -1 1 1 -1 -1 1 1 1 1 -1 -1 -1 1 1 |
| 0110 | -1 1 -1 -1 1 1 -1 1 1 1 0 1 1 1 1 0 -1 1 1 1 -1 1 1 1 -1 -1 -1 -1 -1 1 1 1 |
| 0111 | -1 1 1 0 -1 1 1 -1 -1 1 -1 -1 1 1 -1 -1 1 0 1 -1 1 1 1 1 1 -1 -1 -1 -1 1 |

TABLE 4D

Orthogonal Code Word Set for Length 24 Code Word - Network #4

| Code Word | Associated 24-bit pattern |
|---|---|
| 0000 | -1 -1 1 1 1 1 -1 -1 -1 -1 -1 -1 1 0 -1 1 1 -1 1 1 -1 1 1 1 -1 1 1 1 -1 1 0 |
| 0001 | -1 -1 -1 1 1 -1 1 1 1 1 1 -1 1 1 1 -1 1 1 1 -1 -1 1 1 1 1 1 0 0 -1 1 1 |
| 0010 | -1 1 -1 1 1 1 1 1 1 0 -1 -1 -1 -1 1 1 1 -1 1 0 -1 -1 1 1 1 1 -1 -1 -1 1 1 1 -1 |
| 0011 | 0 -1 -1 -1 -1 -1 -1 -1 1 1 1 0 -1 1 1 1 -1 1 1 -1 -1 1 1 1 -1 -1 1 1 -1 1 |
| 0100 | -1 -1 1 1 1 1 -1 -1 1 1 0 -1 1 1 1 1 1 -1 1 1 -1 1 1 -1 -1 1 0 -1 1 1 1 1 1 |
| 0101 | -1 -1 1 1 -1 1 1 -1 -1 -1 -1 1 0 -1 -1 1 1 1 1 -1 1 -1 -1 1 1 1 -1 -1 0 -1 1 1 1 |
| 0110 | -1 1 1 0 1 -1 -1 -1 1 1 1 -1 0 -1 1 -1 -1 1 1 -1 -1 -1 1 1 1 1 1 1 1 1 1 |
| 0111 | -1 -1 -1 -1 1 1 -1 1 1 0 -1 1 1 -1 1 1 1 1 0 1 -1 -1 1 1 1 1 -1 -1 1 1 1 |

Furthermore, since the system uses not only the chosen orthogonal code words, but also their inverses, there are actually twice as many possible codes to choose from.

(Hence the term "bi-orthogonal.") In the example above where twelve code words were chosen, there will actually be twenty-four possible codes—twelve code words and their inverses.

Thus, if you use a length twelve code word and pick eight of the above twelve orthogonal code words (sixteen total possible values, counting inverses), you can send four bits of data at a time. ($16=2^4$)

Stated more generally, if b is the number of data bits you want to send, you need to find a group of $2^{(b-1)}$ mutually orthogonal code words. Adding their inverses, this will give you $2^b$ total codes, which is sufficient to send b bits of data.

In alternate embodiments you could design an orthogonal system that doesn't use inverses. However, then you would need $2^b$ mutually orthogonal codes to send b bits of data, instead of $2^{(b-1)}$ mutually orthogonal codes. Thus, you would need twice as many codes if you don't use their inverses.

In contrast, by using the inverses you can use half as many codes because of the inverses make up the other half. Using inverses also gives slightly better performance and the potential for having no spectral lines.

Within the set of possible code words ($2^p$ combinations of pulses, where p is the number of pulses in the code word), there will be numerous different subsets that are mutually orthogonal. Any of these subsets can be used, provided they have enough elements to pass the required number of data bits. Not surprisingly, the larger the number of pulses in the code word and the smaller the number of data bits sent, the easier it will be to find a useful subset of mutually orthogonal codes.

In alternate embodiments it is also possible to use code sets that are nearly orthogonal. Nearly orthogonal refers to code word sets in which the correlation between different code words from the set gives results that are greater than zero, but are smaller than an acceptable threshold.

This threshold can be determined based on the ability of the correlator to differentiate between a correct code word correlation and an incorrect code word correlation. One possible threshold is a random correlation threshold, which corresponds to the expected correlation value that random noise would give. In other words, using this threshold, a set of codes would be considered nearly orthogonal if the correlation between all combinations of different code words in the set give results that are better than the expected correlation between any of the code words and a set of random bits equal in length to the code word. However, alternate embodiments could use a different threshold.

By allowing the use of nearly orthogonal code sets for the code words, the system greatly increases the available choices for code word sets.

Thus, by using multiple code words, it is possible to send data at a greater speed without sending individual pulses any quicker. For example, if four code words are used (allowing three data bits to be sent at a time), a system that would operated at 100 MBPS with one code word could operate at 300 MBPS without significantly increasing the complexity of the transmission circuitry at all. The price that will have to be paid is to put multiple arms into the correlators in each receiver to look for all these code words at the same time.

Additional Advantages of Having Multiple Correlators

One added advantage of using more than one arm in the correlator 1560 (as shown for example, in FIGS. 16B and 16C) is that other functions of the receiver 1520, 1720 can also make use of these features, For example, during signal acquisition, multiple arms can be used not to look for multiple code words, but to find a single code more quickly, speeding up the acquisition process. Likewise, in a cluttered environment where a signal bounces off walls or other obstructions and as a result the receiver 1520, 1720 receives multiple copies of the same signal (often referred to as multipath), the multiple arms can track different time-displaced versions of the same signal to determine which provides the strongest signal. By tracking the same code with two different arms, the receiver 1520, 1720 can get better performance.

Thus, the multiple arms in the correlator (i.e., the mixers $1610_i$) can be used for fast acquisition, multipath reception, or multiple code words. When the signal is initially being acquired, the multiple arms are used to speed up acquisition. If, after the signal is acquired, the signal quality is low due to the multipath effect, the multiple arms can then be used to track different time-shifted versions of the same signal. If, however, signal quality is good, then the multiple arms can be used to accommodate multiple code words and thereby speed up data transmission.

Thus, the multiple arm structure is configurable into a variety of uses that can improve system speed or performance. And if none of these uses are required, the additional arms of the correlator can be turned off to save power.

Benefits Regarding Analog-to-Digital Converters

Another advantage to this design is that by using multiple arms in each correlator 1560, the receiver need not increase the complexity of the analog-to-digital converters (ADCs) contained in the correlator 1560 as the data rate is increased.

Since the decision circuit 1620 in the correlator 1560 receives an analog correlation signal from each mixer $1610_i$, and outputs a digital data signal to another portion of the receiver 1520, it will have to have at least one ADC to convert the received analog signal to a digital signal.

If the receiver 1520 used a single arm in its correlator 1560 (i.e., a single mixer 1610 checking for correlation with a single code word), the ADC in the decision circuit 1620 would need to operate at the full data transmission speed. For example, if the receiver 1520 was operating at 400 MBPS, the ADC would also have to operate at 400 MBPS—making 400 million decisions every second.

However, if the receiver 1520 used four arms in its correlator 1560 (i.e., four mixers $1610_1$ to $1610_4$ to check for four separate code words $CW_1$ to $CW_4$ at the same time), then it would require four ADCs in the decision circuit 1620, each operating at 100 MBPS—making only 100 million decisions every second. This makes for a simpler design, since it is easier to design lower speed ADCs. As the speed of ADCs increase they have to have a higher performance, be of higher quality, have less distortion, etc. than a lower speed ADC. This is usually more expensive, may take up more chip area, and may require a more expensive processing technology to create than a larger number of slower ADCs. Generally it is better to use multiple slow ADCs than one fast one.

In alternate embodiments it is also possible to make all of the necessary correlation decisions before any analog-to-digital conversion, thus using only one slow ADC.

Scalability

Furthermore, the concept of multiple code words is scalable, with the only limit being the number of correlators required in the receivers. If you want to send b bits at a time, then you need $2^{(b-1)}$ code words and therefore $2^{(b-1)}$ arms in the correlators 1560 of each receiver 1520.

Currently the number of bits b sent at a time is preferably between 2 and 5, i.e., 4 to 16 arms in each correlator 1560.

However, as semiconductor fabrication technology advances, the number of workable correlators in a receiver will expand and the number of usable codes will similarly increase.

Power Efficiency

Another advantage of this design is that it has improved power efficiency. By using M-ary bi-orthogonal keying (MBOK), a transmission will suffer fewer errors for the same amount of noise that's present in the system as compared to BPSK or PPM. This results in a coding gain, i.e., a more power efficient modulation scheme. In other words, for the same amount of errors at the receiver 1520, the transmitter 1510 would use less transmission power. Equivalently for the same amount of transmission power, the receiver 1520 would suffer fewer errors.

In a system that has a set number of allowable errors, e.g., $10^{-3}$ BER, this means that the transmitter 1510 can either transmit at a lower power to achieve that BER, or the signal could be sent over a longer distance before it reached its maximum BER because of the increased power efficiency. In other words, the system is more robust to errors allowing better range and better performance.

Alternative Solutions

As noted above, two alternative solutions for increasing data transmission rate is to either use shorter codes or to push the pulses closer together. However, both of these approaches have very diminishing returns. This is because without using a solution such as multiple code words, if you want to make the bit rate four times as fast, then you have to send four times as many pulses. That requires you to have the system clocks running four times as fast, which takes a lot more power, and power is of paramount importance for any portable device.

The alternative of pushing the pulses closer together also runs into the problem noted above that there is a physical limitation on how close they can be pushed together (i.e., the width of the pulse plus the minimum separation between pulses). Once you reach that point, the speed of the device cannot be increased in that way.

The alternative of picking smaller code words runs into problems of the PSD of the transmission. The shorter the code words, the more repetitive the overall data transmission will be, and the higher the peaks in the PSD of the transmission. Given the restrictions imposed by the FCC (See FIG. 2), it's preferable to keep these peaks as low as possible to maximize the transmission power of the signal. Therefore, as the code words are made shorter, the PSD of the transmitted signal deteriorates.

In addition, as smaller code words are chosen, it will be harder to find groups of mutually orthogonal codes within the set of possible code words. At some point, if the code words are reduced in length enough, it will be impossible to find the requisite number of mutually orthogonal code words.

Pseudo-Random Scrambling

As shown in FIG. 2, the FCC has limited the power spectral density (PSD) of UWB signals. As noted above, it is preferable to keep the PSD of a transmitted signal as smooth as possible to maximize the allowable transmission power for the signals.

One way to smooth out the PSD in a code word implementation is to use very long code words. The longer the code words, the more they will look like random transmissions, and the smoother the PSD curve. However, if the code words are made longer than they need to be, available transmission time will be wasted, reducing the maximum data rate allowed by the system.

This is made even more difficult in an MBOK system by the requirement that the code words chosen must be orthogonal to each other. The code words must be chosen first for their orthogonality, and only then can their average spectrum properties be considered. Given the limited number of mutually orthogonal sets of codes, it can be extremely hard to choose a set of code words that do not result in any sharp peaks in the PSD curve.

One solution to this problem is to multiply the data signal by a pseudo-random sequence to whiten it before transmission. The pseudo-random sequence is a sequence of +1 and −1 values that is predictable and preferably longer than a code word, but looks random (i.e., has no discernable pattern). By multiplying the transmitted code words with this pseudo-random pattern they will be scrambled such that they appear random, but will be scrambled in a way that can be unscrambled at the receiver. This will allow bi-orthogonal keying to be used, but provide acceptable spectrum properties.

The pseudo-random sequence should be either known to both transmitter and receiver, or there should be a deterministic way of producing this pattern, e.g., performing a function that starts from a known sequence, that is known by both the transmitter and the receiver. Thus both the transmitter and the receiver will be able to produce the pseudo-random sequence and the scrambling can be both performed and undone. This will make the scrambling completely transparent to the rest of the system.

Specifically, by multiplying the transmitted code words sequentially by the pseudo-random series of +1 and −1 values, the transmitter will take a string of code words (or inverses) and scramble them into a pseudo random pattern. This will flatten out the spectrum of the transmitted signal, reducing the number of sharp peaks in its PSD. This eliminates the need to worry about the spectrum properties of the chosen code words, since the pseudo-random scrambling eliminates any short-term regularity in those codes, essentially whitening the transmission. Then the receiver reverses the process and obtains the encoded data. Thus, pseudo-random scrambling enables the system use the advantageous properties of bi-orthogonal keying, but with superior power efficiency.

Pseudo-Random Scrambling Circuitry

FIGS. 17A and 17B are block diagrams of transmitter and receiver pairs using pseudo-random scrambling according to preferred embodiments of the present invention. The transmitter and receiver pair 1700a in FIG. 17A is used to produce binary code words. The transmitter and receiver pair 1700b in FIG. 17B is used to produce ternary code words.

As shown in FIG. 17A, the transmitter receiver pair 1700a includes a transmitter 1710a and a receiver 1720. The transmitter 1710a includes a lookup table 1530, a pulse forming network (PFN) 1535a, an adder 1540, a transmitting antenna 1545, a transmitter mixer 1770, a transmitter pseudo-random sequence generator 1775, and a transmitter switch 1778. The receiver 1720 includes a receiving antenna 1550, a front end 1555, a correlator 1560, a receiver mixer 1780, a receiver pseudo-random sequence generator 1785, a receiver switch 1788, and an acquisition circuit 1790. As shown in FIG. 17B, the transmitter receiver pair 1700b includes a transmitter 1710b and a receiver 1720. The transmitter 1710b includes a lookup table 1530, a pulse forming network (PFN) 1535b, an adder 1540, a transmitting antenna 1545, a transmitter mixer 1770, a transmitter pseudo-random sequence generator 1775, and a transmitter switch 1778. The receiver 1720 includes a receiving antenna 1550, a front end 1555, a correlator 1560, a receiver mixer 1780, a receiver pseudo-random sequence generator 1785, a receiver switch 1788, and an acquisition circuit 1790. These two operate in the same manner except for the operation of the PFN 1535*a*, 1535*b* in each transmitter 1710*a*, 1710*b*.

The elements in FIGS. 17A and 17B that are the same as FIGS. 15A and 15B operate in the same or similar manner and so their description will not be repeated.

The Transmitter

The transmitter pseudo-random sequence generator 1775 operates to generate a long pseudo-random sequence. In the preferred embodiment, the transmitter pseudo-random sequence generator 1775 is a shift register that has the pseudo-random sequence entered into it. More specifically, in the preferred embodiment the transmitter pseudo-random sequence generator 1775 is a liner feedback shift register.

In this embodiment, the transmitter pseudo-random sequence generator 1775 has a number of storage locations that contain the long, pseudo-random sequence (i.e., a long string of pseudo-random +1 and −1 values). In a preferred embodiment the transmitter pseudo-random sequence generator 1775 contains between fifteen and thirty entries, though it may have more or fewer in alternate embodiments.

The pseudo-random sequence is shifted through the pseudo-random sequence generator 1775 each time the lookup table 1530 outputs a pulse, and the top entry is multiplied with the output of the lookup table 1530 at the transmitter mixer 1770. (Preferably this is an XOR operation.) The transmitter pseudo-random sequence generator 1775 (i.e., the shift register) may also have one or more feedback taps that help make the sequence appear more random. These feedback taps allow a bit from within the shift register to combined with the ending bit being cycled back to the beginning of the shift register. This feedback can help make the pseudo-random sequence of "1"s and "0"s appear more random without becoming any less predictable for the receiver 1720.

In alternate embodiments a different circuit could be used as the transmitter pseudo-random sequence generator 1775. For example, the transmitter pseudo-random sequence generator 1775 could be a circuit that performs a known function that outputs a pseudo-random sequence.

It is preferable that the transmitter 1710 also have the capability to control when the pseudo-random sequence is provided to the transmitter mixer 1770. To this end, the transmitter switch 1778 is provided. When the transmitter switch 1778 is open, the transmitter mixer 1770 passes the pulses from the lookup table 1530 to the PFN 1535*a*, 1535*b* unchanged (i.e., it multiplies them by a constant value of +1). When the transmitter switch 1778 is closed, however, the pulse stream from the lookup table 1530 is multiplied by the pseudo-random sequence from the transmitter pseudo-random sequence generator 1775. One reason for this is that some transmissions need not be sent with a pseudo random element added.

However, when the transmitter switch 1778 is closed, the code words output by the lookup table 1530 will be whitened by the pseudo-random sequence stored in the transmitter pseudo-random sequence generator 1775 before they are transmitted by the transmitting antenna 1545.

Although FIGS. 17A and 17B show that the pseudo-random sequence is introduced between the lookup table 1530 and the PFN 1535*a*, 1535*b*, in alternate embodiments it could also be introduced after the PFN 1535*a*, 1535*b*. However, for implementation reasons, it is preferable that the pseudo-random element be added before the pulses are generated.

One time when the transmitter 1710*a*, 1710*b* and receiver 1720 may not use pseudo-random scrambling is during signal acquisition. When a data packet is first sent from a transmitter to a receiver, a certain period of time will be spent synchronizing the two devices up.

FIG. 18 is a block diagram of a data packet according to a preferred embodiment of the present invention. As shown in FIG. 18, the packet 1800 includes a preamble 1810, a header 1820, and data 1830. Each portion of the packet is made up of a series of pulses representing the bits of data in that portion of the packet 1800.

In the preamble 1810, the transmitter 1510 sends a known sequence of signals (e.g., a pattern of one particular code word and its inverse). The receiver 1520 listens for this known sequence in order to properly lock onto the signal from the transmitter 1510. No substantive data is sent in the preamble 1810 since the receiver 1520 is still getting its timing synchronized with that of the transmitter 1510. The header 1820 includes information about the intended recipient of the packet 1800 and other identifying information. The data 1830 includes the substantive data being transmitted by the packet 1800.

Preferably, the preamble 1810 is not scrambled with a pseudo-random sequence, but the header 1820 and the data 1830 are scrambled. This is because for proper synchronization to occur, the receiver 1520 must know what the preamble sent by the transmitter 1510 looks like. This would not be possible if the preamble 1810 were scrambled and the receiver did not yet have information (contained in the preamble 1810) necessary to descramble it.

Thus, in this embodiment the transmitting switch 1778 is kept open while the preamble 1810 is being sent, and is closed when the header 1820 and data 1830 are being sent. Likewise, the receiving switch 1788 will be kept open while the preamble 1810 is being received, and is closed when the header 1820 and data 1830 are being received.

The Receiver

The receiver pseudo-random sequence generator 1785 generates the same long pseudo-random sequence contained in the transmitter pseudo-random sequence generator 1775. In the preferred embodiment, the receiver pseudo-random sequence generator 1785 is also a shift register, more preferably a linear feedback shift register. The pseudo-random sequence is preferably generated and entered into the receiver pseudo-random sequence generator 1785. The receiver shift register has a number of storage locations that contain the long, pseudo-random sequence (i.e., a long string of pseudo-random +1 and −1 values). In a preferred embodiment the receiver shift register contains between fifteen and thirty entries, though it may have more or fewer in alternate embodiments.

The pseudo-random sequence is shifted through the receiver pseudo-random sequence generator 1785 each time a pulse is received from the front end 1555, and the top entry is multiplied with the output of the front end 1555 at the receiver mixer 1780. (Preferably this is performed with an XOR function.) The receiver shift register may also have one or more feedback taps that help make the sequence appear more random. These feedback taps have a bit from within the shift register combined with the ending bit being cycled back to the beginning of the shift register. As a result the receiver pseudo-random sequence generator 1785 outputs a pseudo-random sequence of "1"s and "0"s to the receiver mixer 1780.

The operation of the receiver pseudo-random sequence generator 1785 is synchronized with the operation of the transmitter pseudo-random sequence generator 1775 such that they both output the same pseudo-random sequence. Thus, although the sequence appears random, it is also deterministic.

As with the transmitter pseudo-random sequence generator 1775, in alternate embodiments a different circuit could be used as the receiver pseudo-random sequence generator 1785. For example, the receiver pseudo-random sequence generator 1785 could be a circuit that performs a known function that outputs a pseudo-random sequence.

It is preferable that the receiver 1720 also have the capability to control when the pseudo-random sequence is provided to the receiver mixer 1780. To this end, the receiver switch 1788 is provided. When the receiver switch 1788 is open, the receiver mixer 1780 passes the pulses from the front end 1555 to the correlator 1560 unchanged (i.e., it multiplies them by a constant value of +1). When the receiver switch 1788 is closed, however, the pulse stream from the front end 1555 is multiplied by the pseudo-random sequence from the receiver pseudo-random sequence generator 1785 before it is sent to the correlator 1560. One reason for this is that some signals have been sent with no pseudo random element added (e.g., the preamble 1810).

Thus, when the receiver switch 1778 is closed, the code words received at the receiver antenna 1550 and processed by the front end 1555 will be descrambled by the pseudo-random sequence output by the receiver pseudo-random sequence generator 1785 before they are correlated by the correlator 1560.

Although FIGS. 17A and 17B show that the pseudo-random sequence is introduced between the front end 1555 and the correlator 1560, in alternate embodiments it could also be introduced before the front end 1555. However, for implementation reasons, it is preferable that the pseudo-random element be added after the received pulses are amplified.

As noted above, when the signal coming into the receiver 1720 is scrambled (e.g., during the header 1820 and the data 1830 portions of packet 1800), the receiver 1720 will have to reverse the pseudo-randomization of the pulses in the signal.

The receiver 1720 accomplishes this based on information received during the unscrambled preamble 1810. During the preamble 1810 of a given packet 1800, the acquisition circuit 1790 in the receiver 1720 performs several functions. First, it locks onto the timing of the incoming signal by identifying a known sequence of pulses contained in the preamble 1810 (e.g., one of the code words and its inverse). Based on this timing information, the acquisition circuit 1790 then determines where the boundaries between code words are. Finally, it determines when the preamble 1810 ends and the header 1820 begins, and instructs the receiver switch 1788 to close so that the incoming pseudo-random stream of pulses can be descrambled, and instruct the pseudo-random sequence generator 1785 to begin. The receiver switch 1788 will then be opened after the last of the data is received, to await a new packet.

As noted above, the receiver pseudo-random sequence generator 1785 outputs the same pseudo-random stream of +1 and −1 values as the transmitter pseudo-random sequence generator 1775. Since the receiver pseudo-random sequence generator 1785 starts at the same position as the transmitter pseudo-random sequence generator 1775, the operation of the receiver pseudo-random sequence generator 1785 will undo the scrambling caused by the transmitter pseudo-random sequence generator 1775.

After being multiplied by the corresponding value from the pseudo-random stream in the receiver mixer 1780, the data stream will be back to the way it was before being multiplied by the corresponding value from the pseudo-random stream in the transmitter multiplier 1770. If the value from the pseudo-random stream was +1, then the pulse will be unchanged by either operation; if the value from the pseudo-random stream was −1, then the pulse will be inverted by the first operation and returned to normal by the second operation.

The conceptual block diagram of FIG. 17A could be used with three-cycle BPSK (i.e., using a pulse of three cycles of an oscillating signal). The generation of the three-cycle wavelet in the transmitter and the demodulation of the three-cycle wavelet in the receiver are performed in the PFN 1535a, and the correlator 1560, respectively.

A random overlay cover code using the wavelets of +1 and −1 for the code could also be used for ternary M-BOK code words. In preferred embodiments the cover code will always be binary (i.e., it will use values of ±1), and not ternary, regardless of the underlying code words.

Operation of the Transmitter and Receiver

Figure 19:
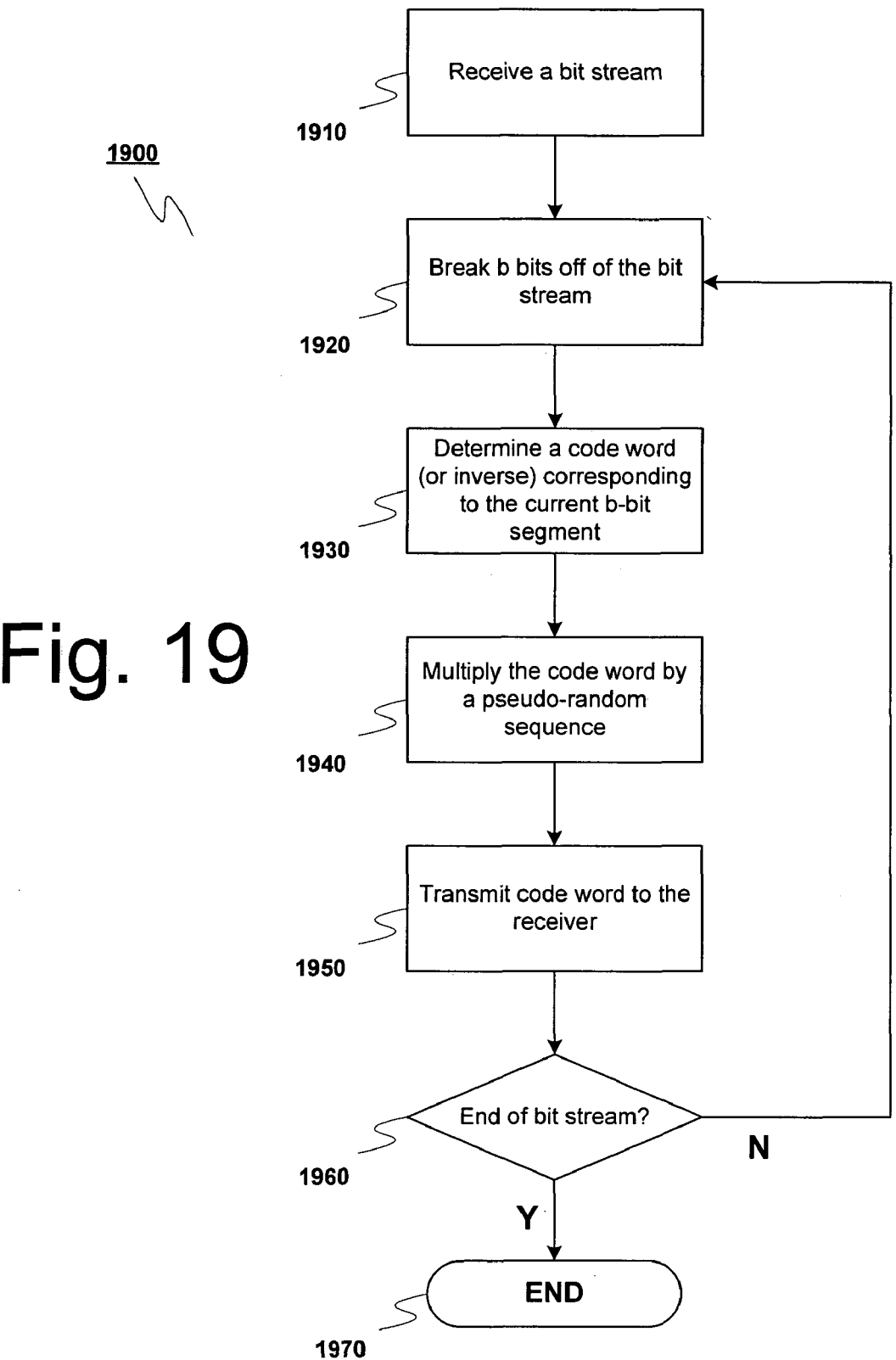
FIGS. 19 and 20 are flow charts describing the operation of the transmitter and receiver, respectively, according to a preferred embodiment of the present invention.
Figure 20:
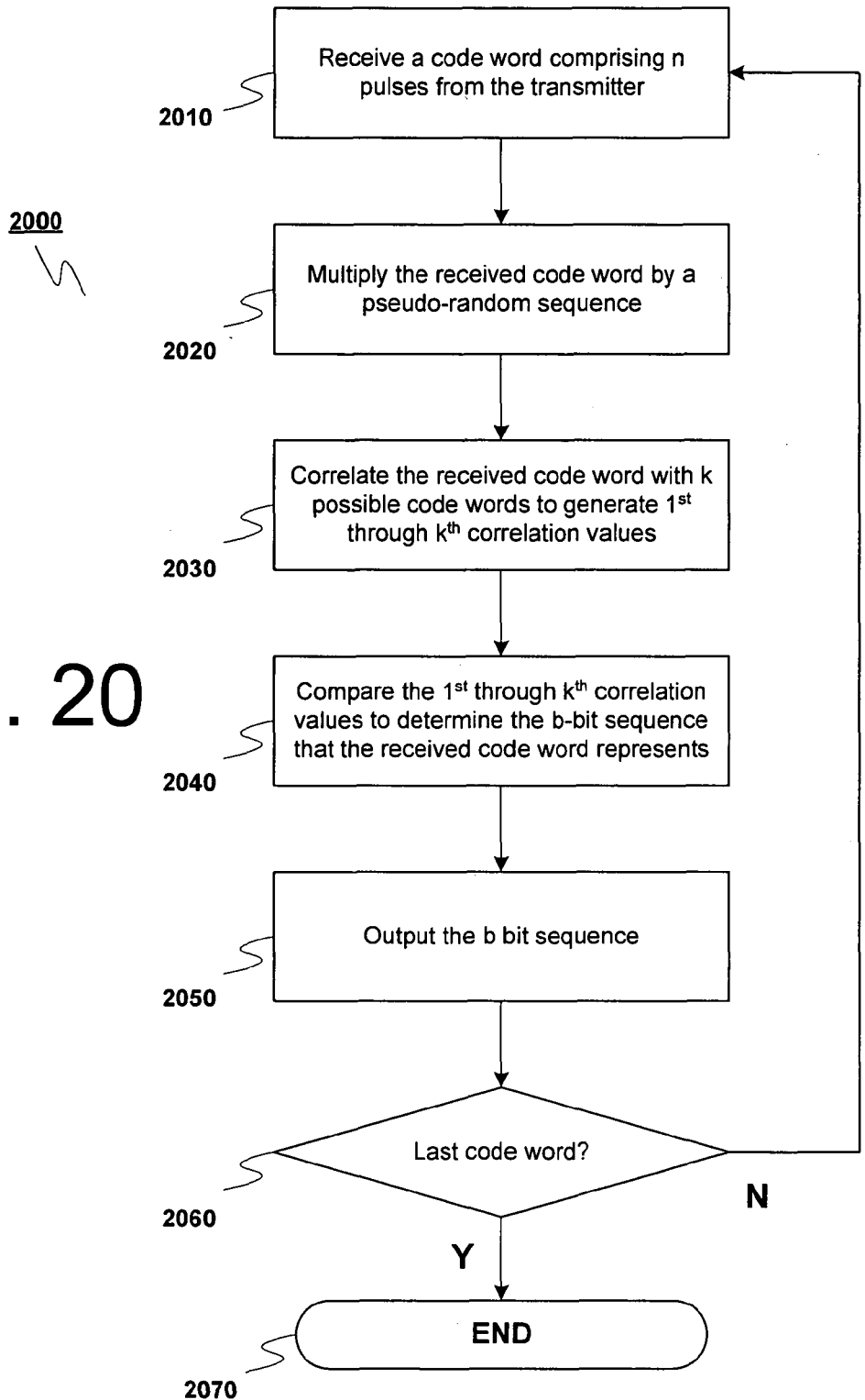

FIGS. 19 and 20 are flow charts describing the operation of the transmitter and receiver, respectively, according to a preferred embodiment of the present invention.

As shown in the flow chart of FIG. 19, the process begins when the transmitter 1510a, 1510b, 1710a, 1710b (See FIGS. 15A, 15B, 17A, and 17B) receives a bit stream. (Step 1910) The transmitter 1510a, 1510b, 1710a, 1710b then breaks b bits off of the bit stream (Step 1920) and determines a code word (or code word inverse) that corresponds to the current b-bit segment from the bit stream. (Step 1930)

If pseudo-random scrambling is to be used on the current code word, the transmitter 1510a, 1510b, 1710a, 1710b then multiplies the code word by a predictable pseudo-random sequence. (Step 1940) In embodiments where no pseudo-random scrambling is used (e.g., the embodiments shown in FIGS. 15A and 15B), or in portions of a packet where no pseudo-random scrambling is used, the transmitter 1510a, 1510b, 1710a, 1710b can omit this step.

The transmitter 1510a, 1510b, 1710a, 1710b then transmits the code word (scrambled or unscrambled) to the receiver 1520, 1720 (See FIGS. 15A, 15B, 17A, and 17B). (Step 1950)

Once this is done, the transmitter 1510a, 1510b, 1710a, 1710b then determines whether there are any more bits left in the bit stream. (Step 1960) If there are, it returns to Step 1920 and breaks off another b bits. If the bit stream has ended, then the transmission process ends. (Step 1970)

As shown in FIG. 20, the receiver 1520, 1720 begins by receiving n pulses transmitted by receiving a code word, comprising n pulses, from the transmitter 1510a, 1510b, 1710a, 1710b. (Step 2010)

If pseudo-random scrambling has been used on the received code word, the receiver 1720 then multiplies the received code word by a predictable pseudo-random sequence. (Step 2020) In embodiments where no pseudo-random scrambling is used, or in portions of a packet where no pseudo-random scrambling is used, the receiver 1720 can omit this step.

The receiver 1520, 1720 correlates the received code word with k possible code words to generate $1^{st}$ through $k^{th}$ correlation values (Step 2030), and then compares the $1^{st}$ through $k^{th}$ correlation values to determine the b-bit data sequence that the received code word represents. (Step 2040)

The receiver 1520, 1720 then outputs this b-bit data sequence (Step 2050) and determines whether there is another code word to receive. (Step 2060) If there is another code word, the receiver 1520, 1720 returns to Step 2010 and receives the next code word. If there are no more code words to receive, the reception process ends. (Step 2070)

Subrates

In alternate embodiments it is also possible to use subrate codes to increase the $E_b/N_o$ for the transmitted signals. In this case the MBOK codes (e.g., the ones shown in Table 3) are concatenated with an appropriate overlay code. In other words, a 1/n subrate will have n overlay code elements, each a 1 or a −1. In operation, n sequential code words will be provided, each multiplied by the corresponding overlay code element.

This effectively extends the length of a basic code word by 2 or 4, which makes the symbol longer, which gives more energy per symbol. This can provide 3 dB or 6 dB, respectively, of additional $E_b/N_o$, which can translate into greater range. The cost of this is a reduction in rate of data transfer.

For example, if code word 1 from Table 2 were used with the ½ overlay code of Table 5, the code word would be repeated twice, once multiplied by 1, and once multiplied by −1 to obtain: −1 1 1 1 1 1 −1 −1 −1 1 1 −1 1 −1 −1 −1 −1 −1 1 1 1 −1 −1 1 as a subrate code.

TABLE 5

Subrate Overlay Codes

| Subrate Factor | Overlay Code |
| --- | --- |
| ½ | 1 −1 |
| ¼ | 1 1 −1 −1 |

Although 1 1 −1 −1 is shown as an overlay code for a subrate of ¼, alternate embodiments could use and overlay code of 1 −1 1 −1.

Carrier Offset

In embodiments that use segments of a continuously generated oscillating signal it is also possible to include a carrier offset to the code words used for multiple overlapping networks. In this case, a basic frequency used for the oscillating signal (called a carrier frequency) is offset for each of the networks by a unique offset value. Thus, each network will have nearly the same carrier frequency for its pulses, but none will be identical.

Tables 6A and 6B show examples of carrier offset values as they are used in preferred embodiments of the present invention. Table 6A shows an embodiment having seven overlapping networks, and is exemplary of embodiments having an odd number of overlapping networks. Table 6B shows an embodiment having four overlapping networks, and is exemplary of embodiments having an even number of overlapping networks. This carrier offset can work for any sort of pulse, whether a monopulse, a section of an oscillating signal, etc.

TABLE 6A

Carrier Offset Values for up to Seven Overlapping Networks

| Network Identifier | Carrier Offset Value |
| --- | --- |
| 0 | −9 MHz |
| 1 | −6 MHz |
| 2 | −3 MHz |
| 3 | Unchanged |
| 4 | +3 MHz |
| 5 | +6 MHz |
| 6 | +9 MHz |

As shown in Table 6A, the carrier frequency (also called a center frequency) of each network is adjusted from the nominal carrier frequency by the appropriate carrier offset value. When an odd number of overlapping networks are provided for, one may use the nominal carrier frequency, while the remaining networks use an offset carrier frequency. Preferably the offset carrier frequencies are symmetrical around the nominal carrier frequency.

TABLE 6B

Carrier Offset Values for up to Four Overlapping Networks

| Network Identifier | Carrier Offset Value |
| --- | --- |
| 0 | −9 MHz |
| 1 | −3 MHz |
| 2 | +3 MHz |
| 3 | +9 MHz |

As shown in Table 6B, the carrier frequency of each network is adjusted from the nominal carrier frequency by the appropriate carrier offset value. When an even number of overlapping networks are provided for, none of the networks use the nominal carrier frequency. Instead each network uses an offset carrier frequency. Preferably the offset carrier frequencies are symmetrical around the nominal carrier frequency.

Although Tables 6A and 6B show offset values for four and seven networks, more or fewer overlapping networks could be accommodated. Also, while in this embodiment the offset values are multiples of 3 MHz, in alternate embodiments the offset value could be changed. In some embodiments the offsets could use a different step value, or even have no set step value at all, varying from each other according to no set pattern. The practical limit of the offset values can be used is the tuning range of the oscillator used.

In one preferred embodiment two separate bands are used, a high band and a low band. The high band has a nominal carrier frequency of 8.208 GHz, and the low band has a nominal carrier frequency of 4.104 GHz.

In operation, the selection of the carrier offset value used by a given network will preferably be determined by the network's coordinator device during the initial scan prior to initiating the network. In this case, the network coordinator preferably selects a carrier offset value that is not in use by any other detected network in the area. Preferably this will be done at the same time that the network coordinator chooses a code word set for the network. In fact, the codeword set and the carrier offset will preferably be linked, each new network choosing a linked set to use.

As noted above, the use of the individual code words provides a degree of channel separation between overlapping networks during preamble acquisition, limited only by the cross-correlation properties of the code word set used by each network. The use of the carrier offset value supplements this separation by providing a degree of channel drift that keeps the channels used by each network from becoming stationary with respect to the other channels.

This is helpful because although the code words limit the number of conflicts between the signals of overlapping networks, they cannot eliminate them. If the center frequencies (i.e., carrier frequencies) used by each network were identical, then any conflicts between codes of overlapping networks would be fixed in time relative to each other.

However, if the two (or more) overlapping networks each have a slightly offset center frequency, the chipping phases of the networks will drift with time. This means that any significant interference between any two networks will fade away with time as the chipping phases of each network drift with respect to each other. And while the differing center frequencies also means that any interferences will also come back, their transitory nature means that they can often be corrected for through signal processing, e.g., through the use of forward error correction (FEC).

Therefore, in embodiments using pulses formed from segments of an oscillating signal, the use of a carrier offset can reduce the chance of continued interference between two overlapping networks, allowing any interference to be of limited duration and therefore potentially correctable.

Although in the disclosed embodiments all of the frequency offset values are an integer multiple of a standard offset value, and the offset values used are symmetrical around zero, alternate embodiments could use non-standard offset values for each network and have the offset values non-symmetrical around zero.

Forward Error Correction

In the preferred embodiments of the present invention, different types of forward error correction (FEC) could be used. For example, the system could use convolutional FEC (e.g., at ½ rate, ⅔ rate and ¾ rate), Reed-Solomon FEC (255, 223), as well as Concatenated Convolutional & Reed-Solomon FEC.

Each of these varieties of FEC has unique characteristics that can be exploited depending upon the application. Convolutional FEC has low latency, limited speed, and moderate coding gain. Reed-Solomon FEC has moderate latency, high speed, and moderate coding gain. Concatenated FEC has high coding gain, high latency, and limited speed. As a result of these variations, different FEC methods can be used in different situations, as desired.

Clear Channel Assessment (CCA)

In order to operate more efficiently, it is desirable that a UWB network be able to determine quickly whether a given channel is being used by another device or not. This is particularly useful in a carrier sense multiple access (CSMA) environment, though it can be helpful in any implementation where quick scanning is desirable. The individual channels that may be scanned are m-cycle BPSK channels (three-cycle BPSK in the disclosed embodiments) separated by frequency. This process can be called carrier sense or clear channel assessment.

In previous implementations, a full acquisition process was required to determine if a specific channel was clear (i.e., unused by another device) or not. However, an alternate approach allows for an assessment of whether the channel is clear to be performed quickly.

Figure 21A:
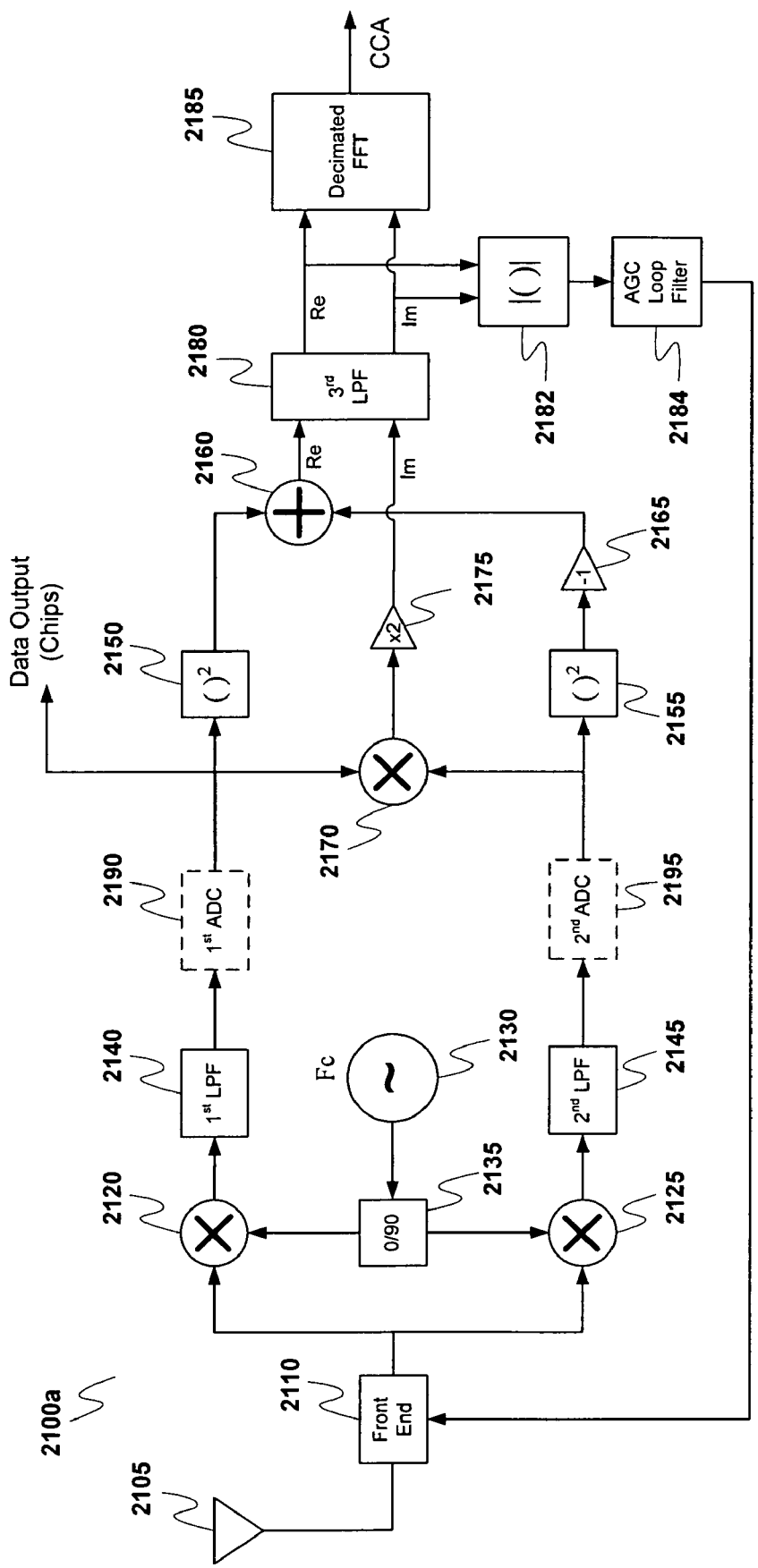
FIGS. 21A and 21B are block diagrams showing circuits for performing a rapid clear channel assessment according to preferred embodiments of the present invention.
Figure 21B:
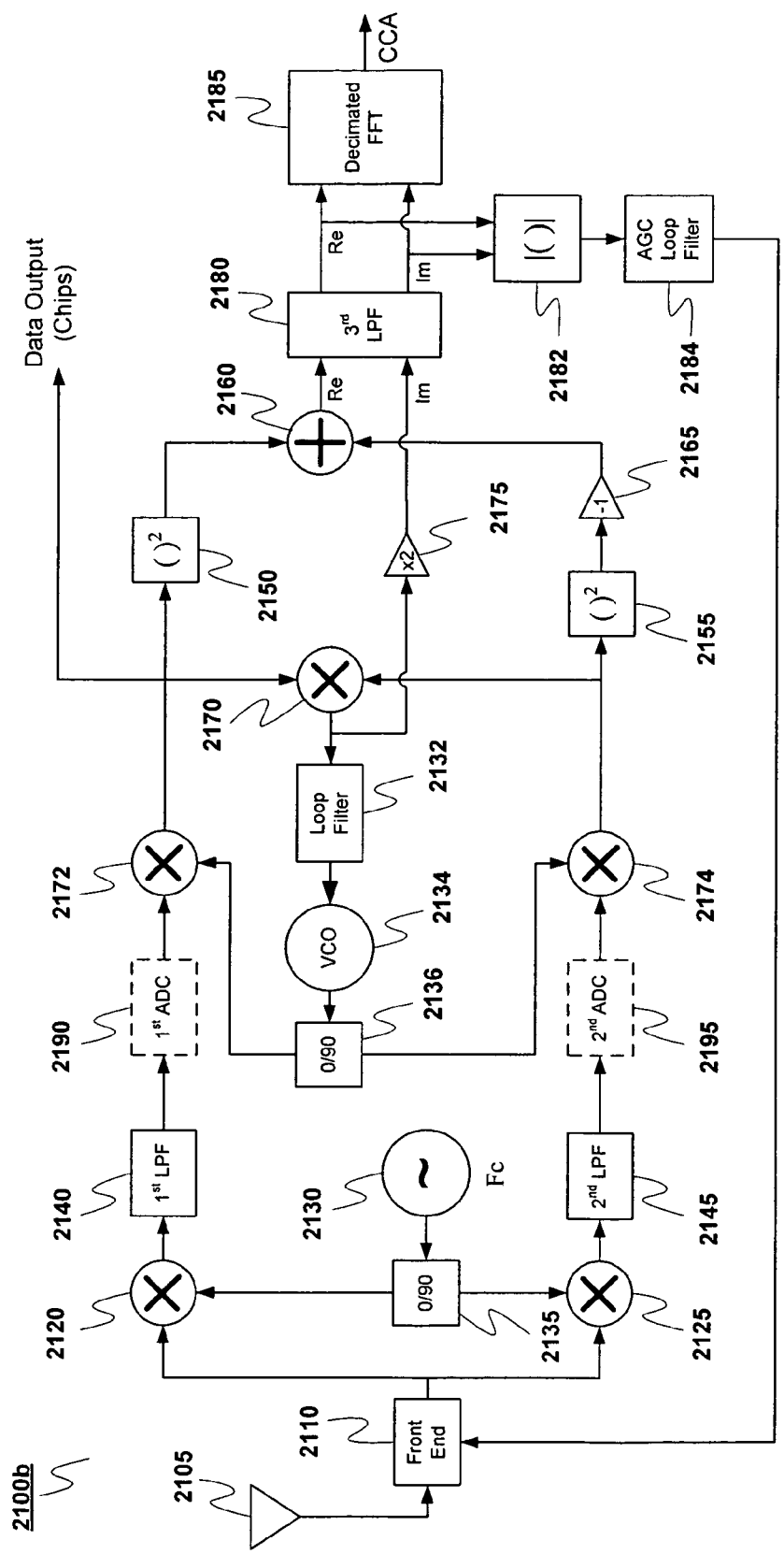

FIGS. 21A and 21B are block diagrams showing circuits for performing a rapid clear channel assessment according to preferred embodiments of the present invention. In preferred embodiments these circuits preferably use segments of an oscillating signal as pulses. However, alternate embodiments could use different pulse structures.

First Preferred Embodiment of CCA Circuitry

As shown in FIG. 21A, the clear channel assessment circuit 2100a includes an antenna 2105, an RF front end 2110, a first mixer 2120, a second mixer 2125, a base oscillator 2130, a 0/90 phase shifter 2135, a first low pass filter (LPF) 2140, a second LPF 2145, a first squaring circuit 2150, a second squaring circuit 2155, an adder 2160, an inverting buffer 2165, a third mixer 2170, a doubling buffer 2175, a third LPF 2180, an absolute value circuit 2182, an automatic gain control (AGC) loop filter 2184, and a decimated fast Fourier transform (FFT) 2185.

Although this circuit may be performed entirely using analog circuitry in some embodiments, in a preferred embodiment analog-to-digital converter (ADCs) can be used at some point along the signal stream to perform part of the operation digitally. In a preferred embodiment, a first ADC 2190 is placed between the first LPF 2140 and the first squaring circuit 2150, and a second ADC 2195 is placed between the second LPF 2145 and the second squaring circuit 2155. However, in alternate embodiments, the number and placement of ADCs could be altered, or they could be eliminated altogether.

In operation, the clear channel assessment circuit 2190a operates as follows. A signal comes in at the antenna 2105. This signal is sent through the front end 2110, which preferably includes a variable gain amplifier controlled by feedback from the AGC loop filter 2180. Once the incoming signal has been processed through the front end 2110, it is provided to inputs in both the first and second mixers 2120 and 2125. These two mixers 2120 and 2125 mark the beginning of what can be called I and Q paths for the incoming signal, and this process of breaking the signal up into I and Q paths can be called I/Q demodulation.

The base oscillator 2130 provides a base oscillating signal at a frequency of $F_c$. Preferably this base oscillating signal is a sinusoidal signal, though alternate waveforms can be used in alternate embodiments. $F_c$ is the center frequency of the particular bandwidth being used. In the preferred embodiment two bands are used, one centered on 4.104 GHz and the other centered on 8.208 GHz. Thus, if the circuit 2100a is for the low band, $F_c$ is 4.104 GHz, and if the circuit 2100a is for the high band, $F_c$ is 8.208 GHz. This can be varied in alternate embodiments.

The base oscillating signal output from the base oscillator 2130 is sent through the 0/90 phase shifter, which outputs first and second oscillating signals that are out of phase from each other by 90 degrees. The first oscillating signal is provided to an input of the first mixer 2120, and the second oscillating signal is provided to an input of the second mixer 2125.

The phase difference between the first and second oscillating signals can be accomplished by allowing one copy of the base oscillating signal to pass unchanged, while another copy is shifted 90 degrees. Other embodiments could manipulate the base oscillating signal in other ways to provide the first and second oscillating signals. In the embodiment of FIG. 21A, the first oscillating signal is the same phase as the base oscillating signal, while the second oscillating signal is delayed in phase by 90 degrees from the base oscillating signal. This could be altered in alternate embodiments, so long as the first and second oscillating signals were out of phase by 90 degrees.

The first mixer 2120 mixes the first oscillating signal and the signal received from the front end 2110 and provides a first mixed signal to the first LPF 2140. Similarly, the second mixer 2125 mixes the second oscillating signal and the signal received from the front end 2110 and provides a second mixed signal to the second LPF 2145.

The first and second LPFs 2140 and 2145 are preferably root raise cosine filters with a cutoff frequency proportional to the modulated signal, as is common for root raised cosine Nyquist filters. Other filter types and bandwidths can be used in alternate embodiments, however. In the preferred embodiment using high and low bands, the cutoff frequency used for the low band is 684 MHz, and the cutoff frequency used for the high band is 1.368 GHz. This can be modified in alternate embodiments.

The output of the first LPF 2140 is provided to both the first squaring circuit 2150 and the third mixer 2170, while the output of the second LPF 2145 is provided to both the second squaring circuit 2155 and the third mixer 2170.

The first squaring circuit 2150 squares the output of the first LPF 2140 to provide a first squared signal, while the second squaring circuit 2155 squares the output of the second LPF 2145 to provide a second squared signal.

The third mixer 2170 mixes the output of the first LPF 2140 and the output of the second LPF 2145 to provide a third mixed signal.

The inverting buffer 2165 inverts the second squared signal to provide an inverted signal, while the doubling buffer doubles the third mixed signal to provide a doubled signal.

The adder 2160 adds the first squared signal, the inverted signal, and the doubled signal to produce an adder output signal.

One way to look at the clear channel assessment circuit 2100a is to consider that it breaks the incoming signal into a real portion x output from the first LPF 2140, and an imaginary portion y output from the second LPF 2145. The square of the incoming signal can also be calculated as the square of the sum of the real and imaginary portions of the incoming signal, as follows:

$$\text{Square of Incoming Signal} = (x + jy)^2 \\ = x^2 + j2xy - y^2 \\ = (x^2 - y^2) + j2xy \quad (18)$$

Thus, the output of the adder 2160 represents the real portion of the square of the input signal, while the output of the doubling buffer represents the imaginary portion of the input signal.

The third LPF 2180 serves to remove double frequency components in the squared input signal. In the preferred embodiment the third LPF 2180 has a cutoff frequency of 20 MHz.

The absolute value circuit 2182 takes the output of the third LPF 2180 and gives it a positive magnitude.

The ACG loop filter 2180 is preferably a first order control loop filter with an output proportional to the error signal at the input. Other filter types are possible in alternate embodiments, however. The ACG loop filter 2184 filters the output of the absolute value circuit 2182 and provides the result to the front end 2120 as a feedback signal.

The output of the third LPF filter 2180 is also provided to the decimated FFT circuitry 2185 as an input signal, which performs a decimated fast Fourier transform on the signal, moving the signal from the time domain to the frequency domain. The result of this decimated fast Fourier transform is a clear channel assessment (CCA) signal that indicates whether another network is on the air in the channel being listened to.

The current device compares the CCA against a noise baseline to determine if another device is using the channel in question. If the CCA signal is above a set threshold, then the device determines that the channel being investigated is in use; if the CCA signal is not above the threshold, then the device determines that the channel being investigated is not in use. The noise baseline and associated thresholds can be determined by observation of unused channels, or by other known algorithms.

In a preferred embodiment, the clear channel assessment circuit 2100a operates with analog circuitry up until the first and second LPFs 2140 and 2145, and operates with digital circuitry thereafter. Therefore, in this embodiment the first ADC 2190 is inserted between the first LPF 2140 and the first squaring circuit 2150, and the second ADC 2195 is inserted between the second LPF 2145 and the second squaring circuit 2155. In alternate embodiments the analog/digital line could be moved, or the whole operation could be performed in the analog realm.

This first preferred embodiment of the CCA circuitry requires that the base oscillator 2130 be very accurate, which can require more complicated and expensive circuitry. Therefore, a second preferred embodiment is provided that allows for a feedback control of the frequency of the base oscillator 2130.

Second Preferred Embodiment of CCA Circuitry

As shown in FIG. 21B, the clear channel assessment circuit 2100b includes an antenna 2105, an RF front end 2110, a first mixer 2120, a second mixer 2125, a base oscillator 2130, a first 0/90 phase shifter 2135, a loop filter 2132, a voltage-controlled oscillator (VCO) 2134, a second 0/90 phase shifter 2136, a first low pass filter (LPF) 2140, a second LPF 2145, a first squaring circuit 2150, a second squaring circuit 2155, an adder 2160, an inverting buffer 2165, a third mixer 2170, a fourth mixer 2172, a fifth mixer 2174, a doubling buffer 2175, an absolute value circuit 2182, an automatic gain control (AGC) loop filter 2184, and a decimated fast Fourier transform (FFT) 2185. Elements in FIG. 21B that have the same reference numbers as in FIG. 21A operate in a similar manner.

Although this circuit may be performed entirely using analog circuitry in some embodiments, in a preferred embodiment analog-to-digital converter (ADCs) can be used at some point along the signal stream to perform part of the operation digitally. In a preferred embodiment, a first ADC 2190 is placed between the first LPF 2140 and the first squaring circuit 2172, and a second ADC 2195 is placed between the second LPF 2145 and the second squaring circuit 2174. However, in alternate embodiments, the number and placement ADCs could be altered, or they could be eliminated altogether.

In operation, the clear channel assessment circuit 2100b operates as follows. A signal comes in at the antenna 2105. This signal is sent through the front end 2110, which preferably includes a variable gain amplifier controlled by feedback from the AGC loop filter 2180. Once the incoming signal has been processed through the front end 2110, it is provided to inputs in both the first and second mixers 2120 and 2125. These two mixers 2120 and 2125 mark the beginning of what can be called I and Q paths for the incoming signal, and this process of breaking the signal up into I and Q paths can be called I/Q demodulation.

The base oscillator 2130 provides a base oscillating signal at a frequency of $F_c$. Preferably this base oscillating signal is a sinusoidal signal, though alternate waveforms can be used in alternate embodiments. $F_c$ is the center frequency of the particular bandwidth being used. In the preferred embodiment two bands are used, one centered on 4.104 GHz and the other centered on 8.208 GHz. Thus, if the circuit 2100*a* is for the low band, $F_c$ is 4.104 GHz, and if the circuit 2100*b* is for the high band, $F_c$ is 8.208 GHz. This can be varied in alternate embodiments.

The base oscillating signal output from the base oscillator 2130 is sent through the first 0/90 phase shifter 2135, which outputs first and second oscillating signals that are out of phase from each other by 90 degrees. The first oscillating signal is provided to an input of the first mixer 2120, and the second oscillating signal is provided to an input of the second mixer 2125.

The first 0/90 phase shifter 2135 can achieve the phase difference between the first and second oscillating signals by allowing one copy of the base oscillating signal to pass unchanged, while another copy is shifted 90 degrees. However, other embodiments could manipulate the base oscillating signal in other ways to provide the first and second oscillating signals. In the embodiment of FIG. 21B, the first oscillating signal is the same phase as the base oscillating signal, while the second oscillating signal is delayed in phase by 90 degrees from the base oscillating signal. This could be altered in alternate embodiments, so long as the first and second oscillating signals were out of phase by 90 degrees.

The first mixer 2120 mixes the first oscillating, signal and the signal received from the front end 2110 and provides a first mixed signal to the first LPF 2140. Similarly, the second mixer 2125 mixes the second oscillating signal and the signal received from the front end 2110 and provides a second mixed signal to the second LPF 2145.

The first and second LPFs 2140 and 2145 are preferably root raise cosine filters with a cutoff frequency proportional to the modulated signal, as is common for root raised cosine Nyquist filtering. Other filter types and bandwidth can be used in alternate embodiments, however. In the preferred embodiment using high and low bands, the cutoff frequency used for the low band is 684 MHz, and the cutoff frequency used for the high band is 1.368 GHz. This can be modified in alternate embodiments.

The fourth mixer 2172 receives the output of the first LPF 2140 and a third oscillating signal received from the second 0/90 phase shifter 2136, and mixes the two to provide a fourth mixed signal. The fifth mixer 2174 receives the output of the second LPF 2145 and a fourth oscillating signal received from the second 0/90 phase shifter 2136, and mixes the two to provide a fifth mixed signal.

The first squaring circuit 2150 squares the fourth mixed signal to provide a first squared signal, while the second squaring circuit 2155 squares the fifth mixed signal to provide a second squared signal.

The third mixer 2170 mixes the fourth and fifth mixed signals to provide a third mixed signal.

The loop filter 2132 is preferably a type 2 second order lead-lag loop filter that serves to integrate the error signal from the third mixer 2170, controlling the VCO 2134.

The output of the loop filter 2132 is then used to control the frequency of the VCO 2134, which produces a corrective oscillating signal. This corrective oscillating signal is used to correct the frequency error introduced by the base oscillating signal produced by the base oscillator 2130.

Preferably the VCO 2134 has a frequency that is in the range of about 0 MHz to 10 MHz, depending upon the output of the loop filter 2132.

The corrective oscillating signal output from the VCO 2134 is sent through the second 0/90 phase shifter 2136, which outputs third and fourth oscillating signals that are out of phase from each other by 90 degrees. The third oscillating signal is provided to an input of the fourth mixer 2172, and the fourth oscillating signal is provided to an input of the fifth mixer 2174.

The second 0/90 phase shifter 2136 can achieve the phase difference between the third and fourth oscillating signals by allowing one copy of the corrective oscillating signal to pass unchanged, while another copy is shifted 90 degrees. However, other embodiments could manipulate the corrective oscillating signal in other ways to provide the third and fourth oscillating signals. In the embodiment of FIG. 21B, the third oscillating signal is the same phase as the corrective oscillating signal, while the fourth oscillating signal is delayed in phase by 90 degrees from the corrective oscillating signal. This could be altered in alternate embodiments, so long as the third and fourth oscillating signals were out of phase by 90 degrees. The relative phases of the third and fourth oscillating with respect to the first and second oscillating signals is unimportant.

The inverting buffer 2165 inverts the second squared signal to provide an inverted signal, while the doubling buffer doubles the third mixed signal to provide a doubled signal.

The adder 2160 adds the first squared signal, the inverted signal, and the doubled signal to produce an adder output signal.

As noted above, one way to look at the clear channel assessment circuit 2100*b* is to consider that it breaks the incoming signal into a real portion x output from the first LPF 2140, and an imaginary portion y output from the second LPF 2145. And based on Equation (18), the output of the adder 2160 represents the real portion of the square of the input signal, while the output of the doubling buffer represents the imaginary portion of the input signal.

The third LPF 2180 serves to remove double frequency components in the squared input signal. In the preferred embodiment the third LPF 2180 has a cutoff frequency of 20 MHz.

The absolute value circuit 2182 takes the output of the third LPF 2180 and gives it a positive magnitude.

The ACG loop filter 2180 is preferably a first order control loop filter with an output proportional to the error signal at the input. Other filters are possible, however, in alternate embodiments. The ACG loop filter 2184 filters the output of the absolute value circuit 2182 and provides the result to the front end 2110 as a feedback signal.

The output of the third LPF filter 2180 is also provided to the decimated FFT circuitry 2185 as an input signal, which performs a decimated fast Fourier transform on the signal, moving the signal from the time domain to the frequency domain. The result of this decimated fast Fourier transform is a clear channel assessment (CCA) signal that indicates whether another network is on the air in the channel being listened to.

The current device compares the CCA against a noise baseline to determine if another device is using the channel in question. If the CCA signal is above a set threshold, then the device determines that the channel being investigated is in use; if the CCA signal is not above the threshold, then the device determines that the channel being investigated is not in use. The noise baseline and associated thresholds can be determined by observation of unused channels, or by other known algorithms.

In a preferred embodiment, the clear channel assessment circuit 2100b operates with analog circuitry up until the first and second LPFs 2140 and 2145, and operates with digital circuitry thereafter. Therefore, in this embodiment the first ADC 2190 is inserted between the first LPF 2130 and the first squaring circuit 2172, and the second ADC 2195 is inserted between the second LPF 2135 and the second squaring circuit 2174. In alternate embodiments the analog/digital line could be moved, or the whole operation could be performed in the analog realm.

Choosing Frequency Offsets

Using chipping rate offsets between networks forces RMS cross-correlation conditions between network code words. Because of this, there is a required minimum frequency offset in order to insure that cross-correlation errors do not cause burst errors. For offsets less than the minimum, cross-correlation spikes can cause burst errors, which will require some sort of FEC capable of dealing with burst errors.

This makes it necessary to balance the increased costs of FEC operations to address burst errors with the costs of providing hardware complex enough to use frequency offsets adequate to guarantee single errors.

The following analysis will address the question of how much of a frequency offset is required, between two networks to avoid burst errors.

Assuming that the symbol (code word) duration from two different sources will differ by an amount τ; that is:

$$T_{S2} = T_{S1} + \tau, \tag{19}$$

the chipping rates of the first and second sources can be described as follows:

$$f_{C1} = \frac{N}{T_{S1}} \tag{20}$$

$$f_{C2} = \frac{N}{T_{S2}} = \frac{N}{T_{S1} + \tau} = \frac{N}{T_{S1}} \left\{ \frac{1}{1 + \frac{\tau}{T_{S1}}} \right\}. \tag{21}$$

where $f_{C1}$ is the chipping rate for the first source, $f_{C2}$ is the chipping rate for the second source, N is the code word length, $T_{S1}$ is the symbol duration of a first source, $T_{S2}$ is the symbol duration of a second source, and τ is the difference in symbol duration between the first and second sources.

Equation 21 can be expanded using a binomial series, and can be truncated to yield:

$$f_{C2} = \frac{N}{T_{S1}} \left[ 1 - \frac{\tau}{T_{S1}} \right] \tag{22}$$

$$= f_{C1} \left[ 1 - \frac{\tau}{T_{S1}} \right]$$

$$= f_{C1} - f_{C1} \cdot \frac{\tau}{T_{S1}}.$$

The offset frequency difference Δf can then be determined as:

$$\Delta f = f_{C1} - f_{C2} \tag{23}$$

$$= f_{C1} - \left( f_{C1} - f_{C1} \cdot \frac{\tau}{T_{S1}} \right)$$

$$= f_{C1} - f_{C1} + f_{C1} \cdot \frac{\tau}{T_{S1}}$$

$$= f_{C1} \cdot \frac{\tau}{T_{S1}}$$

$$= f_{C1} \cdot \frac{\tau}{\frac{N}{f_{C1}}}$$

$$= f_{C1}^2 \frac{\tau}{N}.$$

The values of N and $f_{C2}$ are determined by the network. The value of τ can be determined by the "time width" of the cross-correlation, which in turn is determined by the wavelet autocorrelation. It is therefore possible to determine what the required frequency difference Δf (i.e., the required offset frequency) is to decorrelate between two symbols and avoid burst errors.

In one preferred embodiment, N=24 (i.e., the code word is 24 chips long), and $f_{C1}$=2.736 Gcps (i.e., the chipping rate is 2.736 Gcps), and the autocorrelation 3 dB time width for 70 pS peak-to-peak wavelets is ±10 pS.

Using equation 23, this results in a the following minimum frequency difference to decorrelate between two symbols:

$$\Delta f = \frac{10 \times 10^{-12}}{24} (2.736 \times 10^9)^2 \tag{24}$$

$$= 3.119 \text{ MHz}$$

$$\approx 3.12 \text{ MHz}.$$

In other words, the frequency offset between chips must be about 3.12 MHz to decorrelate between two symbols. If the frequency offset is chosen to be 3.12 MHz or greater, then no burst errors will occur. If the frequency offset is chosen to be below 3.12 MHz, then burst errors will occur.

The length of burst errors will be determined by the chosen frequency offset. Using the parameters from Equation 23, consider if the offset frequency Δf were only 1 MHz. The difference in symbol duration between the first and second sources τ can be calculated as:

$$\tau = \frac{N \times \Delta f}{f_C^2} = \frac{24 \times 10^6}{(2.736 \times 10^9)^2} = 3.2 \text{ pS} \tag{25}$$

The error burst length can then be considered to be approximately the autocorrelation time width divided by difference in symbol duration between the first and second sources τ:

$$\text{Error Burst Length} \approx \frac{20 \text{ pS}}{3.2 \text{ pS}} \approx 6 \tag{26}$$

The error burst length shows how long the error condition will persist before the offending code words drift apart in phase. This is determined by dividing the possible variation of the autocorrelation 3 dB time width (20 pS, given the ±10 pS range) by τ.

As noted above with respect to Table 6B, in a preferred embodiment the frequency offsets for the chips are −9 MHz, −3 MHz, +3 MHz, and +9 MHz, which correspond to offsets of −3 MHz, −1 MHz, +1 MHz, and +3 MHz for the clock used to form the chips. This means that for two channels right next to each other, the frequency offset Δf will be 2 MHz, which gives a difference in symbol duration τ between devices on the two channels as:

$$\tau = \frac{N \times \Delta f}{f_C^2} = \frac{24 \times 2 \times 10^6}{(2.736 \times 10^9)^2} = 6.4 \text{ pS}, \quad (27)$$

with an error burst length of:

$$\text{Error Burst Length} \approx \frac{20 \text{ pS}}{6.4 \text{ pS}} \approx 3, \quad (28)$$

which can be corrected through the use of FEC.

However, for two channels that are not adjacent, the frequency offset Δf will be 4 MHz or 6 MHz, which eliminates the risk of burst errors.

Therefore this implementation either eliminates burst errors or allows burst errors at a rate that can be addressed through the use of FEC. In the preferred embodiment, the coordinator of a network will preferably assign channels (i.e., frequency offsets) in such a way as to maximize the frequency offsets between the devices. In this way, the use of FEC will be used only when it cannot be avoided.

Clear Channel Determination

A multiple network environment can be modeled as a vector of signals $$V_s(t) = [S_{-3}(t) S_{-2}(t) S_{-1}(t) S_0(t) S_{+1}(t) S_{+2}(t) S_{+3}(t)]$$

where $S_i(t) = m_i(t) * \cos\{(\omega_0 + \omega_i)t\}$, $\omega_i$ is the frequency offset, and $m_i$ is the time dependent modulation. This vector will be processed by a square law device (e.g., the squaring circuits 2150 and 2155 in FIGS. 21A and 21B).

The matrix product is given as of this squaring function is:

$$V_S^T(t) * V_S(t) = \begin{bmatrix} S_{-3}^2(t) & S_{-3}(t)S_{-2}(t) & S_{-3}(t)S_{-1}(t) & S_{-3}(t)S_0(t) & S_{-3}(t)S_{+1}(t) & S_{-3}(t)S_{+2}(t) & S_{-3}(t)S_{+3}(t) \\ S_{-2}(t)S_{-3}(t) & S_{-2}^2(t) & S_{-2}(t)S_{-1}(t) & S_{-2}(t)S_0(t) & S_{-2}(t)S_{+1}(t) & S_{-2}(t)S_{+2}(t) & S_{-2}(t)S_{+3}(t) \\ S_{-1}(t)S_{-3}(t) & S_{-1}(t)S_{-2}(t) & S_{-1}^2(t) & S_{-1}(t)S_0(t) & S_{-1}(t)S_{+1}(t) & S_{-1}(t)S_{+2}(t) & S_{-1}(t)S_{+3}(t) \\ S_0(t)S_{-3}(t) & S_0(t)S_{-2}(t) & S_0(t)S_{-1}(t) & S_0^2(t) & S_0(t)S_{+1}(t) & S_0(t)S_{+2}(t) & S_0(t)S_{+3}(t) \\ S_{+1}(t)S_{-3}(t) & S_{+1}(t)S_{-2}(t) & S_{+1}(t)S_{-1}(t) & S_{+1}(t)S_0(t) & S_{+1}^2(t) & S_{+1}(t)S_{+2}(t) & S_{+1}(t)S_{+3}(t) \\ S_{+2}(t)S_{-3}(t) & S_{+2}(t)S_{-2}(t) & S_{+2}(t)S_{-1}(t) & S_{+2}(t)S_0(t) & S_{+2}(t)S_{+1}(t) & S_{+2}^2(t) & S_{+2}(t)S_{+3}(t) \\ S_{+3}(t)S_{-3}(t) & S_{+3}(t)S_{-2}(t) & S_{+3}(t)S_{-1}(t) & S_{+3}(t)S_0(t) & S_{+3}(t)S_{+1}(t) & S_{+3}(t)S_{+2}(t) & S_{+3}^2(t) \end{bmatrix} \quad (29)$$

All the signals off the main diagonal represent the product of two uncorrelated spread spectrum signals which yields just another spread spectrum signal (represents an increase in the noise floor). However, the trace represents the square-law product sum of the signals $S_i^2(t) = m_i^2(t) * \cos^2\{(\omega_0 = \omega_i)t\}$. The expectation of each double frequency term is given by $$\overline{S_i^2(t)} = \frac{1}{2} * \overline{m_i^2(t)} * \cos\{2(\omega_0 + \omega_i)t\} \quad (30)$$

where $\overline{m_i^2(t)} \approx 1$. This shows that the trace terms collapse to a double frequency component and the cross-product terms (off main diagonal terms) simply raise the noise floor. Assuming each network uses a unique chipping rate offset, the output of the squaring loop can be used for network identification.

The output of the squarer in FIG. 21A is a spectral comb representing the above trace terms with the noise floor set by the cross-product terms. This output is determined by the combination of the real and imaginary signal portions output from the third LPF 2180, and provided to the decimate FFT 2185.

Figure 23A:
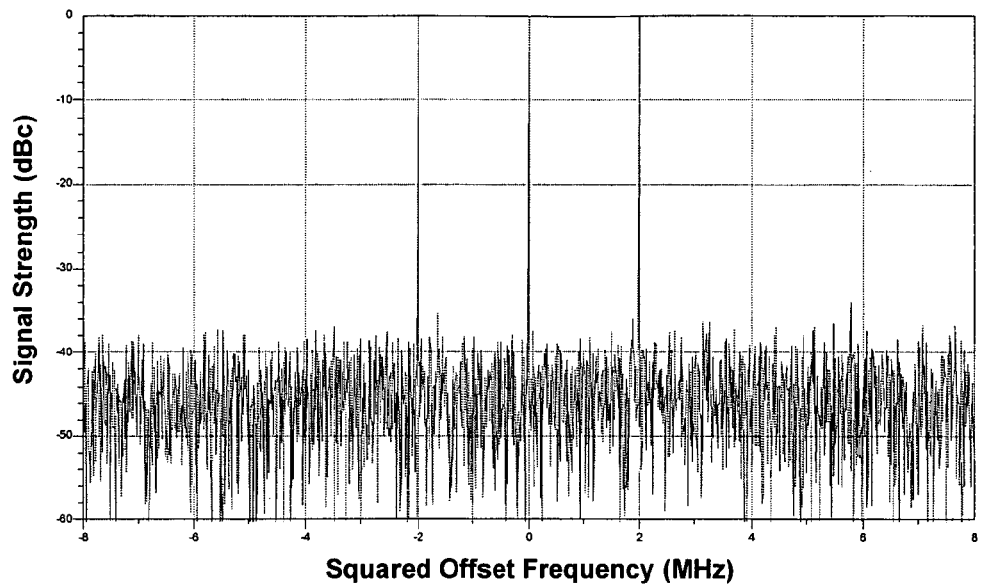
FIGS. 23A and 23B are graphs showing the output of the squarer elements in FIGS. 21A and 21B for three and seven term squaring, respectively, according to preferred embodiments of the present invention.
Figure 23B:
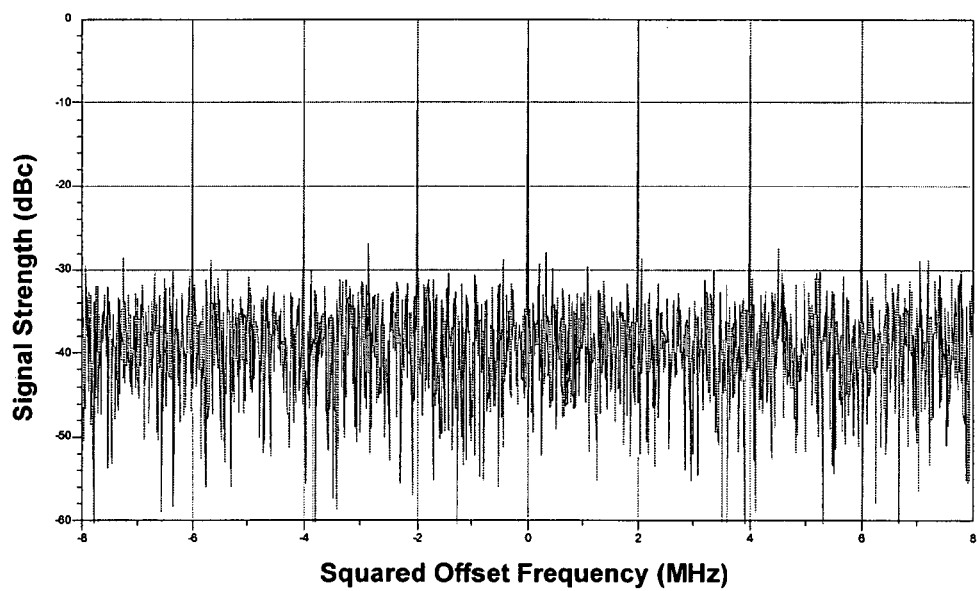

FIGS. 23A and 23B are FFT graphs of a simulation of the output of the third LPF 2180 of FIG. 21A with 3 terms and 7 terms (i.e., channels), respectively, according to a preferred embodiment of the present invention. In each simulation, the input signals were the same strength and the frequency offset was 1 MHz, which corresponds to a squared spectral line separation of 2 MHz.

In operation of the clear channel assessment circuit 2100a, the decimated FFT 2185 would perform the same FFT analysis of the signals from the third LPF 2180 as shown in FIGS. 23A and 23B, except over a smaller bandwidth corresponding to the possible positions of spikes in a given channel, and producing a single value as a result.

If the result output from the decimated FFT 2185 is above a determined threshold, then the device determines that there is another device transmitting over the given channel. If, however, the result output from the decimated FFT 2185 is below the threshold, then the device determines that the given channel is unused.

As shown in FIGS. 23A and 23B, each graph has a noise floor with a number of spikes corresponding to the number of terms used. And although the signal strengths were the same in both simulations, the noise floor in FIG. 23B is roughly 10 dB higher than the noise floor of FIG. 23A.

Signal Acquisition

Signal acquisition in the disclosed UWB systems is preferably performed by code wheel spinning using a correlator 1560 as shown in FIGS. 15A–17B. Once the timing of the chips (i.e., pulses) is determined, a sliding correlator (e.g., the correlator 1560 from FIGS. 15A–15C) rotates through a full cycle of phases for the acquisition codeword to determine where the symbol boundaries lie. Proper codeword phasing, and hence symbol alignment, is associated with the peak response of the correlator.

The present system provides several advantages over existing UWB systems. As noted above, the current system performs a clear channel determination very quickly to allow more efficient use of a CSMA environment.

In addition, the present system allows three different preamble types, which can be used for different situations. By allowing the devices to choose between each of these preambles, the system improves the ability of the devices to provide for the shortest acquisition and maximum data rate allowed by the current transmission conditions.

A preferred embodiment of the present invention provides three different preambles, each with slightly different parameters. A short preamble is used for situations where a transmission is strong or otherwise requires little in the way of processing to pass between devices successfully; a long preamble is used for situations where the transmission is weak and requires maximum processing to pass successfully between devices; and a normal preamble is used for situations between these two extremes. Although three preamble types are used in the preferred embodiment, alternate embodiments could use more or fewer preamble choices, as desired.

Figure 22A:
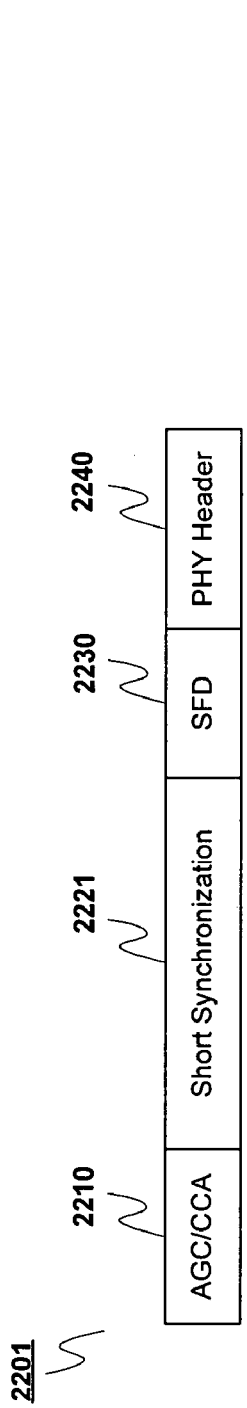
FIGS. 22A–22C are block diagrams of a short preamble, a normal preamble, and a long preamble, respectively, according to preferred embodiments of the present invention.
Figure 22B:
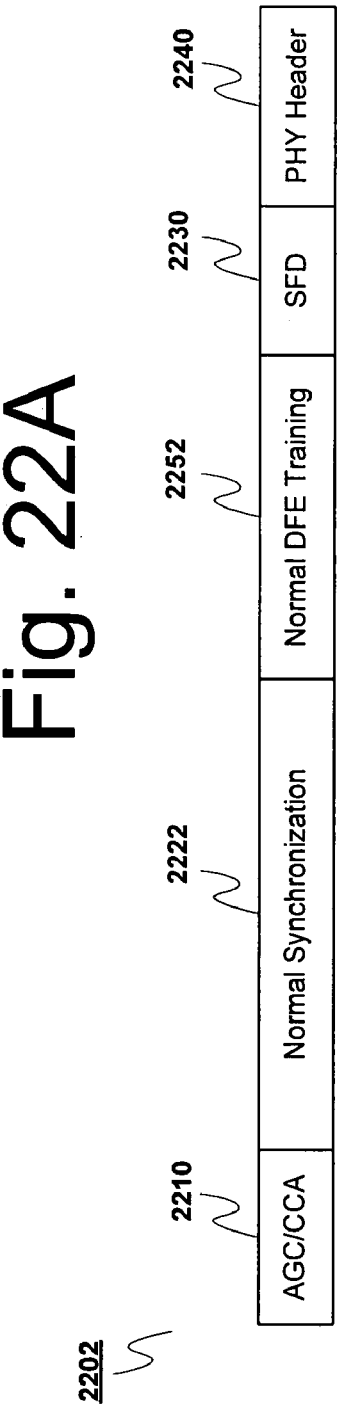
Figure 22C:
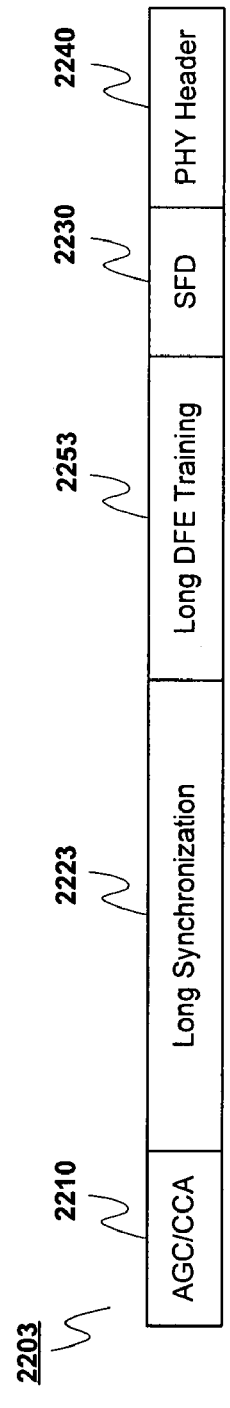

FIGS. 22A–22C are block diagrams of a short preamble, a normal preamble, and a long preamble, respectively, according to preferred embodiments of the present invention.

Short Preamble

As shown in FIG. 22A, a short preamble 2201 includes an automatic gain control (AGC) /clear channel assessment (CCA) portion 2210, a short synchronization portion 2221, a start frame delimiter (SFD) 2230, and a physical layer (PHY) header 2240.

The AGC/CCA portion 2210 is preferably a period of time set aside for CCA and AGC setting. The length of the AGC/CCA portion 2210 is set to provide sufficient time for CCA and AGC. In the preferred embodiment disclosed in FIG. 22B, the AGC/CCA portion 2210 is 4 µs long.

The short synchronization portion 2221 provides the receiver with a known set of data that allows the receiving device to lock onto the chipping clock timing and the symbol clock timing of the transmitter. In other words, it allows the receiver to synchronize with the phase of the pulses and symbols being transmitted. In the preferred embodiment disclosed in FIG. 22A, the short synchronization portion 2221 is 5 µs long.

The SFD 2230 serves as a delimiter, indicating when the PHY header 2240 starts. In the preferred embodiment disclosed in FIG. 22A, the SFD 2230 is ½ µs long.

The PHY header 2240 provides time and information to allow the receiving device to perform what acquisition operations are necessary based on the particular PHY layer being used. The specific parameters of the PHY header 2240 will vary as different PHY layers are used.

The short preamble is useful for situations where a strong signal is received and little processing beyond a set minimum is required to successfully acquire a signal. This includes signals being transmitted at short range (e.g., about one meter), situations where no rake is required, and situations where no decision feedback equalization (DFE) is required. In the preferred embodiment, this would give the shortest acquisition time, and would allow the maximum data transmission rate.

Normal Preamble

As shown in FIG. 22B, a normal preamble 2202 includes an AGC/CCA portion 2210, a normal synchronization portion 2222, a normal decision feedback equalization (DFE) training portion 2252, an SFD 2230, and a PHY header 2240.

The AGC/CCA portion 2210 is preferably a period of time set aside for CCA and AGC setting. The length of the AGC/CCA portion 2210 is set to provide sufficient time for CCA and AGC. In the preferred embodiment disclosed in FIG. 22B, the AGC/CCA portion 2210 is 4 µs long.

The normal synchronization portion 2222 provides the receiver with a known set of data that allows the receiving device to lock onto the chipping clock timing and the symbol clock timing of the transmitter. In other words, it allows the receiver to synchronize with the phase of the pulses and symbols being transmitted. In the preferred embodiment disclosed in FIG. 22A, the normal synchronization portion 2221 is 8 µs long.

The normal DFE training portion 2252 provides time and information for the receiver to perform decision feedback equalization on the incoming signal. In the preferred embodiment disclosed in FIG. 22B, the DFE training portion 2250 is 4 µs long.

The SFD 2230 serves as a delimiter, indicating when the PHY header 2240 starts. In the preferred embodiment disclosed in FIG. 22A, the SFD 2230 is ½ µs long.

The PHY header 2252 provides time and information to allow the receiving device to perform what acquisition operations are necessary based on the particular PHY layer being used. The specific parameters of the PHY header 2250 will vary as different PHY layers are used.

The normal preamble is useful for ranges longer than minimal ranges (e.g., above one meter), cases where rake or DFE is required, or any cases where some amount of signal processing between a minimum and maximum amount is needed. In the preferred embodiment, the normal preamble would give a middling acquisition time, and would allow an average relative data transmission rate.

Long Preamble

As shown in FIG. 22C, a long preamble 2203 includes an AGC/CCA portion 2210, a long synchronization portion 2223, a DFE training portion 2253, an SFD 2230, and a PHY header 2240.

The AGC/CCA portion 2210 is preferably a period of time set aside for CCA and AGC setting. The length of the AGC/CCA portion 2210 is set to provide sufficient time for CCA and AGC. In the preferred embodiment disclosed in FIG. 22B, the AGC/CCA portion 2210 is 4 µs long.

The long synchronization portion 2223 provides the receiver with a known set of data that allows the receiving device to lock onto the chipping clock and the symbol clock of the transmitter. In other words, it allows the receiver to synchronize with the phase of the pulses being transmitted as well as the phase of the symbols being transmitted. In the preferred embodiment disclosed in FIG. 22C, synchronization portion 2223 is 91.5 µs long.

The DFE training portion 2253 provides time and information for the receiver to perform decision feedback equalization on the incoming signal. In the preferred embodiment disclosed in FIG. 22C, the DFE training portion 2260 is 4 µs long.

The SFD 2230 serves as a delimiter, indicating when the PHY header 2240 starts. In the preferred embodiment disclosed in FIG. 22A, the SFD 2230 is ½ µs long.

The PHY header 2240 provides time and information to allow the receiving device to perform what acquisition operations are necessary based on the particular PHY layer being used. The specific parameters of the PHY header 2250 will vary as different PHY layers are used.

The long preamble is useful for long ranges (e.g., near maximum range), cases where rake or DFE are required, situations with antenna diversity (i.e., when more than one antenna is used, and it is necessary to determine which of the plurality of antennas gives the strongest signal and should be used for the duration of the packet), and any cases maximum signal processing is needed. In the preferred embodiment, the normal preamble would require the maximum acquisition time, and would allow a minimum data transmission rate.

Determining Preamble

As shown above, the lengths of the synchronization portions 2221, 2222, and 2223 vary among the three preambles 2201, 2202, and 2203. In preferred embodiments, the short synchronization portion 2221 is shorter than the normal synchronization portion 2222, which is shorter than the long synchronization portion 2223.

In situations where a transmission has very good signal strength, the devices can choose the short preamble 2201 to maximize transmission speed. In this case, acquisition time is minimized because the high signal strength means that acquisition can be performed more quickly. And the shortened acquisition time means a greater data transmission rate In situations where a transmission has poor signal strength, the devices can choose the long preamble 2203 to maximize transmission speed. In this case, acquisition time is lengthened at the expense of data transmission rate. But because the signal is poor, greater time is needed to achieve a successful acquisition.

In situations where the signal strength is neither very good nor poor, the devices can choose a normal preamble 2202 to balance acquisition time and transmission speed. In this case, an average acquisition time is provided, which allows an average data transmission rate.

It is important, however, that there be some way for all devices to know before any transmission what the preamble size will be. In a preferred embodiment, one preamble is set as a default. Any newly formed network will always start using the normal preamble 2202. Then, once communication is established, the devices in the network can determine (by whatever means is provided in the network) whether to change to a different preamble.

For example, if after a time the data signal was found to be very strong, the network might move from the normal preamble 2202 to the short preamble 2201 in order to increase data transmission rate. Then, if for some reason the signal strength degrades and acquisition becomes harder, the network can return to the normal preamble 2202, or even move to the long preamble 2203.

Regardless, by providing multiple preambles, the system allows the network to adjust its data transmission rate based on the acquisition requirements imposed by the current signal strength.

CONCLUSION

Obviously, numerous modifications and variations of the present invention are possible in light of the above teachings. It is therefore to be understood that within the scope of the appended claims, the invention may be practiced otherwise than as specifically described herein.

I claim:

1. A method of operating a plurality of wireless networks, comprising:
    transmitting first signals in a first network at a first carrier frequency;
    transmitting second signals in a second network at a second carrier frequency, the second carrier frequency being different from the first carrier frequency,
    wherein the first carrier frequency is offset from a base carrier frequency by an amount equal to n times an offset frequency,
    wherein the second carrier frequency is offset from the base carrier frequency by an amount equal to m times the offset frequency,
    wherein n is an integer, m is an integer, and m does not equal n, and
    wherein the first carrier frequency and the second carrier frequency are chosen such that a first phase of first chips in the first signal will drift with respect to a second phase of second chips in the second signal.

2. A method of operating a plurality of wireless networks, as recited in claim 1, wherein n is 1 and m is −1.

3. A method of operating a plurality of wireless networks, as recited in claim 1, wherein the base carrier frequency is between 2 and 9 GHz.

4. A method of operating a plurality of wireless networks, as recited in claim 3, wherein the base carrier frequency is between 3.5 and 4.5 GHz.

5. A method of operating a plurality of wireless networks, as recited in claim 4, wherein the base carrier frequency is about 4.104 GHz.

6. A method of operating a plurality of wireless networks, as recited in claim 3, wherein the base earner frequency is between 7.5 and 8.5 GHz.

7. A method of operating a plurality of wireless networks, as recited in claim 4, wherein the base carrier frequency is about 8.208 GHz.

8. A method of operating a plurality of wireless networks, as recited in claim 3, wherein the offset frequency is between 1 and 10 MHz.

9. A method of operating a plurality of wireless networks, as recited in claim 8, wherein the offset frequency is about 3 MHz.

10. A method of operating a plurality of wireless networks, as recited in claim 1, further comprising:
    forming the first signals out of first pulses formed of p cycles of a first oscillating signal operating at a first oscillating frequency; and
    forming the second signals out of second pulses formed of p cycles of a second oscillating signal operating at a second oscillating frequency,
    wherein the first oscillating frequency is offset from a base oscillating frequency by an amount equal to $n \cdot p$ times the offset frequency, and
    wherein the second oscillating frequency is offset from a base oscillating frequency by an amount equal to $m \cdot p$ times the offset frequency.

11. A method of operating a plurality of wireless networks, as recited in claim 10, wherein p is 3.

12. A method of operating a plurality of wireless networks, as recited in claim 1, wherein the plurality of wireless networks are ultrawide bandwidth networks.

13. A method of operating a plurality of wireless networks, comprising:
    transmitting first through $k^{th}$ signals in first through $k^{th}$ networks at first through $k^{th}$ carrier frequencies, respectively; and offsetting the $i^{th}$ carrier frequency from a base carrier frequency by an amount equal to $n_i$ times an offset frequency, wherein k is an integer greater than 1, wherein i varies from 1 to k, and wherein none of $n_1$ through it $n_i$ has the same integer value, and wherein the first through $k^{th}$ carrier frequencies are chosen such that a first through $k^{th}$ phases of first through $k^{th}$ chips in the first through $k^{th}$ signals, respectfully, will drift with respect to each other.

14. A method of operating a plurality of wireless networks, as recited in claim 13, wherein k is 4.

15. A method of operating a plurality of wireless networks, as recited in claim 14 wherein $n_1$ is −2, $n_2$ is −1, $n_3$ is 1, and $n_4$ is 2.

16. A method of operating a plurality of wireless networks, as recited in claim 13, wherein the base carrier frequency is between 2 and 9 GHz.

17. A method of operating a plurality of wireless networks, as recited in claim 16, wherein the base carrier frequency is between 3.5 and 4.5 GHz.

18. A method of operating a plurality of wireless networks, as recited in claim 17, wherein the base carrier frequency is about 4.104 GHz.

19. A method of operating a plurality of wireless networks, as recited in claim 16, wherein the base carrier frequency is between 7.5 and 8.5 GHz.

20. A method of operating a plurality of wireless networks, as recited in claim 19, wherein the base carrier frequency is about 8.208 GHz.

21. A method of operating a plurality of wireless networks, as recited in claim 16, wherein the offset frequency is between 1 and 10 MHz.

22. A method of operating a plurality of wireless networks, as recited in claim 21, wherein the offset frequency is about 3 MHz.

23. A method of operating a plurality of wireless networks, as recited in claim 13, wherein k is 3.

24. A method of operating a plurality of wireless networks, as recited in claim 13, wherein $n_1$ is −1, $n_2$ is 0, and $n_3$ is 1.

25. A method of operating a plurality of wireless networks, as recited in claim 13, further comprising:

forming the $i^{th}$ signals out of pulses formed of p cycles of an $i^{th}$ oscillating signal operating at an $i^{th}$ oscillating frequency, wherein the $i^{th}$ oscillating frequency is offset from a base oscillating frequency by an amount equal to $n_i \cdot p$ times the offset frequency.

26. A method of operating a plurality of wireless networks, as recited in claim 25, wherein p is 3.

27. A method of operating a plurality of wireless networks, as recited in claim 13, wherein the plurality of wireless networks are ultrawide bandwidth networks.

* * * * *